United States Patent
Chrapko

(10) Patent No.: US 10,121,115 B2
(45) Date of Patent: *Nov. 6, 2018

(54) LEARNING AN ENTITY'S TRUST MODEL AND RISK TOLERANCE TO CALCULATE ITS RISK-TAKING SCORE

(71) Applicant: www.TrustScience.com Inc., Edmonton (CA)

(72) Inventor: Evan Chrapko, Edmonton (CA)

(73) Assignee: WWW.TRUSTSCIENCE.COM INC., Edmonton (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,299

(22) Filed: Jun. 22, 2017

(65) Prior Publication Data

US 2017/0293873 A1 Oct. 12, 2017

Related U.S. Application Data

(63) Continuation of application No. 15/079,952, filed on Mar. 24, 2016, now Pat. No. 9,721,296.

(51) Int. Cl.
*G06Q 40/00* (2012.01)
*G06Q 10/06* (2012.01)
(Continued)

(52) U.S. Cl.
CPC ....... *G06Q 10/0635* (2013.01); *G06N 99/005* (2013.01); *G06Q 50/01* (2013.01)

(58) Field of Classification Search
CPC ............................ G06Q 40/00; G06Q 40/025
See application file for complete search history.

(56) References Cited

U.S. PATENT DOCUMENTS 6,108,308 A 8/2000 Flavin et al.
6,286,007 B1 9/2001 Miller et al.
(Continued)

FOREIGN PATENT DOCUMENTS

CA 2600344 9/2006
CA 2775899 4/2011
(Continued)

OTHER PUBLICATIONS

Non-Final Office Action for U.S. Appl. No. 15/671,102 dated Sep. 22, 2017, 21 pages.
(Continued)

*Primary Examiner* — Lalita M Hamilton
(74) *Attorney, Agent, or Firm* — Amin, Turocy & Watson, LLP

(57) ABSTRACT

Systems and methods are described herein for learning an entity's trust model and risk tolerance. An entity's trust score may be calculated based on data from a variety of data sources, and this data may be combined according to a set of weights which reflect an entity's trust model and risk tolerance. For example, an entity may weight data of a certain type more heavily for certain types of transactions and another type of data more heavily for other transactions. By gathering data about the entity, a system may predict the entity's trust model and risk tolerance and adjust the set of weights accordingly for calculating trust scores. Furthermore, by monitoring how entities adjust weights for different transaction types, default weighting profiles may be created that are customized for specific transaction types. As another example, an entity's trust score, as reported to a requesting entity, may be adjusted based on that requesting entity's own trust model, or how "trusting" the requesting entity is.

20 Claims, 26 Drawing Sheets

(51) Int. Cl.
*G06N 99/00* (2010.01)
*G06Q 50/00* (2012.01)

(56) References Cited

U.S. PATENT DOCUMENTS

| | | | |
|---|---|---|---|
| 6,356,902 | B1 | 3/2002 | Tan et al. |
| 6,446,048 | B1 | 9/2002 | Wells et al. |
| 6,509,898 | B2 | 1/2003 | Chi et al. |
| 6,633,886 | B1 | 10/2003 | Chong |
| 6,708,308 | B2 | 3/2004 | De Souza et al. |
| 6,738,777 | B2 | 5/2004 | Bliss et al. |
| 6,751,729 | B1 | 6/2004 | Giniger et al. |
| 6,823,299 | B1 | 11/2004 | Contreras |
| 7,069,259 | B2 | 6/2006 | Horvitz et al. |
| 7,086,085 | B1 | 8/2006 | Brown et al. |
| 7,130,262 | B1 | 10/2006 | Cortez et al. |
| 7,130,908 | B1 | 10/2006 | Pecus et al. |
| 7,139,837 | B1 | 11/2006 | Parekh et al. |
| 7,266,649 | B2 | 9/2007 | Yoshida et al. |
| 7,272,719 | B2 | 9/2007 | Bleckmann et al. |
| 7,451,365 | B2 | 11/2008 | Wang et al. |
| 7,512,612 | B1 | 3/2009 | Akella et al. |
| 7,539,697 | B1 | 5/2009 | Akella et al. |
| 7,664,802 | B2 | 2/2010 | Aaltonen et al. |
| 7,668,665 | B2 | 2/2010 | Kim |
| 7,685,192 | B1 | 3/2010 | Scofield et al. |
| 7,743,208 | B2 | 6/2010 | Yoshida et al. |
| 7,822,631 | B1 | 10/2010 | Vander Mey et al. |
| 7,865,551 | B2 | 1/2011 | McCuller |
| 7,886,334 | B1 | 2/2011 | Walsh et al. |
| 7,930,255 | B2 | 4/2011 | Choi et al. |
| 8,010,458 | B2 | 8/2011 | Galbreath et al. |
| 8,010,460 | B2 | 8/2011 | Work et al. |
| 8,108,536 | B1 | 1/2012 | Hernacki et al. |
| 8,156,558 | B2 | 4/2012 | Goldfeder et al. |
| 8,170,958 | B1 | 5/2012 | Gremett et al. |
| 8,180,804 | B1 | 5/2012 | Narayanan et al. |
| 8,214,883 | B2 | 7/2012 | Obasanjo et al. |
| 8,234,688 | B2 | 7/2012 | Grandison et al. |
| 8,244,848 | B1 | 8/2012 | Narayanan |
| 8,261,078 | B2 | 9/2012 | Barriga et al. |
| 8,301,617 | B2 | 10/2012 | Muntz et al. |
| 8,306,973 | B2 | 11/2012 | Ohazama et al. |
| 8,316,056 | B2 | 11/2012 | Wable |
| 8,392,590 | B2 | 3/2013 | Bouchard et al. |
| 8,468,103 | B2 | 6/2013 | Galbreath et al. |
| 8,489,641 | B1 | 7/2013 | Seefeld et al. |
| 8,516,196 | B2 | 8/2013 | Jain et al. |
| 8,572,129 | B1 | 10/2013 | Lee et al. |
| 8,601,025 | B1 | 12/2013 | Shajenko et al. |
| 8,682,837 | B2 | 3/2014 | Skelton |
| 8,683,423 | B2 | 3/2014 | Amaral et al. |
| 8,688,701 | B2 | 4/2014 | Ghosh et al. |
| 8,832,093 | B2 | 9/2014 | Redstone et al. |
| 8,832,790 | B1 | 9/2014 | Villa et al. |
| 8,949,250 | B1 | 2/2015 | Garg et al. |
| 9,143,503 | B2 | 9/2015 | Lo et al. |
| 9,154,491 | B1* | 10/2015 | Leske ............... H04L 63/08 |
| 9,223,978 | B2 | 12/2015 | Kraemer |
| 9,319,419 | B2* | 4/2016 | Sprague ............ H04L 63/126 |
| 9,390,243 | B2 | 7/2016 | Dhillon et al. |
| 9,438,619 | B1 | 9/2016 | Chan et al. |
| 9,443,004 | B2 | 9/2016 | Chan |
| 9,443,044 | B2 | 9/2016 | Gou et al. |
| 2003/0046280 | A1 | 3/2003 | Rotter et al. |
| 2003/0133411 | A1 | 7/2003 | Ise et al. |
| 2003/0227924 | A1 | 12/2003 | Kodialam et al. |
| 2004/0018518 | A1 | 1/2004 | Krieb et al. |
| 2004/0088147 | A1 | 5/2004 | Wang et al. |
| 2004/0122803 | A1 | 6/2004 | Dom et al. |
| 2004/0181461 | A1 | 9/2004 | Raiyani et al. |
| 2004/0181518 | A1 | 9/2004 | Mayo et al. |
| 2004/0239674 | A1 | 12/2004 | Ewald et al. |
| 2005/0096987 | A1 | 5/2005 | Miyauchi |
| 2005/0243736 | A1 | 11/2005 | Faloutsos et al. |
| 2005/0256949 | A1 | 11/2005 | Gruhl et al. |
| 2006/0212931 | A1 | 9/2006 | Shull et al. |
| 2006/0271564 | A1 | 11/2006 | Meng Muntz et al. |
| 2006/0287842 | A1 | 12/2006 | Kim |
| 2006/0290697 | A1 | 12/2006 | Madden et al. |
| 2006/0294134 | A1 | 12/2006 | Berkhim et al. |
| 2007/0109302 | A1 | 5/2007 | Tsuboshita et al. |
| 2007/0124291 | A1 | 5/2007 | Hassan et al. |
| 2007/0136086 | A1 | 6/2007 | Luerssen |
| 2007/0143629 | A1 | 6/2007 | Hardjono et al. |
| 2007/0180495 | A1 | 8/2007 | Hardjono et al. |
| 2007/0214259 | A1 | 9/2007 | Ahmed et al. |
| 2007/0220146 | A1 | 9/2007 | Suzuki |
| 2007/0282886 | A1 | 12/2007 | Purang et al. |
| 2008/0005096 | A1 | 1/2008 | Moore |
| 2008/0015916 | A1* | 1/2008 | Cossey ............. G06Q 10/0637 705/7.36 |
| 2008/0086442 | A1 | 4/2008 | Dasdan et al. |
| 2008/0101343 | A1 | 5/2008 | Monette et al. |
| 2008/0104225 | A1 | 5/2008 | Zhang et al. |
| 2008/0133391 | A1 | 6/2008 | Kurian et al. |
| 2008/0183378 | A1 | 7/2008 | Weidner |
| 2009/0024629 | A1 | 1/2009 | Miyauchi |
| 2009/0027392 | A1 | 1/2009 | Jadhav et al. |
| 2009/0043489 | A1 | 2/2009 | Weidner |
| 2009/0063157 | A1 | 3/2009 | Seo |
| 2009/0064293 | A1 | 3/2009 | Li et al. |
| 2009/0094134 | A1 | 4/2009 | Toomer |
| 2009/0106822 | A1 | 4/2009 | Obasanjo et al. |
| 2009/0198562 | A1 | 8/2009 | Wiesinger et al. |
| 2009/0276233 | A1 | 11/2009 | Brimhall et al. |
| 2009/0296568 | A1 | 12/2009 | Kitada |
| 2009/0327054 | A1 | 12/2009 | Yao et al. |
| 2010/0004940 | A1 | 1/2010 | Choi et al. |
| 2010/0010826 | A1 | 1/2010 | Rosenthal et al. |
| 2010/0043055 | A1 | 2/2010 | Baumgart |
| 2010/0076987 | A1 | 3/2010 | Schreiner |
| 2010/0106557 | A1 | 4/2010 | Buss |
| 2010/0169137 | A1 | 7/2010 | Jastrebski et al. |
| 2010/0180048 | A1 | 7/2010 | Guo et al. |
| 2010/0205541 | A1 | 8/2010 | Rapaport et al. |
| 2010/0217525 | A1 | 8/2010 | King et al. |
| 2010/0250605 | A1 | 9/2010 | Pamu et al. |
| 2010/0262610 | A1 | 10/2010 | Acosta et al. |
| 2010/0274815 | A1 | 10/2010 | Vanasco |
| 2010/0309915 | A1 | 12/2010 | Pirbhai et al. |
| 2011/0029467 | A1 | 2/2011 | Spehr et al. |
| 2011/0055897 | A1 | 3/2011 | Arasaratnam |
| 2011/0113098 | A1 | 5/2011 | Walsh et al. |
| 2011/0173344 | A1 | 7/2011 | Mihaly et al. |
| 2011/0208866 | A1 | 8/2011 | Marmolejo-Meillon et al. |
| 2011/0246237 | A1 | 10/2011 | Vdovjak |
| 2011/0246412 | A1 | 10/2011 | Skelton |
| 2011/0265011 | A1 | 10/2011 | Taylor et al. |
| 2011/0283205 | A1 | 11/2011 | Nie et al. |
| 2011/0295626 | A1 | 12/2011 | Chen et al. |
| 2012/0182822 | A1 | 6/2012 | Hayashi |
| 2012/0182882 | A1 | 7/2012 | Chrapko et al. |
| 2012/0197758 | A1 | 8/2012 | Zhong et al. |
| 2012/0204265 | A1 | 8/2012 | Judge |
| 2012/0282884 | A1 | 11/2012 | Sun |
| 2012/0317149 | A1 | 12/2012 | Jagota et al. |
| 2012/0317200 | A1 | 12/2012 | Chan |
| 2013/0013807 | A1 | 1/2013 | Chrapko et al. |
| 2013/0073387 | A1 | 3/2013 | Heath |
| 2013/0097184 | A1 | 4/2013 | Berkhim et al. |
| 2013/0124542 | A1 | 5/2013 | Lee et al. |
| 2013/0166601 | A1 | 6/2013 | Chrapko et al. |
| 2013/0173457 | A1 | 7/2013 | Chrapko et al. |
| 2013/0198811 | A1 | 8/2013 | Yu |
| 2013/0282884 | A1 | 10/2013 | Chandrasekaran et al. |
| 2013/0291098 | A1* | 10/2013 | Chung ................ G06F 21/50 726/21 |
| 2013/0332740 | A1 | 12/2013 | Sauve et al. |
| 2014/0081652 | A1 | 3/2014 | Klindworth |
| 2014/0089189 | A1 | 3/2014 | Vasireddy |
| 2014/0114962 | A1 | 4/2014 | Rosenburg et al. |
| 2014/0156274 | A1 | 6/2014 | You et al. |
| 2014/0172708 | A1 | 6/2014 | Chrapko et al. |

(56) References Cited

U.S. PATENT DOCUMENTS

| | | | |
|---|---|---|---|
| 2014/0173723 A1 | 6/2014 | Singla et al. | |
| 2014/0258160 A1 | 9/2014 | Chrapko et al. | |
| 2014/0278730 A1 | 9/2014 | Muhart et al. | |
| 2014/0279352 A1 | 9/2014 | Schaefer et al. | |
| 2014/0280151 A1 | 9/2014 | Micaelian | |
| 2014/0287725 A1 | 9/2014 | Lee | |
| 2014/0317003 A1 | 10/2014 | Shah | |
| 2015/0026120 A1 | 1/2015 | Chrapko et al. | |
| 2015/0089568 A1* | 3/2015 | Sprague | H04L 63/0876 726/1 |
| 2015/0121456 A1 | 4/2015 | Milman et al. | |
| 2015/0220835 A1 | 8/2015 | Wilson et al. | |
| 2015/0271206 A1* | 9/2015 | Schultz | G06F 21/6236 726/3 |
| 2015/0359039 A1 | 12/2015 | Hague et al. | |
| 2015/0370801 A1 | 12/2015 | Shah | |
| 2016/0035046 A1 | 2/2016 | Gupta et al. | |
| 2016/0171011 A1 | 6/2016 | Drogobetski et al. | |
| 2016/0171113 A1 | 6/2016 | Fanous et al. | |
| 2016/0277424 A1 | 9/2016 | Mawji et al. | |
| 2017/0236078 A1 | 8/2017 | Rasumov | |

FOREIGN PATENT DOCUMENTS

| | | |
|---|---|---|
| CN | 1619567 | 5/2005 |
| EP | 1511232 | 3/2005 |
| JP | 2001298453 | 10/2001 |
| JP | 2003259070 | 9/2003 |
| JP | 2006260099 | 9/2003 |
| JP | 2006113900 | 4/2006 |
| JP | 2007004411 | 1/2007 |
| JP | 2007249413 | 9/2007 |
| JP | 2008129990 | 6/2008 |
| JP | 2009025871 | 2/2009 |
| JP | 2009064433 | 3/2009 |
| JP | 2009146253 | 7/2009 |
| WO | 2006019752 | 2/2006 |
| WO | 2006115919 A2 | 11/2006 |
| WO | 2009002193 | 12/2008 |
| WO | 2009020964 | 2/2009 |
| WO | 2009109009 | 9/2009 |
| WO | 2010048172 | 4/2010 |
| WO | 2011143761 | 11/2011 |
| WO | 2013026095 | 2/2013 |
| WO | 2013173790 A1 | 11/2013 |

OTHER PUBLICATIONS

Non-Final Office Action for U.S. Appl. No. 15/675,041 dated Oct. 6, 2017, 72 pages.
Canadian Office Action for Canadian Application Serial No. 2,775,899 dated Oct. 12, 2017, 6 pages.
Notice of Allowance for U.S. Appl. No. 13/695,419 dated Nov. 8, 2017, 92 pages.
Final Office Action for U.S. Appl. No. 13/824,324, dated Nov. 30, 2017, 33 pages.
Decision to Grant a Patent and English Translation thereof dated Nov. 14, 2017 for Japanese Patent Application No. 2016-131310, 6 pages.
International Search Report and Written Opinion for International Patent Application No. PCT/CA2010/001531 dated Jan. 10, 2011, 9 pages.
Notification of Reasons for Refusal and English Translation thereof dated Mar. 29, 2016 for Japanese Patent Application No. 2015-085003, 4 pages.
Decision to Grant a Patent and English Translation thereof dated Jun. 2, 2016 for Japanese Patent Application No. 2015-085003, 6 pages.
Notification of Reasons for Refusal and English Translation thereof dated Apr. 3, 2014 for Japanese Patent Application No. 2012-531192, 7 pages.
Decision to Grant a Patent and English Translation thereof dated Feb. 16, 2015 for Japanese Patent Application No. 2012-531192, 6 pages.
Extended European Search Report for European Patent Application No. 10819770.8 dated Oct. 9, 2014, 7 pages.
Communication pursuant to Rules 70(2) for European Patent Application No. 10819770.8 dated Oct. 28, 2014, 1 page.
Communication pursuant to Article 94(3) EPC for European Patent Application No. 10819770.8 dated Feb. 8, 2016, 7 page.
Decision to Refuse European Patent Application No. 10819770.8 dated Apr. 18, 2017, 6 pages.
Chinese First Office Action and English Translation thereof dated Mar. 24, 2014 for Chinese Application Serial No. 201080051338X, 31 pages.
Chinese Second Office Action and English Translation thereof dated Jan. 16, 2015 for Chinese Application Serial No. 201080051338.X, 26 pages.
Chinese Third Office Action and English Translation thereof dated Sep. 28, 2015 for Chinese Application Serial No. 201080051338.X, 12 pages.
Notification to Grant Patent Right for Invention and English Translation thereof dated Mar. 22, 2016 for Chinese Application Serial No. 201080051338X, 4 pages.
International Search Report and Written Opinion for International Patent Application No. PCT/CA2011/050017 dated Apr. 13, 2011, 9 pages.
International Search Report and Written Opinion for International Patent Application No. PCT/CA2010/001658 dated Jan. 26, 2011, 9 pages.
International Search Report and Written Opinion for International Patent Application No. PCT/CA2011/050260 dated Jul. 26, 2011, 7 pages.
Non-Final Office Action for U.S. Appl. No. 13/521,216, dated Jun. 20, 2014.
Final Office Action for U.S. Appl. No. 13/521,216, dated May 21, 2015.
Non-Final Office Action for U.S. Appl. No. 13/521,216, dated Apr. 13, 2016.
Final Office Action for U.S. Appl. No. 13/521,216, dated Oct. 21, 2016.
Final Office Action for U.S. Appl. No. 13/503,352, dated Jan. 5, 2015.
Non-Final Office Action for U.S. Appl. No. 13/503,352, dated Aug. 21, 2014.
Non-Final Office Action for U.S. Appl. No. 15/224,063, dated Sep. 1, 2016.
Non-Final Office Action for U.S. Appl. No. 13/695,419, dated Oct. 31, 2014.
Final Office Action for U.S. Appl. No. 13/695,419, dated Jun. 2, 2015.
Non-Final Office Action for U.S. Appl. No. 13/695,419, dated Dec. 17, 2015.
Non-Final Office Action for U.S. Appl. No. 13/503,352, dated Aug. 18, 2015.
Non-Final Office Action for U.S. Appl. No. 13/695,419, dated Apr. 5, 2016.
Non-Final Office Action for U.S. Appl. No. 13/695,419, dated Oct. 12, 2016.
Non-Final Office Action for U.S. Appl. No. 13/824,324, dated Mar. 9, 2017.
International Search Report and Written Opinion for International Patent Application No. PCT /CA2011/050569 dated Dec. 5, 2011.
Non-Final Office Action for U.S. Appl. No. 14/664,285 , dated Jun. 4, 2015.
Final Office Action for U.S. Appl. No. 14/664,285 , dated Sep. 21, 2015.
Non-Final Office Action for U.S. Appl. No. 14/664,285 , dated Mar. 4, 2016.
Final Office Action for U.S. Appl. No. 14/664,285 , dated Jul. 29, 2016.
Non-Final Office Action for U.S. Appl. No. 15/070,643, dated Aug. 26, 2016.

(56) References Cited

OTHER PUBLICATIONS

Non-Final Office Action for U.S. Appl. No. 15/589,841, dated Jun. 5, 2017.
International Search Report and Written Opinion for International Patent Application No. PCT /CA2017/050257 dated May 19, 2017.
International Search Report and Written Opinion for International Patent Application No. PCT/CA2017/050197 dated May 30, 2017, 15 pages.
Non-Final Office Action for U.S. Appl. No. 15/466,590, dated Jul. 13, 2017, 20 pages.
Non-Final Office Action for U.S. Appl. No. 15/055,952, dated Aug. 12, 2016, 33 pages.
International Search Report and Written Opinion for International Patent Application No. PCT/CA2017/050255 dated Jun. 19, 2017, 9 pages.
Non-Final Office Action for U.S. Appl. No. 15/070,643, dated Feb. 24, 2017, 23 pages.
Non-Final Office Action for U.S. Appl. No. 13/695,419, dated Jun. 14, 2017, 44 pages.
Japanese Office Action dated Jul. 28, 2017, mailed Aug. 2, 2017 for Japanese Patent Application No. 2016-131310, 4 pages.
Non-Final Office Action for U.S. Appl. No. 15/224,063, dated Jul. 14, 2017, 36 pages.
Non-Final Office Action for U.S. Appl. No. 15/400,471, dated Aug. 7, 2017, 24 pages.
International Search Report and Written Opinion for International Patent Application No. PCT/CA2017/050351 dated Jun. 19, 2017, 10 pages.
Angwin et al., "Scrapers' Dig Deep for Data on Web," http://online.wsj.com/article/SB10001424052748703358504575544381288117888.html?mod=djemalertNEWS, Oct. 12, 2010, printed Nov. 6, 2010, 5 pages.
Anthes, "The Search Is On," Non-Obvious Relationship Awareness,http://www.computerworld.com/s/article/70041IThe_Search_Is_On, Apr. 15, 2002, printed Nov. 6, 2010, 8 pages.
Baras et al., "Dynamic Self-Organization and Clustering in Distributed Networked Systems for Performance Improvement," Proceedings of the 47th annual Allerton conference on Communication, Control, and Computing, Alierton'09, Illinois, USA, pp. 968-975, Sep. 30-Oct. 2, 2009.
Chakraborty et al., "TrustBAC-Integrating Trust Relationships into the RBAC Model for Access Control in Open Systems," Proceedings of the eleventh ACM symposium on AccessControl Models and Technologies, SACMAT '06, pp. 49-58,Jun. 7-9, 2006.
Ding et al., "Transitive Closure and Metric Inequality of Weighted Graphs: Detecting Protein Interaction Modules Using Cliques," Int. J. Data Mining and Bioinformatics, Vo. 1, o. Feb. 2006, pp. 162-177, Sep. 2006.
Facebook announces groups, downloading, http://content.usatoday.com/communities/technologylive/post/2010/1 0/live-facebook-announcesdownloading- other-features/1, Oct. 6, 2010, 7 pages.
Feldman et al., "Robust Incentive Techniques for Peer-to-Peer Networks," Proceedings of the fifth ACM Conference on Electronic Commerce EC'04, New York, New York, USA, pp. 102-111, May 17-20, 2004.
Final Office Action for U.S. Appl. No. 15/079,952, dated Dec. 16, 2016, 14 pages.
Gan et al., "A Novel Reputation Computing Model for Mobile Agent-Based E-Commerce Systems," Proceedings of the International Conference on Information Security and Assurance,ISA 2008, pp. 253-260, Apr. 24-26, 2008.
Geisberger, et al., "Contraction Hierarchies: Faster and Simpler Hierarchical Routing in Road Networks," LNCS 5038:319-333(2008).
Golbeck et al., "Inferring Trust Relationships in Web-based Social Networks," Journal of ACM Transactions of Internet Technology (TOIT), vol. 6, issue 4, Nov. 2006.

Gu et al., "Processing Massive Sized Graphs Using Sector/Sphere," Proceedings of the 2010 IEEE Workshop on Many-Task Computing on Grids and Supercomputers (MTAGS), New Orleans,LA, USA, pp. 1-10, Nov. 15, 2010.
Gupta et al., "A Reputation System for Peer-to-Peer Networks," Proceedings of the 13th International Workshop on Network and operating systems support for digital audio and video NOSSDAV'03, Monterey, California, USA, Jun. 1-3, 2003.
Gupta et al., "Reputation Management Framework and its use as Currency in large-Scale Peer to-Peer Networks," "Proceedings of the Fourth IEEE International Conference on Peer-to-Peer Computing P2P2004, Zurich, Switzerland, pp. 124-132, Aug. 25-27, 2004 (Aug. 25, 2004)".
Hartley et al., "MSSG: A Framework for Massive-Scale Semantic Graphs," Proceedings of 2006 IEEE International Conference on Cluster Computing, CLUSTER'2006, Barcelona, Spain, pp. 1-10, Sep. 25-28, 2006.
Huynh et al., "An Integrated Trust and Reputation Model for Open Multi-Agent Systems," Journal of Autonomous Agents and Multi-Agent Systems, vol. 13, issue 2, Sep. 2006.
International Search Report and Written Opinion for International Patent Application No. PCTICA2016/050305 dated Jun. 3, 2016, 8 pages.
Josang et al., "Simplification and Analysis of Transitive Trust Networks," Journal of Web Intelligence and Agent Systems, vol. 4, issue 2, Apr. 2006.
Kamola et al., "Reconstruction of a Social Network Graph from Incomplete Call Detail Records," Conference Proceedings of the International Conference on Computational Aspects of SocialNetworks (CASoN), Oct. 19, 2011, pp. 136-140.
Kang et al., "PEGASUS: A Peta-Scale Graph Mining System Implementation and Observations," Proceedings of the Ninth IEEE International Conference on Data Mining, ICDM'09, Miami, FL,USA, pp. 229-238, Dec. 6-9, 2009.
Kim et al., "Design and Implementation of the location-based Personalized Social Media Service," Conference Proceedings of the International Conference on Internet and Web Applications and Services (ICIW), May 9, 2010, pp. 116-121.
Lumsdaine et al., "Challenges in Parallel Graph Processing," Parallel Processing letters, vol. 17, No. 1, pp. 5-20, Mar. 2007.
Malewicz et al., "Pregel: a System for large-Scale Graph Processing," Proceedings of the 2010 International Conference on Management Data, SIGMOD'10, Indianapolis, Indiana, USA, pp. 135-145, Jun. 6-11, 2010.
Meyer, "Outrage as Credit Agency Plans to Mine Facebook Data," Mashable.com, Jun. 7, 2012, 3 pages.
Mining Social Networks, "Untangling the social Web," http://www.economist.com/node/16910031?story_id=16910031&fsrc=rss, Sep. 2, 2010, printed Nov. 6, 2010, 5 pages.
Mori et al., "Improving Deployability of Peer-Assisted CDN Platform with Incentive," Proceedings of IEEE Global Telecommunications Conference GLOBECOM 2009, Honolulu, Hawaii, USA, pp. 1-7, Nov. 30-Dec. 4, 2009.
Mui et al., "A Computational Model of Trust and Reputation," Proceedings of the 35th Annual Hawaii International Conference on System Sciences, HICSS '02, vol. 7, pp. 2431-2439, Jan. 7-10, 2002.
Notice of Allowance for U.S. Appl. No. 15/224,172, dated Oct. 14, 2016.
Notice of Allowance for U.S. Appl. No. 15/056,484, dated Jul. 13, 2016.
Non-Final Office Action for U.S. Appl. No. 15/079,952, dated Jul. 14, 2016.
Notice of Allowance for U.S. Appl. No. 14/664,285 , dated Oct. 7, 2016.
Notice of Allowance for U.S. Appl. No. 15/070,643, dated Apr. 7, 2017.
Notice of Allowance for U.S. Appl. No. 15/406,405, dated Apr. 6, 2017.
Safaei et al., "Social Graph Generation & Forecasting Using Social network Mining," Proceedings of the 33rd Annual IEEE International Computer Software and Applications Conference, COMPSAC '09, pp. 31-35, Jul. 20-24, 2009.

(56) References Cited

OTHER PUBLICATIONS

"Startup Wants to Base Your Credit Score on Social Media Profiles," Technology Review 7, Jun. 7, 2012, 18 pages.
Taiwanese Office Action for Taiwanese Patent Application No. 105108584 dated Oct. 31, 2016, 7 pages.
Wallentin et al., "A Cross-Layer Route Discovery Strategy for Virtual Currency Systems in Mobile Ad Hoc Networks," Proceedings of the Seventh International Conference on Wireless On-demand Network Systems and Services IEEE/IFIP WONS 2010, Kranjska Gora, Slovenia, pp. 91-98, Feb. 3-5, 2010.
Zetter, "Tracking Terrorists the Las Vegas Way," http://pcworld.about.com/news/Aug072002id1 03692.htm, printed Nov. 6, 2010, 3 pages.
Zhang et al., "A Review of Incentive Mechanisms in Peer-to-Peer Systems," Proceedings of the First International Conference on Advances in P2P Systems AP2PS'09, Sliema, Malta, pp. 45-50, Oct. 11-16, 2009.
Zhang et al., "MARCH: A Distributed Incentive Scheme for Peer-to-Peer Networks," "Proceedings of the 26th Annual IEEE Conference on Computer Communication INFOCOM 2007, Anchorage, Alaska, USA, pp. 1091-1099, May 6-12, 2007 (Jun. 5, 2007)".
Non-Final Office Action for U.S. Appl. No. 13/498,429, dated Apr. 17, 2014.
Non-Final Office Action for U.S. Appl. No. 13/498,429, dated Jul. 25, 2014.
Final Office Action for U.S. Appl. No. 13/498,429, dated Jan. 16, 2015.
Non-Final Office Action for U.S. Appl. No. 14/282,935, dated Jul. 21, 2014.
Final Office Action for U.S. Appl. No. 14/282,935, dated Jan. 30, 2015.
Non-Final Office Action for U.S. Appl. No. 14/282,935, dated Aug. 5, 2015.
Final Office Action for U.S. Appl. No. 14/282,935, dated Feb. 12, 2016.
Non-Final Office Action for U.S. Appl. No. 15/254,642, dated Dec. 28, 2016.
EPO. Mitteilung des Europischen Patentamts vom 1. Oktober 2007 ber Geschftsmethoden = Notice from the European Patent Office dated Oct. 1, 2007 concerning business methods = Communiqu de l'Office europen des brevets,en date du 1er octobre 2007, concernant les mthodes dans le domaine des activites economiques. vol. 30,Nr:11,pp. 592-593. Journal Officiel De L'Office Europeen Des Brevets.Official Journal of the European Patent Office.Amtsblattt Des Europaeischen Patenta, Nov. 1, 2007 OEB, Munchen, DE.
Tang, et al. Social Influence Analysis in Large-scale Networks, Proceedings of the ACM SIGKDD International Conference on Knowledge Discovery and Data Mining, 2009, ACM, 9 pages.
International Search Report and Written Opinion for International Patent Application No. PCT/CA2017/050962 dated Nov. 20, 2017, 9 pages.
Office Action dated Apr. 5, 2018, for U.S. Appl. No. 15/644,356, 74 pages.
Notice of Allowance dated Mar. 20, 2018, for U.S. Appl. No. 15/589,841, 44 pages.
Final Office Action dated Dec. 15, 2017 for U.S. Appl. No. 15/224,063, 52 pages.
Final Office Action dated Jan. 19, 2018 for U.S. Appl. No. 15/466,590, 56 pages.
Final Office Action dated Jan. 26, 2018 for U.S. Appl. No. 15/400,471, 78 pages.
Final Office Action dated Feb. 8, 2018, for U.S. Appl. No. 15/630,299, 40 pages.
Non-Final Office Action received for U.S. Appl. No. 15/046,041, dated Apr. 26, 2018, 70 pages.
Non-Final Office Action received for U.S. Appl. No. 15/907,164, dated May 24, 2018, 29 pages.
Final Office Action received for U.S. Appl. No. 15/675,041 dated May 17, 2018, 73 pages.
Non-Final Office Action received for U.S. Appl. No. 15/400,471, dated May 29, 2018, 34 pages.
Notice of Allowance for U.S. Appl. No. 15/953,011 dated Aug. 28, 2018, 72 pages.
First Action Interview Pilot Program Pre-Interview Communication for U.S. Appl. No. 15/953,011 dated Jul. 10, 2018, 10 pages.
First Action Interview Pilot Program Pre-Interview Communication for U.S. Appl. No. 15/907,166 dated Jul. 6, 2018, 6 pages.

* cited by examiner

800

| Metric | Component Score (out of 1000) | Component Score (%) |
|---|---|---|
| 100 or less friends | 200 | 20% |
| 100 – 250 friends | 400 | 40% |
| 250-400 friends | 600 | 60% |
| 400-500 friends | 800 | 80% |
| 500+ friends | 1000 | 100% |

802 — Metric
804 — Component Score (out of 1000)
806 — Component Score (%)

FIG. 8

LEARNING AN ENTITY'S TRUST MODEL AND RISK TOLERANCE TO CALCULATE ITS RISK-TAKING SCORE

CROSS REFERENCE TO RELATED APPLICATION

This application is a continuation of U.S. patent application Ser. No. 15/079,952, filed Mar. 24, 2016 and entitled "LEARNING AN ENTITY'S TRUST MODEL AND RISK TOLERANCE TO CALCULATE A RISK SCORE," the entirety of which is incorporated herein by reference.

BACKGROUND

Trust is an essential component to many social and business interactions, but trust can be both hard to measure and difficult to quantify. People typically look toward a variety of different factors, experiences, and influences to determine how much to trust another party or entity in a transaction. For example, a potential customer deciding whether to dine at a particular restaurant may take into account how many times he or she has eaten at the restaurant, word of mouth from friends and family, and any ratings from online feedback sites. As another example, a bank may look up the credit score of a potential borrower as a measure of their financial responsibility when determining whether to issue a loan. Often, people can have wildly different preferences as to which factors are the most important in determining trust levels, and these preferences may change depending on the type and details of the transaction. Trust can also change over time, reflecting the cumulative experiences, transaction history, and recent trends between entities. A single negative event can destroy trust, and trust can also be rebuilt over time. All of the above considerations make "trust" an elusive measure to capture.

SUMMARY

Systems, devices, and methods are described herein for calculating a trust score. The trust score may be calculated between entities including, but not limited to, human users, groups of users, locations, organizations, or businesses/corporations and may take into account a variety of factors, including verification data, network connectivity, publicly available information, ratings data, group/demographic information, location data, and transactions to be performed, among others. The trust score may reflect the trustworthiness, reputation, membership, status, and/or influence of the entity in a particular community or in relation to another entity. The trust score may take into account data from any suitable data sources, including, but not limited to, network connectivity information, social network information, credit score, available court data, opt-in provided data, transaction history, ratings/feedback data, group/demographics data, search engine data, or any publicly available information. The trust score may also include certain non-publically available information provided by the entities themselves (e.g., non-public transaction history, targeted ratings, etc.). In some embodiments, the trust score may also be calculated based on "crowdsourced" information. As used herein, the term "crowdsource" means receive input from a plurality of other entities. For example, in addition to the data sources discussed above, users may provide and/or comment on attributes, characteristics, features, or any other information about another user. The participation of the "crowd" may form a type of validation for the information and give comfort to second-order users, who know that the members of the crowd can spectate and make contributions to the attributes, characteristics, features, and other information. To illustrate, a user may indicate that another entity is a good plumber. Many other users may provide a "thumbs up" to this attribute and/or provide comments about their experiences with the entity, indicating that they too think that the user is a good plumber. These types of inputs and comments may be integrated into the calculation of a trust score for the user, thereby integrating the opinion of the "crowd" into the trust score.

As used herein, a "system trust score" refers to a trust score calculated for an entity based on information available for the entity, without specific reference to another entity or activity/transaction. The system trust score may represent a base level of trustworthiness for the entity that does not take into account information about a specific activity/transaction. In some embodiments, the system trust score may be calculated based on publicly available information, such as verification data, a network connectivity score, and/or ratings data. As defined herein, a "network community" may include any collection or group of entities connected through a network, including, but not limited to a computer network or a social network. In some embodiments, a user may set an initial trust score as a minimum trust level. In these embodiments, the initial trust score may be retrieved and updated based on publicly available information in order to determine the system trust score. In some embodiments, the system trust score may be provided to an end user upon request without the end user having to identify themselves. For example, an end user may query the system trust scores of other entities, for example through a website or a mobile application, without having to sign into the website or mobile application or otherwise having to identify themselves. The system trust score may also be calculated based on privately available information and/or crowdsourced information. For instance, as discussed above, other users may provide attributes, characteristics, features, or other information about a user, and that information may be integrated into the system trust score.

As used herein, a "peer trust score" refers to a trust score calculated for a first entity in relation to a second entity. The peer trust score may take into account certain information that is specific to the first and second entity, such as specific transaction history between the first and second entity, number of common contacts/friends, etc. In some embodiments, the peer trust score may be derived from the system trust score and represent an update of the system trust score. For example, in some embodiments, the peer trust score may be calculated based on substantially the same data sources as the system trust score, where some components may be updated in order to further weight or take into account additional information that is specific to the first and second entity. In other embodiments, the peer trust score may be calculated independently from the system trust score and may be based on a different set of data sources than the system trust score.

In some embodiments, the peer trust score for the first entity may be calculated based on crowdsourced information that either validates data from one of the data sources used to calculate the system trust score or provides additional data that was not available from the data sources used to calculate the system trust score. In such instances, the relationships between the entities who provided the crowdsourced information and the second user may provide valuable insight into the trust between the first user and the second user. As an illustrative example, the first entity may have the attribute "trustworthy" listed on his profile, which has a large number of "likes" by other users. The second entity may be looking to enter a business transaction with the first entity and seek to calculate a peer trust score between the first entity and the second entity. The peer trust score may take into account that some of the users that "liked" the attribute "trustworthy" for the first user are also friends of the second user in a social media network. Thus, the calculation of the peer trust score is not only based on the determination that the first entity is "trustworthy" according to a large number of other users, but the fact that some of those users are also friends of the second user, whom the second user may trust more than the opinion of strangers.

As used herein, a "contextual trust score" refers to a trust score calculated for a first entity in relation to a specific activity or transaction. The contextual trust score may take into account certain information that is particular to the specific activity or transaction. In some embodiments, the contextual trust score may be derived from the system trust score or the peer trust score and represent an update of the system trust score or the peer trust score. For example, in some embodiments, the contextual trust score may be calculated based on substantially the same data sources as the system trust score, where some components may be updated in order to take into account information that is particular to the activity/transaction. In other embodiments, the contextual trust score may be calculated based on a different set of data sources than the system trust score and the peer trust score. In some embodiments, the contextual trust score may be calculated by weighting data from different data sources based on the type of activity/transaction. For example, the trust score of a potential borrower who is seeking a mortgage from a bank may heavily weight the borrower's credit score and financial history rather than their level of connectivity in a social network. In this manner, the contextual trust score may be based on the same or similar data sources as the system trust score and/or the peer trust score, but with a different weighting to combine the data from the data sources. In some embodiments, specific details of the transactions may also affect the calculation of the contextual trust score. For instance, the contextual trust score for a friend borrowing $10 may focus more on social network connectivity (e.g., the number of friends they have in common, etc.), while the contextual trust score for a borrower seeking a $100K loan from the bank may focus more on financial factors. In some embodiments, the details of the transaction may affect the weighting of the combination of data from the data sources.

In some embodiments, the contextual trust score may be based on crowdsourced information, similar to the system trust score and the peer trust score described above. For instance, other users may provide attributes, characteristics, features, or other information about a user. These attributes, characteristics, features, or other information may be particularly relevant for certain transaction types. For instance, extending the illustrative example from above, the borrower may have the attribute "financially responsible," validated by 100 people, which affects the lender's decision whether to lend money to the borrower. In this manner, once a transaction type is identified for use in calculating a contextual trust score, relationships between the transaction type and one or more attributes associated with the user may be identified, and the contextual trust score may be updated in view of these relationships.

In some embodiments, any of the system, peer, and/or contextual trust scores may be adjusted based on how "trusting" the entity requesting the trust score is. In such instances, a "trusting adjustment score" may be calculated to represent how trusting the requesting entity is, and may be based on substantially the same data sources as are used to calculate the system, peer, or contextual trust scores, as described above. A trust score may be calculated in any manner as detailed above, and then adjusted based on the trusting adjustment score. As an illustrative example, the requesting entity may seek to calculate a trust score for a first entity. The requesting entity may share a lot of personal information on its social media account, which may indicate that it is very trusting of others. Thus, it may be determined that it has a "high" trusting adjustment score and thus cause the reported trust score for the first entity to improve in relation to an unadjusted trust score. Thus, the reported trust score is not only based on the determination that the first entity is "trustworthy" according to a large number of users, but the fact that the requesting entity is generally willing to trust others is taken into account. The "trusting adjustment score" is personalized to the requesting entity and may affect some or all of the trust score calculations performed by said requesting entity. How much weight the trusting adjustment score contributes to the trust score calculations may be predetermined, or the weight may be user-assigned by the requesting entity.

According to one aspect, a method for updating a trust score may comprise identifying paths from a first entity to a second entity, calculating a network connectivity score based on the identified paths, receiving data about the second entity from a remote source, and calculating a ratings score based on the received data from the remote source. A trust score for the second entity may be determined by combining the network connectivity score and the ratings score. An indication of an activity to be performed by the first entity and the second entity may be received, and the trust score may be updated based on the indication of the activity. In some embodiments, the first and second entity may be connected by a social network. In such embodiments, identifying paths from the first entity to the second entity may comprise identifying an intermediate entity in the social network that connects the first entity to the second entity. For example, the intermediate entity may be a common friend between a first user and a second user. Calculating the network connectivity score may comprise determining a number of mutual friends between the first entity and the second entity. For example, the network connectivity score may be assigned according to a graduated scale based on the number of mutual friends between the first entity and the second entity. The network connectivity score may also be calculated based on the number of identified paths between the first and the second entity and whether the number of identified paths exceeds a certain threshold.

In some embodiments, the ratings data may be one of a credit score, criminal history data, financial transaction history data, and/or business reviews data. The ratings data may be combined with the network connectivity score according to a weighted sum in order to determine the trust score for the second entity. The weighted sum may be based on a default set of weights or based on user-assigned weights. The trust score for the second entity may then be updated based on the indication of the activity. For example, the indication of the activity may adjust the weighted sum such that a different weighted sum is used to calculate the trust score for the second entity.

In some embodiments, a default set of weights for calculating a system, peer, or contextual trust score may be provided by a system administrator. In some embodiments, the default set of weights may be customized both to individual entities as well as to individual transaction/ activity types. To determine an entity's trust model and/or risk tolerance, any of the data sources described above herein, including, for example, network connectivity, credit score or financial information, court data, transaction history, search engine mining, ratings/feedback data, or group/ demographics data, may be gathered and searched. In some embodiments, an entity's past transactions may be searched to identify a pattern for certain types of transactions. For instance, the entity may enter into such transactions only if the user's trust score is above a certain value. Identifying patterns may comprise estimating a set of virtual weights for each past transaction and taking an average of all of the estimated sets. In this manner, the system may "guess" how the entity is combining data from different data sources and which data sources it prefers for certain transaction types. By estimating the weights for each of the entity's past transactions, the system may estimate, over time, the entity's trust model and provide a more accurate set of weights for future transactions of the same type. In some embodiments, in response to the user indicating that it wishes to calculate a trust score for a certain transaction type, the system may provide the estimated set of weights based on its determination of the entity's trust model and risk tolerance.

In some embodiments, the system or a system administrator(s) may develop default weighting profiles for different transaction types based on how a plurality of entities in the computer network are adjusting weights. For example, the system may store weighting profiles for certain transaction types that have been adjusted by entities. The system may calculate, for each weight in a set of weights of the weighting profile, a difference or delta value from a default set of weights. The system may take an average of these delta values to determine, on average, how entities are changing the weightings. The system may apply these delta values to the current default set of weights to produce an updated default set of weights. The system may then propagate the updated default set of weights to the plurality of entities in the computer network. In this manner, the system may keep up with general trends of the population with regard to trust models and risk tolerance.

In some embodiments, at least one of the first entity and the second entity is a human user. For instance, the trust score may be calculated between two users who are participating in a certain activity. In another embodiment, at least one of the first entity and the second entity may be a business. For example, the trust score between a user and a restaurant may be calculated in order to aid the user in determining whether to eat at the restaurant. In yet other embodiments, at least one of the first entity and the second entity may be a group of users or an organization. As an illustrative example, the second entity may be the Boy Scouts of America, and the trust score may be calculated between a first user and the Boy Scouts of America. In some embodiments, at least one of the first and second entity may be a product or an object. For instance, the first entity may be a first user, and the second entity may be a chainsaw, and a trust score may be calculated between the chainsaw and the first user. In this example, the trust score may take into account any user reviews of the chainsaw received from a third-party ratings source. In some embodiments, at least one of the first and second entity may be a location, city, region, nation, or any other geographic place. For instance, a trust score between a first user and a city, such as New York City, may be calculated. In this example, the trust score may take into account number of contacts that the first user has in New York City, traveler reviews received from third-party ratings sources, and/or and activities, transactions, or interactions that the first user has had with New York City.

In some embodiments, a decision related to the activity may be automatically resolved based, at least in part, on a calculated trust score. For instance, a bank may request the trust score of a potential borrower in order to evaluate the suitability of the borrower for a loan. Based on the updated trust score, the bank may automatically issue the loan, for example, if the trust score exceeds a certain threshold. In this manner, the system trust score, peer trust score, and/or the contextual trust score can, either alone or in combination, form the basis for automatic decision making.

In some embodiments, at least one of the system, peer, and/or contextual trust score may include a confidence range. For example, each of the components from the data sources may comprise a confidence range (such as a variance or a standard deviation) indicating a level of uncertainty in the data, and the component scores may be combined to form one of the system, peer, and/or contextual trust score. Thus, the resulting trust score may be represented by a mean score and a confidence range, and in some embodiments, the confidence range may be represented by a mean and standard deviation.

According to another aspect, methods and systems for calculating a trust score based on crowdsourced information are described herein. First data associated with a first entity in a computer network may be retrieved from a first database using processing circuitry. The first data may be retrieved from any local or remote data source, as described herein. The processing circuitry may calculate a first component score based on the first data. The processing circuitry may also retrieve, from a second database, second data associated with the first entity and calculate a second component score based on the second data. Using the first component score and the second component score, the processing circuitry may produce a trust score for the first entity by calculating a weighted average of the first component score and the second component score. Although only two component scores are discussed in this illustrative example, it will be understood by those of ordinary skill in the art that data may be retrieved from any number of data sources and that any number of component scores may be calculated and combined to produce the trust score for the first entity.

The processing circuitry may receive, from a user account of a second entity in the computer network, data indicating an attribute associated with the first entity. As used herein, an "attribute" includes any descriptive information associated with the first entity. Attributes may include, but are not limited to, characteristics, features, skills, employment information, behavioral indicators, opinions, ratings, group membership, or any other descriptive adjectives. The processing circuitry may also receive data indicating an attribute associated with the first entity from other sources, such as a remote database or a system administrator. In some embodiments, the first entity itself may provide the attribute using manual user input. As an illustrative example, an attribute for Bob may be "entrepreneur." Bob may have provided this information himself, for instance through a text input on his mobile phone, and the attribute may be added to Bob's profile. In some embodiments, someone else, such as Bob's friend, may have indicated that Bob is an entrepreneur using their own mobile phone. In some embodiments, a system administrator may have recognized Bob as an entrepreneur, or the fact that Bob is an entrepreneur may have been retrieved from a remote database (such as an employment database). Finally, the attribute may be automatically attributed or inferred onto the entity by automatically recognizing related data received from other sources. For instance, data received from certain databases may be related to certain attributes, and in these instances, the attribute may automatically be assigned to an entity. As an illustrative example, data received from court databases may include an entity's criminal history for a certain period of time. If the data received indicates that a certain individual was convicted of a felony, then the attribute "criminal" may be automatically added to the individual's profile. In some embodiments, these relationships between attributes and received data may be set by a system administrator. For instance, the system administrator may set a trigger such that the receipt of the criminal history data indicating that the individual has committed a felony within the last five years may cause the attribute "criminal" to be automatically added to the individual's profile.

In some embodiments, the second entity may enter a user input either validating or disagreeing with an attribute. For instance, the second entity may validate or disagree with the attribute by selecting a user-selectable icon, such as a thumbs up/down icon, like/dislike icon, plus/minus icon, positive/negative icon, or other such indicators. Other configurations are contemplated, including inputting zero to five stars or indicating a score of 0 to 10 based on how much they agree with the attribute. Such user inputs may be received from a plurality of entities in a computer network. In some embodiments, other users may also comment on the attribute. As an illustrative example, Bob may be associated with the attribute "entrepreneur," and 37 users may agree by selecting a "like" icon, and two users may disagree by selecting a "dislike" icon. In some embodiments, the two users who disliked the attribute may leave comments to explain why they disagree with the attribute "entrepreneur" for Bob.

As mentioned above, the attributes may be connected with data used to calculate component scores and trust scores. In some embodiments, the attributes and the feedback on the attributes from the users (the "crowdsourced" information) may be used to update the component scores and/or the trust scores. In some embodiments, the attribute and/or a score associated with the attribute may be used as a component score itself for the calculation of a trust score, as discussed in further detail below. It will be understood from those of ordinary skill in the art that the component scores and the trust scores may be updated using any suitable technique. In some embodiments, a net attribute score may be calculated based on the received feedback from other users. For instance, the net attribute score may be calculated by finding a difference between the number of "thumbs up" and the number of "thumbs down." This difference may serve as an indicator of whether people agree with the attribute (which should result in a positive net attribute score) or disagree with the attribute (which should result in a negative net score). In some embodiments, such as embodiments that allow other users to rate using a star or numeric system, an average of the ratings provided by others users may be calculated for the net attribute score.

In embodiments where the attribute is related to a specific component score, the attribute may serve to increase or decrease the component score. As an illustrative example, the attribute "criminal" may relate to the court history component score used to calculate a system trust score. In such embodiments, processing circuitry may calculate the court history component score as described herein, and adjust the court history component score based on a determination that the entity is also attributed with the "criminal" attribute. In some embodiments, this adjustment may be a multiplier based on the net attribute score. In other embodiments, the adjustment may add a certain number of percentage points to the component score. In some embodiments, the adjustment may be limited by a threshold adjustment. That is, even if the multiplier and/or percentage adjustment exceeds the threshold adjustment, the threshold adjustment will serve as a maximum adjustment for the component score. As an illustrative example, a court history component score may comprise 100 points out of a total 1000 points for an overall trust score. Based on court history data retrieved from a court database, processing circuitry may calculate a court history component score of 60 out of the 100 points for Sam. However, Sam is also associated with the "criminal" attribute. In such embodiments, the processing circuitry may automatically adjust the court history component score down by 10%, resulting in an adjusted court history component score of 54. In some embodiments, the maximum amount that an attribute (or a collection of attributes) may affect a component score may be 5 points. In such embodiments, the adjusted court history component score may be 55, because the calculated adjustment of 6 is limited by the threshold value of 5. In this manner, the magnitude of adjustment that an entity's attributes may have on its component and/or trust scores may be limited by these thresholds.

In some embodiments, the adjustment to a component and/or trust score caused by an attribute may be based on a distribution of net attribute scores for entities with the attribute. For example, Mike the musician may have 1,000 "likes" for the attribute "guitarist" on his profile. However, the average "likes" for the attribute "guitarist" may be one million. Compared to all of the guitarists in the world, Mike's 1,000 "likes" may make him a relatively unknown musician. On the other hand, Phil the philanthropist may have 100 "likes" for the attribute "philanthropist" on his profile, which may place him in the top 1% for entities with that attribute. Thus, Phil the philanthropist may receive a larger multiplier to his trust score than Mike the musician, even though Mike the musician has a higher number of likes for his attribute. In this fashion, processing circuitry may identify a subgroup of entities who are also associated with the attribute and calculate an appropriate adjustment based on the distribution of net attribute scores among the subgroup. In some embodiments, the processing circuitry may calculate an average net attribute score for the subgroup. In other embodiments, the processing circuitry may determine a distribution, such as a Gaussian distribution, using the net attribute scores for the subgroup. For example, the processing circuitry may determine that philanthropists, on average, receive about 30 "likes" for the attribute "philanthropist," with a standard deviation of about 15. This would place Phil the philanthropist's 100 "likes" several standard deviations above the average number of "likes" for a philanthropist. Based on the average net attribute score and/or the distribution, the processing circuitry may calculate an appropriate adjustment to the related component score. In some embodiments, the processing circuitry may consult a table or an equation which determines the relationship between the net attribute score (for instance, 57 "likes"–12 "dislikes"=net attribute score of 45) and a multiplier for the component score (for instance, net attribute score between 40 to 50 gets a 1% multiplier to the component score). In some embodiments, the adjustment may be applied directly to the trust score. For example, anyone with the "philanthropist" attribute may automatically receive an increase of five points to their trust score out of 1000.

In some embodiments, any one or more of the attribute, net attribute score, adjustment to the component score, adjusted component score, or recalculated trust score may be generated for display on a user device. For example, a user device may display the attribute "philanthropist" with an indication of "+5" next to the attribute, showing that the attribute caused an increase of +5 to the recalculated trust score.

In some embodiments, a third entity in the computer network may request the trust score for the first entity. The processing circuitry may retrieve data indicating paths in the computer network and identify, based on the retrieved data indicating paths in the computer network, a path connecting the third entity to the second entity in the computer network. In some embodiments, the processing circuitry may identify only paths that comprise a number of links less than a threshold number. The processing circuitry may adjust the component score and/or the trust score based on the determination that the second and third entities are connected by the identified path. In this manner, the processing circuitry may adjust the component/trust scores not only based on the attribute, but also based on the identities of the entities who are validating or disagreeing with the attribute. For example, the fact that a close friend gave a thumbs up to the attribute "babysitter" may cause a greater adjustment to a trust score than if a stranger had given a thumbs up to the same attribute. Therefore, when calculating peer trust scores for a target entity in relation to a requesting entity, the processing circuitry may take into account the relationships between the requesting entity and those entities that validated or disagreed with the target entity's attributes.

In some embodiments, crowdsourced information may also be used in conjunction with information that an activity will be performed in the future by a first entity and a second entity. For instance, an attribute may be associated with certain transaction types, and the fact that an entity is associated with the attribute may further adjust the component score and or trust score. As an illustrative example, the attribute "banker" may cause an increase in the contextual trust score for any entity who is entering a financial transaction with the entity. In such cases, the processing circuitry may, in addition to the adjustments described above, calculate further adjustments to a component and/or trust score based on the attributes. The relationships between attributes and component scores and/or transaction types may be provided by other entities or system administrators, or retrieved from relevant databases.

According to another aspect, systems and methods for updating a trust score calculation algorithm are described herein. Processing circuitry may transmit a weighting profile to a first user account and a second user account. The weighting profile may comprise a first set of weights for combining data from each of a plurality of data sources to calculate a trust score. The processing circuitry may receive a first user input from the first user account to adjust the first set of weights to a second set of weights that is different from the first set of weights. The processing circuitry may further receive a second user input from the second user account to adjust the first set of weights to a third set of weights that is different from the first set of weights. Based on the first user input and the second user input, the processing circuitry may update the weighting profile to comprise a fourth set of weights for combining data from each of a plurality of data sources to calculate a trust score, the fourth set of weights being different from the first set of weights. For example, the processing circuitry may take an average of the second set of weights and the third set of weights. The processing circuitry may transmit the updated weighting profile to a third user account that is different from the first user account and the second user account. In this manner, the processing circuitry may monitor changes that entities are making to a default weighting profile, update the default weighting profile based on these changes, and propagate the updated default weighting profile back to the entities.

In some embodiments, updating the weighting profile comprises calculating a first difference between the first set of weights and the second set of weights, calculating a second difference between the first set of weights and the third set of weights, and calculating an average difference from the first difference and the second difference. The processing circuitry may then apply the average difference to the first set of weights to produce the fourth set of weights. In some embodiments, the processing circuitry may cause the third user account to calculate a trust score based on the updated weighting profile using the fourth set of weights.

In some embodiments, the set of weights in the weighting profile may comprise percentages that are intended to add up to 100 percent. In such embodiments, an increase of one weight may require a decrease in one or more other weights in the set of weights to maintain a total sum of 100 percent. The processing circuitry may automatically adjust weights to maintain this sum of weights to equal 100 percent. In some embodiments, after the processing circuitry applies the average difference to the first set of weights, the processing circuitry may sum the updated set of weights and normalize each weight in the updated set of weights by dividing each weight in the updated set of weights by the sum. In this manner, even if the updated set of weights sums to more or less than 100 percent, the processing circuitry may normalize the set of weights to sum to 100 percent.

According to another aspect, systems and methods for updating a trust score based on extrapolated trends are described herein. Processing circuitry may retrieve from a database a first trust score associated with a first entity in a computer network, wherein the first trust score was calculated at a first time. The processing circuitry may determine that the first trust score has not been updated for the first entity for a threshold period of time. For example, the processing circuitry may determine that a difference between the first time and a current time exceeds the threshold period of time. In response to determining that the difference between the first time and the current time exceeds the threshold period of time, the processing circuitry may identify a second entity in the computer network and retrieve a second trust score calculated at a second time and a third trust score calculated at a third time, wherein the second trust score and the third trust score are associated with the second entity. The second entity may have a trust score that was calculated later than the first trust score for the first entity, and thus the second entity may be a suitable indicator of trends in trust scores since the time that the first trust score was calculated. For example, the processing circuitry may determine that at least one of the second time or the third time is later than the first time, indicating that the second entity has a trust score that was calculated later than the first trust score for the first entity.

The processing circuitry may calculate a trend using the second trust score and the third trust score. Although only two trust scores are discussed in this illustrative example, it will be understood by those of ordinary skill in the art that the trend may be based on any two or more trust scores associated with the second entity. In some embodiments, the processing circuitry may also calculate trends in one or more component scores used to calculate the trust scores. The trend may comprise, for example, a general slope of increasing trust score or decreasing trust score over time. The trend for the second entity may be indicative of how the trust score for the first entity should change over a similar period of time. The processing circuitry may update the first trust score using the calculated trend. For example, the processing circuitry may apply the slope of increasing or decreasing trust score to the first trust score over the same period of time as the trend of the trust scores of the second entity.

In some embodiments, the processing circuitry may apply a trend to individual component scores, update the individual component score, and recalculate the trust score for the first entity. As an illustrative example, credit scores for a plurality of entities may have decreased by 10% in the past two years. The processing circuitry may identify this trend by analyzing the retrieved credit scores of a plurality of entities. The processing circuitry may then utilize this trend to update a credit score component score for an entity for which it does not have updated credit score data and recalculate a trust score for the entity based on the updated credit score component score. In this manner, the processing circuitry may update trust scores for entities for which updated data is not available.

In some embodiments, calculating a trend comprises one of: calculating a difference between the second trust score and the third trust score, calculating a difference per time between the second trust score and the third trust score, calculating a percent increase/decrease from the second trust score to the third trust score, or calculating a percent increase/decrease per time from the second trust score to the third trust score.

In some embodiments, the processing circuitry may identify trends in trust scores only for entities that are connected to the first entity. For example, the processing circuitry may identify a subset of entities that are connected to the first entity in a computer network by at least one path that is fewer than a threshold number of links. Thus, the trends in trust scores may be determined based on entities that are related to the first entity.

According to another aspect, systems and methods for adjusting for a requesting entity a trust score for a second entity are described herein. Processing circuitry may determine a baseline trust score for the second entity. As used herein, a "baseline trust score" refers to any trust score, including any of a system, peer, or contextual trust scores, which is calculated without taking into account how trusting the requesting entity is. The processing circuitry may receive data about the requesting entity from a first remote source and may further calculate, based on the received data from the first remote source, a trusting adjustment score for the requesting entity, which may relate to how trusting the requesting entity is. The processing circuitry may determine an adjusted trust score for the second entity by combining the trusting adjustment score and the baseline trust score for the second entity. The processing circuitry may then transmit to the requesting entity an indication of the adjusted trust score.

In some embodiments, the trusting adjustment score and the baseline trust score for the second entity may be combined by multiplication. For example, if the requesting entity is determined to be substantially trusting, the trusting adjustment score may be a value between, for example, 1 and 2, and the adjusted trust score may thus be higher than the baseline trust score by a percentage related to the trusting adjustment score. As another example, if the requesting entity is determined to be substantially untrusting of others, the trusting adjustment score may have a value between 0 and 1, and the adjusted trust score may thus be lower than the baseline trust score by a certain percentage related to the trusting adjustment score. In other embodiments, the trusting adjustment score and the baseline trust score for the second entity may be combined according to a weighted sum. In this embodiment, the trusting adjustment score would be above zero if the requesting entity was determined to be more trusting, and less than zero if the requesting entity was determined to be more untrusting. As an illustrative example, if the trusting adjustment score is given a weight of 10 percent and the trusting adjustment score is −200 because the requesting entity is determined to be substantially untrusting, then the adjusted trust score would be 20 points lower than the baseline trust score. In some embodiments, the weight given to the trusting adjustment score may be determined by the user. For example, a requesting entity may wish to not include the trusting adjustment score, and may give it a weight of 0 or disable this adjustment calculation. Alternatively, the requesting entity may wish to give a lot of weight to the trusting adjustment score.

In some embodiments, the received data comprises at least one of: social network data, such as number of social media posts and content of the posts, financial transaction history data, and/or previous trust score search data. This data, as described above, may be used in the calculation of the trusting adjustment score. For example, a requesting entity who posts a lot to its social media account may have a high trusting adjustment score. In some embodiments, a requesting entity that enters into financial transactions very rarely may have a low trusting adjustment score. It would be understood by one of ordinary skill in the art that other data may be used, such as network connectivity information, credit score, available court data, opt-in provided data, transaction history, ratings/feedback data, group/demographics data, search engine data, or any publicly available information and certain non-publically available information. In some embodiments, the received data may comprise a user indication of how trusting a user believes the requesting entity to be. For example, if a friend of the requesting entity indicates that it believes the requesting entity to be "very trusting," the requesting entity's trusting adjustment score may rise.

In some embodiments, the processing circuitry may proceed to store the calculated trusting adjustment score for the requesting entity and use the stored trusting adjustment score to determine an adjusted trust score for another entity. For example, if the requesting entity seeks to determine the trust score for a second entity, and during that process, a trusting adjustment score is calculated, the processing circuitry may store the calculated trusting adjustment score, and if the requesting entity seeks to determine the trust score for a third entity, the entity may use the previously calculated trusting adjustment score instead of calculating a new one. This may allow for less processing time. In some embodiments, the processing circuitry may gather second data about the requesting entity from a second remote source and then update the stored trusting adjustment score based on that data. For example, if the initial trusting adjustment score indicated that that the requesting entity was very untrusting based on their social network data, but the requesting user has entered into a lot of financial transactions recently, the stored trusting adjustment score may be updated to reflect that the user is more trusting. In some embodiments, the second remote source may be the same as the first remote source. For example, the initial data used to calculate the initial calculated trusting adjustment score may have indicated that the requesting entity shared a lot of information on their social media account. At some later time, the processing circuitry may receive the second data, which may indicate that the user has stopped sharing information on its social media account, and thus the trusting adjustment score may be lowered.

In certain embodiments, the processing circuitry may receive an indication of an activity to be performed together by the requesting entity and the second entity, and then update the trusting adjustment score based on that indication. This embodiment may be particularly pertinent to adjustment of the contextual trust score. For example, the first data received may indicate that the requesting entity enters into very few financial transactions, but very frequently posts to social media. If the processing circuitry receives an indication that the requesting entity wishes to enter into a financial transaction with the second entity and seeks the second entity's trust score, the trusting adjustment score may be updated, and may reflect that the requesting entity is substantially untrusting in the context of financial transactions. If the processing circuitry receives an indication that the requesting entity wishes to "connect" with the second entity on social media and seeks the second entity's trust score, the trusting adjustment score may be updated, and may reflect that the requesting entity is substantially trusting in the context of social media.

In some embodiments, the trusting adjustment score may be calculated based on trusting component scores, similar to the component scores described above but related instead to the requesting entity. A first trusting component score may be calculated based on a first data received by the processing circuitry, and a second trusting component score may be calculated based on a second data received by the processing circuitry. These may be combined to determine a trusting adjustment score for the requesting entity. While two component scores are discussed, it will be understood by those of ordinary skill in the art that data may be retrieved from any number of data sources and that any number of component scores may be calculated and combined to produce the trusting adjustment score for the requesting entity. The trusting component score may be connected with specific attribute scores, which may be similar to those described above, and feedback on those attributes may be given in a manner similar to the feedback above, wherein crowd-sourced information may be used to give feedback on an attribute, and the feedback on the attribute may be used to update the corresponding trusting component score.

According to one aspect, systems and methods for determining a risk score for a first entity are described herein. The risk score for the first entity may be a representation of the first entity's propensity to engage in risky behavior, may be an indication of how willing the first entity is to take risks, or may be an indication of how risk averse the first entity is. In certain embodiments, the risk score may be similar to the trusting adjustment score as detailed above and calculated in similar fashion except with the use of risk tolerance or averseness in place of how trusting the first entity is. In other embodiments, the risk score may be similar to the trust score and calculated in similar fashion, except with the use of risk tolerance or averseness in place of trustworthiness. Processing circuitry may receive data about a first entity from a remote source and may determine, based on the received data from the remote source, a risk score for the first entity by analyzing the received data and performing certain mathematical operations on the analyzed data. In some embodiments, the received data may comprise network connectivity information, social network data, financial transaction data, previous trust score search data, credit score, available court data, opt-in provided data, transaction history, ratings/feedback data, group/demographics data, search engine data or any publicly available information and certain non-publically available information, or any suitable data which may be used as an indication of how risk averse the first entity is or any combination thereof. Additionally, the received data may be received from a variety of data sources, including social media networks, political party memberships, religious organization memberships, ratings agencies, credit bureaus, consumer complaints, criminal histories, legal records, media search engine results, official document issuers, email services, data syndicators, address databases, transportation passenger lists, gambling databases, business listings, hospital affiliations, university affiliations, loan and/or borrower databases, data exchanges, blogs, obituaries, consumer databases, video metadata, audio metadata, pictorial metadata, voter registration lists, online or offline dating site information, online or offline shareholder registers, companies' regulatory filings, registered sex offender lists, Do Not Fly or similar Homeland Security watch lists, Court records, email databases, online or offline c.v. lists/databases, or employee lists, or any other suitable source or combinations thereof. For example, the received data may indicate that the first entity has only opened a single credit card or no credit cards at all. This data may indicate that the first entity is fairly risk averse, and thus cause the first entity's risk score to fall. As another illustrative example, the received data may indicate that the first entity has engaged in a risky activity many times, such as sky diving. This data may cause the first entity's risk score to rise. The data may also provide information on other risk factors, and may include drinking habits, sexual activity, exercise habits, involvement in sports, involvement in various hobbies, spending history, credit card usage, medical history, and any other relevant factor in determining how risk averse the first entity is. For example, if the received data indicates that a user drinks a lot, that user's risk score may be 800, whereas a user who rarely drinks may have a risk score of 250. If a user spends close to their maximum credit limit every month, but rarely visits the hospital, that user may have a moderate risk score, for example, that user may have a risk score of 550 on a scale of 0 to 1000. In some embodiments, the received data may comprise a user indication of how risk averse the user believes the first entity to be. For example, if another entity who is connected to the first entity indicates that it believes the first entity to be "Very Risk Averse," the first entities risk score may fall. While the previous examples indicate that a higher risk score indicates that the first entity may have a higher propensity to engage in risky behavior, this is merely illustrative, and one of ordinary skill in the art can imagine a system in which a higher risk score indicates that the first entity may be more risk averse, and a lower risk score may indicate that the first entity has a higher propensity to engage in risky behavior.

In some embodiments, the risk score for the first entity may be reported to the first entity, to another requesting entity, to multiple requesting entities, or may be made available to the public. In some embodiments, the risk score may be associated with the first entity, and may be associated with a device associated with the first entity, multiple devices associated with the first entity, or with an account or profile associated with the first entity. Because the risk score may be an indication of the first entity's propensity to take risks, the risk score may be personalized for each individual entity. In some embodiments, the risk score may be further used to calculate a trusting adjustment score, or may be used to adjust a baseline trust score. This adjustment may be similar to the adjustment performed by the trusting adjustment score, as detailed above.

In some embodiments, the processing circuitry may store the risk score for the first entity a storage device, which may be remote or local to the entity. The processing circuitry may be configured to receive additional data from the remote source, and use that data to update the stored risk score. This may occur regularly, occasionally, at user set intervals, at server set intervals, at random intervals, or any other appropriate period of time or combination thereof. In some embodiments, updating of the stored risk score may occur in response to a user request, user action, or in response to a user or entity requesting the first entity's risk score. Storage of the first entity's risk score may allow for less processing time when doing further risk score calculations.

In certain embodiments, the processing circuitry may receive an indication of an activity to be performed by the first entity, and then update the risk score based on the indication of the activity. For example, the activity may be entering into a financial transaction, and the processing circuitry may then weight financial transaction data more heavily than other data when calculating the first entity's risk score with respect to that activity. In this example, if the received data indicates that the first entity is very rich, but also indicates that the first entity has never gone sky diving, the risk score for the first entity may rise if the activity indicated is a small loan (i.e., from 650 to 800), indicating that the first entity may be more likely to partake in that particular activity, as the small loan may be less risky for the first entity. If, however, the indicated activity is a physical activity, such as bungee jumping, the risk score for the first entity may fall in relation to that activity (i.e., from 650 to 325), as the first entity may be less likely to partake in bungee jumping in view of the received data that indicates that the first entity have never gone sky diving.

In some embodiments, the risk score may be calculated based on risk component scores, similar to the component scores described above. A first risk component score may be calculated based on a first data received by the processing circuitry, and a second risk component score may be calculated based on a second data received by the processing circuitry. These may be combined to determine a risk score for the first entity. While two component scores are discussed, it will be understood by those of ordinary skill in the art that data may be retrieved from any number of data sources and that any number of component scores may be calculated and combined to produce the risk score for the first entity. The risk component score may be connected with specific attribute scores, which may be similar to those described above, and feedback on those attributes may be given in a manner similar to the feedback above, wherein crowdsourced information may be used to give feedback on an attribute, and the feedback on the attribute may be used to update the corresponding risk component score.

BRIEF DESCRIPTION OF THE DRAWINGS

The foregoing and other features and advantages will be apparent upon consideration of the following detailed description, taken in conjunction with the accompanying drawings, and in which:

FIG. 8 is a table showing an illustrative graded scale for assigning component scores based on a metric;

DETAILED DESCRIPTION

To provide an overall understanding of the systems, devices, and methods described herein, certain illustrative embodiments will be described. It will be understood that the systems, devices, and methods described herein may be adapted and modified for any suitable application and that such other additions or modifications will not depart from the scope hereof.

Figure 1:
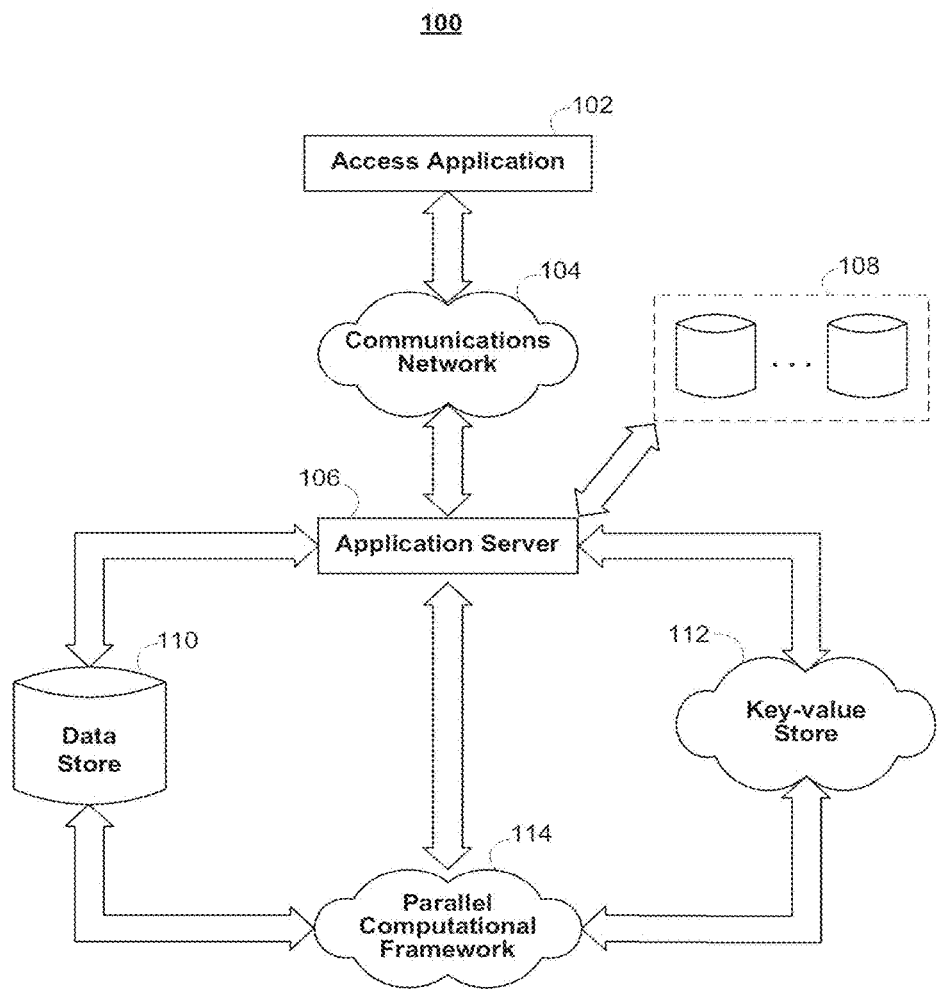
FIG. 1 is a block diagram of an illustrative architecture for calculating a trust score.

FIG. 1 shows a block diagram of an architecture 100 for calculating a trust score in accordance with certain embodiments of the present disclosure. A user may utilize access application 102 to access application server 106 over communications network 104. For example, access application 102 may include a computer application such as a standard web browser or an app running on a mobile device. Application server 106 may comprise any suitable computer server, including a web server, and communication network 106 may comprise any suitable network, such as the Internet. Access application 102 may also include proprietary applications specifically developed for one or more platforms or devices. For example, access application 102 may include one or more instances of an Apple iOS, Android, or WebOS application or any suitable application for use in accessing application server 106 over communications network 104. Multiple users may access application server 106 via one or more instances of access application 102. For example, a plurality of mobile devices may each have an instance of access application 102 running locally on the respective devices. One or more users may use an instance of access application 102 to interact with application server 106.

Communication network 104 may include any wired or wireless network, such as the Internet, WiMax, wide area cellular, or local area wireless network. Communication network 104 may also include personal area networks, such as Bluetooth and infrared networks. Communications on communications network 104 may be encrypted or otherwise secured using any suitable security or encryption protocol.

Application server 106, which may include any network server or virtual server, such as a file or web server, may access data sources 108 locally or over any suitable network connection. Application server 106 may also include processing circuitry (e.g., one or more computer processors or microprocessors), memory (e.g., RAM, ROM, and/or hybrid types of memory), and one or more storage devices (e.g., hard drives, optical drives, flash drives, tape drives). The processing circuitry included in application server 106 may execute a server process for calculating trust scores, while access application 102 executes a corresponding client process. The access application 102 may be executed by processing circuitry on a user's equipment, such as a computer or a mobile device (e.g., a cell phone, a wearable mobile device such as a smartwatch, etc.). The processing circuitry included in application server 106 and/or the processing circuitry that executes access application 102 may also perform any of the calculations and computations described herein in connection with calculating a trust score. In some embodiments, a computer-readable medium with computer program logic recorded thereon is included within application server 106. The computer program logic may calculate trust scores and may generate such trust scores for display on a display device. In some embodiments, application 102 and/or application server 106 may store a calculation date of a trust score and may generate for display the trust score together with a date of calculation.

Application server 106 may access data sources 108 over the Internet, a secured private LAN, or any other communications network. Data sources 108 may include one or more third-party data sources, such as data from third-party social networking services, third-party ratings bureaus, social media networks, political party memberships, religious organization memberships, ratings agencies, credit bureaus, consumer complaints, criminal histories, legal records, media search engine results, official document issuers, email services, data syndicators, address databases, transportation passenger lists, gambling databases, business listings, hospital affiliations, university affiliations, loan and/or borrower databases, data exchanges, blogs, obituaries, consumer databases, video metadata, audio metadata, pictorial metadata, voter registration lists, online or offline dating site information, online or offline shareholder registers, companies' regulatory filings, registered sex offender lists, Do Not Fly or similar Homeland Security watch lists, Court records, email databases, online or offline c.v. lists/databases, or employee lists, or any other suitable source or combinations thereof. For example, data sources 108 may include user and relationship data (e.g., "friend" or "follower" data) from one or more of Facebook, MySpace, openSocial, Friendster, Bebo, hi5, Orkut, PerfSpot, Yahoo! 360, LinkedIn, Twitter, Google Buzz, Really Simple Syndication readers or any other social networking website or information service. Data sources 108 may also include data stores and databases local to application server 106 containing relationship information about users accessing application server 106 via access application 102 (e.g., databases of addresses, legal records, transportation passenger lists, gambling patterns, political and/or charity donations, political affiliations, vehicle license plate or identification numbers, universal product codes, news articles, business listings, and hospital or university affiliations).

Application server 106 may be in communication with one or more of data store 110, key-value store 112, and parallel computational framework 114. Data store 110, which may include any relational database management system (RDBMS), file server, or storage system, may store information relating to one or more network communities. For example, one or more of data tables 1100 (FIG. 11) may be stored on data store 110. Data store 110 may store identity information about users and entities in the network community, an identification of the nodes in the network community, user link and path weights, user configuration settings, system configuration settings, and/or any other suitable information. There may be one instance of data store 110 per network community, or data store 110 may store information relating to a plural number of network communities. For example, data store 110 may include one database per network community, or one database may store information about all available network communities (e.g., information about one network community per database table).

Parallel computational framework 114, which may include any parallel or distributed computational framework or cluster, may be configured to divide computational jobs into smaller jobs to be performed simultaneously, in a distributed fashion, or both. For example, parallel computational framework 114 may support data-intensive distributed applications by implementing a map/reduce computational paradigm where the applications may be divided into a plurality of small fragments of work, each of which may be executed or re-executed on any core processor in a cluster of cores. A suitable example of parallel computational framework 114 includes an Apache Hadoop cluster.

Parallel computational framework 114 may interface with key-value store 112, which also may take the form of a cluster of cores. Key-value store 112 may hold sets of key-value pairs for use with the map/reduce computational paradigm implemented by parallel computational framework 114. For example, parallel computational framework 114 may express a large distributed computation as a sequence of distributed operations on data sets of key-value pairs. User-defined map/reduce jobs may be executed across a plurality of nodes in the cluster. The processing and computations described herein may be performed, at least in part, by any type of processor or combination of processors. For example, various types of quantum processors (e.g., solid-state quantum processors and light-based quantum processors), artificial neural networks, and the like may be used to perform massively parallel computing and processing.

In some embodiments, parallel computational framework 114 may support two distinct phases, a "map" phase and a "reduce" phase. The input to the computation may include a data set of key-value pairs stored at key-value store 112. In the map phase, parallel computational framework 114 may split, or divide, the input data set into a large number of fragments and assign each fragment to a map task. Parallel computational framework 114 may also distribute the map tasks across the cluster of nodes on which it operates. Each map task may consume key-value pairs from its assigned fragment and produce a set of intermediate key-value pairs.

For each input key-value pair, the map task may invoke a user-defined map function that transmutes the input into a different key-value pair. Following the map phase, parallel computational framework 114 may sort the intermediate data set by key and produce a collection of tuples so that all the values associated with a particular key appear together. Parallel computational framework 114 may also partition the collection of tuples into a number of fragments equal to the number of reduce tasks.

In the reduce phase, each reduce task may consume the fragment of tuples assigned to it. For each such tuple, the reduce task may invoke a user-defined reduce function that transmutes the tuple into an output key-value pair. Parallel computational framework 114 may then distribute the many reduce tasks across the cluster of nodes and provide the appropriate fragment of intermediate data to each reduce task.

Tasks in each phase may be executed in a fault-tolerant manner, so that if one or more nodes fail during a computation the tasks assigned to such failed nodes may be redistributed across the remaining nodes. This behavior may allow for load balancing and for failed tasks to be re-executed with low runtime overhead.

Key-value store 112 may implement any distributed file system capable of storing large files reliably. For example, key-value store 112 may implement Hadoop's own distributed file system (DFS) or a more scalable column-oriented distributed database, such as HBase. Such file systems or databases may include BigTable-like capabilities, such as support for an arbitrary number of table columns.

Figure 2:
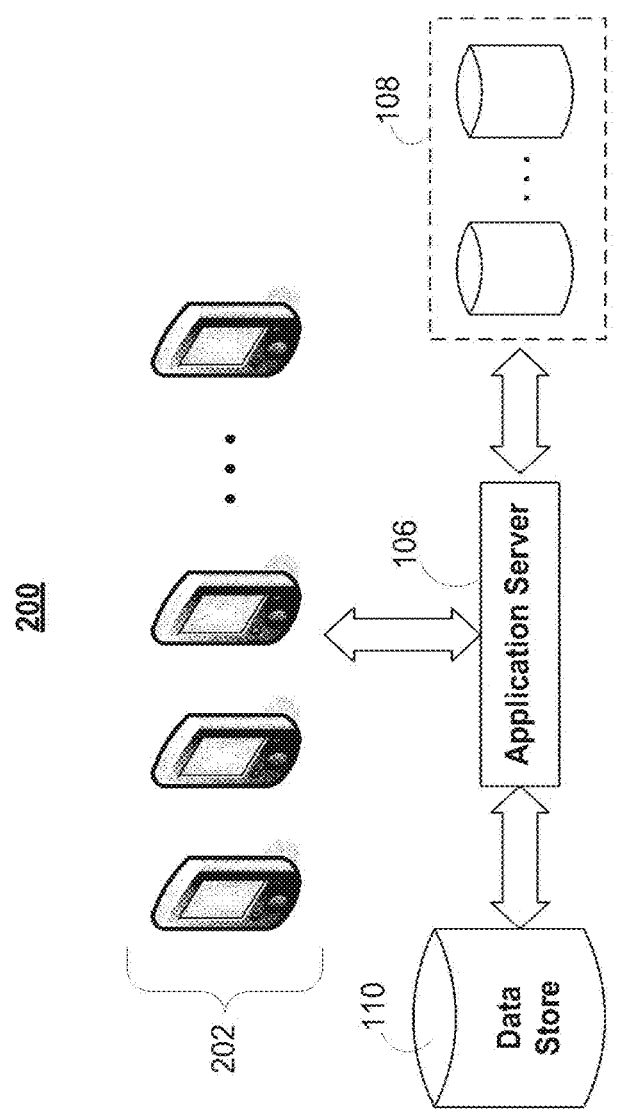
FIG. 2 is another block diagram of an illustrative architecture for calculating a trust score.

Although FIG. 1, in order to not over-complicate the drawing, only shows a single instance of access application 102, communications network 104, application server 106, data source 108, data store 110, key-value store 112, and parallel computational framework 114, in practice architecture 100 may include multiple instances of one or more of the foregoing components. In addition, key-value store 112 and parallel computational framework 114 may also be removed, in some embodiments. As shown in architecture 200 of FIG. 2, the parallel or distributed computations carried out by key-value store 112 and/or parallel computational framework 114 may be additionally or alternatively performed by a cluster of mobile devices 202 instead of stationary cores. In some embodiments, cluster of mobile devices 202, key-value store 112, and parallel computational framework 114 are all present in the network architecture. Certain application processes and computations may be performed by cluster of mobile devices 202 and certain other application processes and computations may be performed by key-value store 112 and parallel computational framework 114. In addition, in some embodiments, communication network 104 itself may perform some or all of the application processes and computations. For example, specially configured routers or satellites may include processing circuitry adapted to carry out some or all of the application processes and computations described herein.

Cluster of mobile devices 202 may include one or more mobile devices, such as PDAs, cellular telephones, mobile computers, or any other mobile computing device. Cluster of mobile devices 202 may also include any appliance (e.g., audio/video systems, microwaves, refrigerators, food processors) containing a microprocessor (e.g., with spare processing time), storage, or both. Application server 106 may instruct devices within cluster of mobile devices 202 to perform computation, storage, or both in a similar fashion as would have been distributed to multiple fixed cores by parallel computational framework 114 and the map/reduce computational paradigm. Each device in cluster of mobile devices 202 may perform a discrete computational job, storage job, or both. Application server 106 may combine the results of each distributed job and return a final result of the computation.

Figure 3:
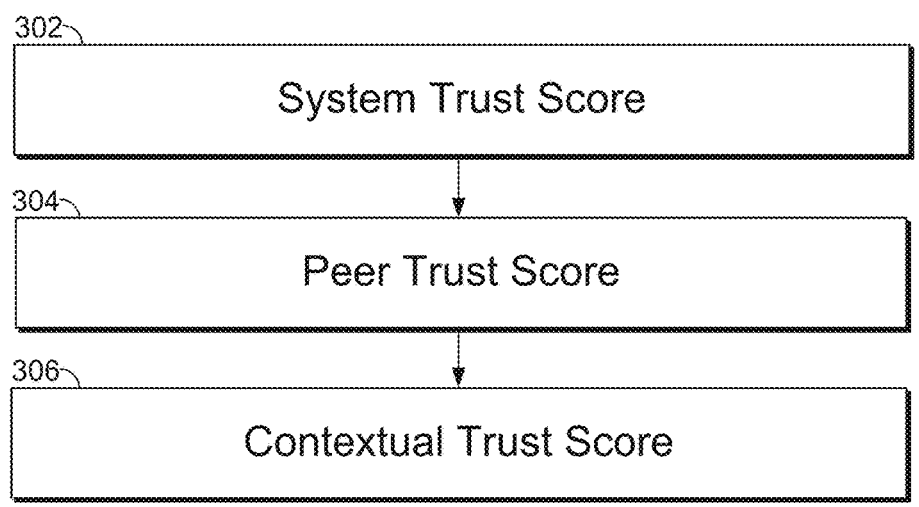
FIG. 3 is a diagram of an illustrative tiered trust score system.

FIG. 3 is a diagram 300 of a tiered trust score system in accordance with certain embodiments of the present disclosure. The system trust score 302, peer trust score 304, and contextual trust score 306 may represent a tiered trust system in which a user may inquire about the trustworthiness of a target entity either in isolation, in relation to another entity, and/or in relation to a specific activity/transaction. In some embodiments, the system trust score 302 may be calculated from a first set of data sources, (e.g., data sources 108 in FIG. 1). In some embodiments, the peer trust score 304 may be calculated as an update to system trust score 302 based on a second set of data sources, which may or may not be the same as the first set of data sources. Peer trust score 304 may or may not take into account additional data sources (e.g., data sources 108 in FIG. 1). In some embodiments, peer trust score 304 may also combine the data from the data sources according to a different weighting than the system trust score 302. In some embodiments, the contextual trust score 306 may be calculated as an update to either peer trust score 304 or system trust score 302. For example, the contextual trust score 306 may take into account different data sources (e.g., data sources 108 in FIG. 1) or may be based on the same data sources as system trust score 302 and/or peer trust score 304. In some embodiments, the contextual trust score 306 may combine data from the data sources according to a different weighting as system trust score 304 and/or peer trust score 304. Although the system trust score 302, peer trust score 304, and contextual trust score 306 are shown in FIG. 3 as a hierarchical system, each trust score may be calculated and presented either separately or together with the other trust scores.

The system trust score 302, peer trust score 304, and contextual trust score 306 may be represented in any suitable fashion. As an illustrative example, the system trust score 302, peer trust score 304, and contextual trust score 306 may each be represented as a percentage out of 100 or as a numerical score out of 1000. In other embodiments, the system trust score 302, peer trust score 304, and contextual trust score 306 may be represented by different categories of trustworthiness (e.g., "reliable," "flaky," "honest," "fraudulent," etc.) or by a graphical scheme (e.g., a color spectrum representing level of trustworthiness). For ease of illustration, the trust score and component scores that comprise the trust scores will be discussed herein as numerical values. However, other methods of portraying a calculated trust score will be contemplated by those of ordinary skill in the art and will not depart from the scope hereof.

Each type of trust score may combine data from data sources according to a specific weighting. For instance, a weighting for a system trust score may be set as:

Data Verification—5%
Network Connectivity—20%
Credit Score—15%
Court Data—10%
Ratings/Feedback Data—20%
Group/Demographics—5%
Search Engine Mining—5%
Transaction History—20%

In some embodiments, a user may adjust these default weightings according to their preferences. For example, a user who values network analytics (e.g., how many friends we have in common) may assign a heavier weight, e.g., 25% to network connectivity, while lowering the weight of credit score to 10%. Conversely, a bank who cares very much about the credit score of its customers may assign a heavier weight to credit score and discount network connectivity.

In some embodiments, these default weightings may be set by a system administrator. In some embodiments, the default weightings may be customized to a user and/or to a specific transaction type. The system may analyze data received from any of the above-mentioned data sources to determine an entity's trust model and/or risk tolerance. For example, certain data may indicate that an entity is more or less risk averse and that the weightings should be adjusted accordingly.

The default weightings may also be adjusted on an ongoing basis. The system may receive adjusted weighting profiles from a plurality of entities and take an average of the adjusted weighting profiles. As an illustrative example, a high number of entities may adjust the search engine mining percentage to 10% while reducing the ratings/feedback data to 15%. The system may adjust the default weightings to reflect these changed percentages and redistribute the weighting profiles to the entities.

The following is an example that illustrates one application of a system trust score 302, peer trust score 304, and contextual trust score 306. It will be understood that the following is provided for illustrative purposes only and that the systems, devices, and methods described herein may be further adapted or modified.

John sees an ad at ABC Restaurant for a short order cook and is trying to decide if he should apply. John opens an app on his mobile device and searches for ABC Restaurant. The app shows there are multiple matches to this search, but the nearest one is sorted to the top. After tapping on the correct restaurant, the app shows the ABC Restaurant profile page. The ABC Restaurant profile page includes a system trust score for ABC Restaurant, which is calculated based in part on the ratings from three blogs. John taps to see more details and sees a list of most recent blogs from bloggers. By tapping on individual blogs, he can read the actual article. He can also tap on the bloggers to see their profile page in the app.

The system trust score for ABC Restaurant is also calculated based on previous transactions where ABC Restaurant was the employer. John taps to show a list of previous transactions, ratings of those transactions, and comments.

John taps on the social graph to see how he is connected to the restaurant through one or more networks (e.g., Facebook, MySpace, Twitter, LinkedIn, etc.). From the social graph he sees that Bob, the manager, is a friend of a friend. Based on the social graph data, the app updates the system trust score to calculate a peer trust score between John and ABC Restaurant. The peer trust score is better than the system trust score to indicate the incremental increase in trustworthiness based on the connections between John and Bob the manager. The app also displays Bob's system trust score, calculated based on publicly available information and a default weighting, and Bob's peer trust score with respect to John, which also takes into account the social graph data.

John decides to apply for the job. After an interview, Bob the manager is deciding whether or not to hire John as a short order cook. Bob uses the app to search for John. There are multiple results for John, but Bob eventually finds him and taps on his entry. John's profile page displays his system trust score, calculated based on publicly available information (e.g., credit score, verification data, search engine mining, employment history, etc.) and a default weighting.

Bob taps on the social graph to see how he is connected to John. He discovers that they are connected through a friend of a friend. The app updates John's system trust score based on the social network data to calculate a peer trust score between John and Bob, which is better than John's system trust score to indicate the incremental increase in trustworthiness due to the connections between John and Bob. The app also shows average ratings from previous transactions where John was the employee. Bob taps to show a list of transactions, which can be ordered into chronological order and filtered by type of job. Bob also indicates to the app that he wishes to hire John as an employee. The app adjusts the weightings of the trust score to give a higher weight to the employee history rather than other components (such as credit score). The app uses the adjusted weightings to update the peer trust score to calculate the contextual trust score, which represents John's trustworthiness as a potential employee.

After reviewing the information in the app, Bob has decided to hire John. From John's profile page, he taps on the Action icon and chooses "Hire". The app prompts Bob to fill in relevant information such as position, start date, annual salary, and vacation days per year. After confirming the data, the transaction appears in Bob's Notification list, with the status of "Waiting for John . . . " John receives a notification on his phone. He opens the app and sees a new transaction in his Notifications list. The app prompts John to confirm the details of his new job. John chooses to confirm, and Bob receives a notification that John has confirmed the transaction.

As illustrated in the above example, a user may request a system trust score for another entity, which may then be subsequently refined into a peer trust score based on information specific to the parties involved and into a contextual trust score based on the details of an activity/transaction to be performed by the parties.

Figure 4:
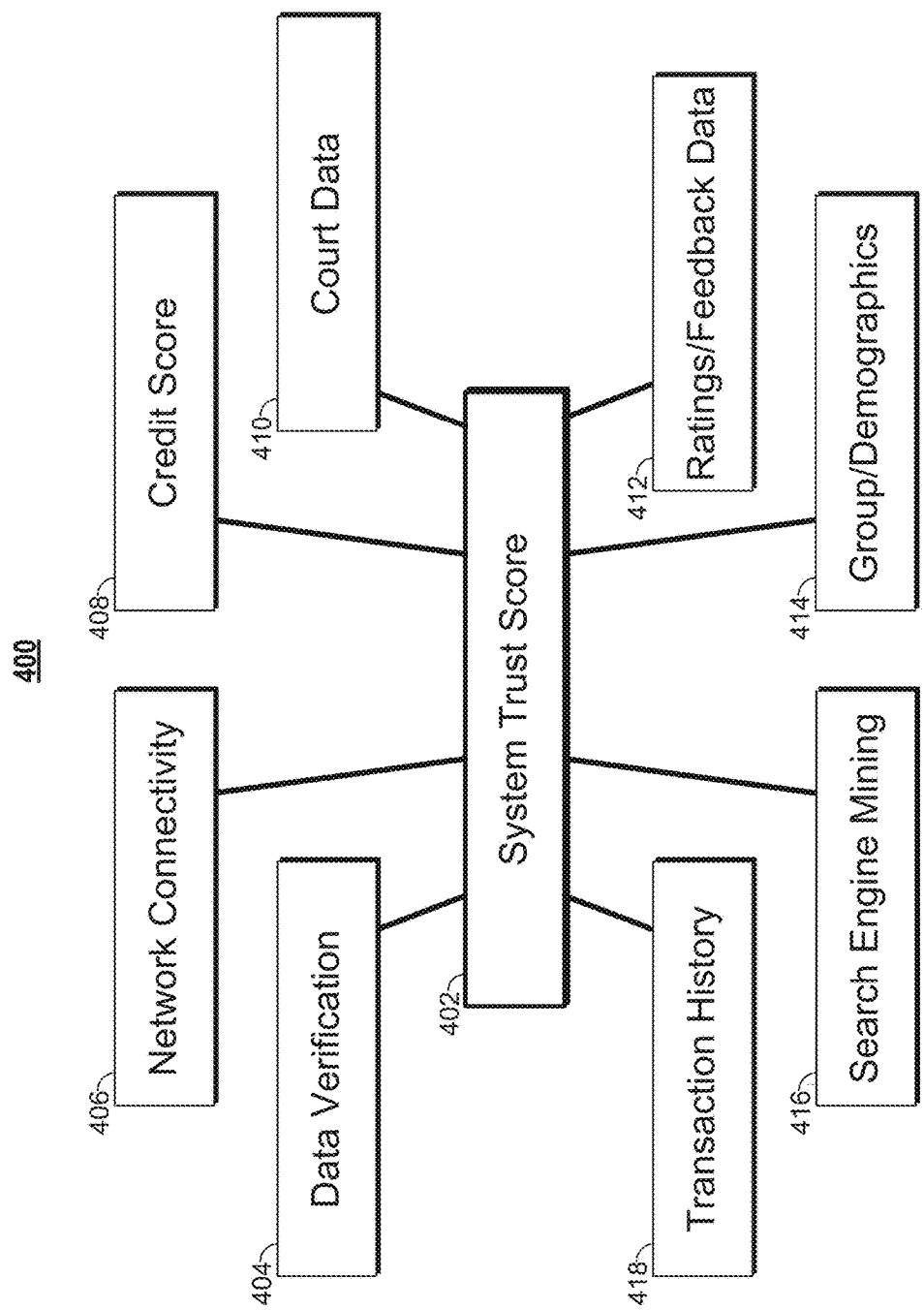
FIG. 4 is a block diagram of illustrative components that comprise a system trust score.

FIG. 4 is a block diagram 400 of components 404-418 that comprise a system trust score 402 in accordance with certain embodiments of the present disclosure. The system trust score 402 may comprise a data verification component 404, a network connectivity component 406, a credit score component 408, a court data component 410, a ratings/feedback data component 412, a group/demographics component 414, a search engine mining component 416, and/or a transaction history component 418. The components 404-418 may be received either locally or through a suitable network connection from one or more data sources (e.g., data sources 108 in FIG. 1). It will be understood that components 404-418 are provided for illustrative purposes only and that the trust scores described herein may comprise more or fewer components than components 404-418 provided in FIG. 4.

Data verification component 404 may include data that verifies information associated with the target entity. In some embodiments, the data verification component 404 may include verification of contact information, including, but not limited to, email address, phone number, and/or mailing address. The data verification component may also comprise email, IM, and other messaging factors, such as frequency of messages, time of day of messages, depth of thread, or a review of threads for key transaction/activity types (e.g., loan, rent, buy, etc.). Data verification component 404 may take into account data from passport and/or other government IDs, tax return factors (e.g., a summary of a tax return to prove income), educational data (e.g., certificates of degree/diploma), group affiliation factors (e.g., invoices that prove membership to a group), achievements (e.g., proof of awards, medals, honorary citations, etc.), employment data (e.g., paystub data). The data verification component 404 may also incorporate facial recognition software to verify certain documents, such as IDs. In some embodiments, this facial recognition software may be used for subsequent verification of the user's identity. As an illustrative example, the data verification component 404 may be used as a part of an airport scanning system to verify the user's identity. The data verification component 404 may comprise subcomponents such as data corresponding to the above illustrative examples, and as more subcomponents are verified, the higher the data verification component 404. The subcomponents may be combined to determine the data verification component 404 in any suitable manner, such as a weighted sum or the method discussed further below in relation to FIGS. 8 and 9. In some embodiments, verification of the data may be achieved by a document that proves the subject of the subcomponent (e.g., a tax return to prove income) or by peer verification. For instance, employment information may be vetted by peers connected to the target user, and as more peers positively vet the employment information, the better the subcomponent score becomes. In some embodiments, the information may be deleted once verified. For example, images of passports/IDs may be deleted once the information contained therein is validated.

Network connectivity component 406 is discussed further below in relation to FIGS. 11-13. In some embodiments, the network connectivity component 406 may comprise data from a social network (e.g., Facebook, Twitter, Instagram, Pinterest, LinkedIn, etc.). For example, the network connectivity component 406 may take into account the number of connections, such Facebook "friends" that the target user has, those friends that comment or "like" the target user's posts, information on who the target user adds/removes as a friend, duration of the target user's friends (e.g., how long after the user adds them as a friend does the target user remove them as a friend), who the target user messages, which posts the target user shares, and length of tenure on the social network. For a peer trust score, such as peer trust score 304, the network connectivity component may take into account number of mutual friends, degree of separation, and number of paths from a first entity to the target entity.

Credit score component 408 may comprise any suitable financial information associated with the target entity, including income, checking/savings account information (number of accounts, value), and credit score information from one or more institutions. The credit score information may be received from any typical credit score agency, including, but not limited to, Transunion, Equifax, and Experian. Credit score factors may also be taken into account, such as number of credit accounts, credit utilization, length of credit history, number of late payments, etc. Other financial information taken into account may include prior loan and payment data, data on net worth or assets/liabilities, and information on any prior infractions. The various financial data may be combined using any suitable approach, including, but not limited to, the methods discussed below in relation to FIGS. 8 and 9.

Court data component 410 may include any data on activity associated with the target entity in a criminal or civil court. For example, court data component 410 may comprise data on how many cases involve the entity suing someone else and the type of suit, how many cases involve the target entity as the defendant, any criminal cases that may have a negative impact on trustworthiness, and the final holding/disposition of any concluded cases (e.g., acquitted, convicted, settled, etc.). Court data may be derived from any publicly available sources and from any available municipal, state, federal, or international court.

A ratings/feedback data component 412 may include any data that reflects a rating or feedback associated with the target entity. For instance, online rating sites such as Yelp may provide ratings information on various businesses. Any ratings of the target entity, information on volume, number of ratings, average rating, who rates the target entity, and whether the target entity responds to comments may be taken into account. In some embodiments, ratings data may be received from ratings institutions, such as the Better Business Bureau. Feedback data may include any positive or negative comments associated with the target entity. In some embodiments, feedback data may include comments made by peers in a social network. In some embodiments, the number and timing of ratings by other users or entities may be used to affect the ratings/feedback data component 412. For instance, a lack of negative feedback for a specified period of time may result in an increase (or decrease) in the ratings/feedback data component 412. Similarly, a lack of positive feedback for a specified period of time may result in a decrease (or increase) in the ratings/feedback data component 412.

Group/demographics component 414 may include information on group membership of the target entity or demographic information such as age, sex, race, location, etc. The group data may suggest an activity performed by the target entity. For instance, membership to a national sailing club may indicate an interest in sailing and boats. In some embodiments, a peer trust score may be adjusted to take into account the group/demographic component. For instance, the peer trust score for a target entity may be increased if a first entity and the target entity are both members of the same national sailing club. As another example, similarities in demographic information (age, sex, race, location, etc.) may indicate an incremental increase in trustworthiness between a first and the target entity, and the peer trust score for the target entity may be adjusted accordingly.

The search engine mining component 416 may include analytics performed on suitable search engines, such as Google or Yahoo. Websites/blogs/articles may be searched and scanned for entries about the target entry and a positive or negative sentiment may be detected and stored for such entries. Number of articles, sentiment, timing of the articles, may indicate a positive or negative adjustment to the search engine mining component 416. In some embodiments, online shopping or auction websites such as eBay may be scanned for information associated with the target entity, such as rating and volume of transactions, feedback comments, number of bought/sold items, average value of items, and category of items (e.g., hardware, software, furniture, etc.).

Transaction history component 418 may comprise any information on past transactions associated with the target entity. Successful transactions or activities may be identified and positively impact the transaction history component score. For example, if I loan John $100 and he promptly pays me back, I may be more inclined to loan him money in the future. Transaction history data may be locally tracked and stored (e.g., by application 102 in FIG. 2) or may be received from remote sources (e.g., a bank or website). The transaction history data may factor in details of the transaction, such as amount of money, to whom, from whom, how many times, and/or success rate. Transaction/activity types may include, but are not limited to, loan/borrow funds or objects, buy from/sell to goods and services, financial transactions, dating, partner with (e.g., develop an alliance, start a new business with, invest with, etc.), becoming friends/acquaintances, rent to/from (including, e.g., renting cars, houses, hotel rooms, etc.), hire/work for (including, e.g., plumber, babysitter, etc.). The activity or transactions may include any number of parties, and each party may need to verify that they were in fact part of the activity/transaction. Each party may also rate their experience with the transaction/activity. Reminders for uncompleted activity/transactions may be automatically sent to a user or entity. For example, an email may be sent asking whether the user would like to provide feedback.

In some embodiments, the transactions history component 418 may comprise interactions between previous transactions in the transaction history between a first entity and a second entity. In this manner, processing circuitry may take into account elements of regret and forgiveness in determining a trust score. For example, a first transaction may correspond to an increase or decrease in a trust score, while a second, subsequent transaction related to the first transaction may result in an adjustment to the peer trust score in the opposite direction. The adjustment may be either a decrease in the trust score (e.g., regret or suspicion) or an increase in the trust score (e.g., forgiveness or redemption). As an illustrative example, a subject may have stolen a car in the past and be subsequently convicted of the theft and sentenced to serve 3 years in prison for the crime. The initial theft may serve to decrease the subject's trust score, reflecting the increased suspicion associated with a known delinquent, while the subsequent conviction and sentence might serve to increase the subject's trust score, reflecting a level of redemption in the trustworthiness of the subject.

In some embodiments, the transactions that comprise the transactions history component 418 may be associated with an increase or decrease in a trust score over time. For example, a transaction may contribute to an initial increase in a trust score, and over time, the initial increase may decay until the trust score returns to an initial value. Similarly, a transaction may cause an initial decrease in a trust score, and over time, the initial decrease may decay until the trust score returns to an initial value.

In some embodiments, any one of the system, peer, or contextual trust score may also include a location component that takes into account a geographic location of an entity. For example, the location of an end user as determined by GPS coordinates or an address of a business may be incorporated into the calculation of a trust score. In some embodiments, a peer trust score may take into account the location of a first entity and a second entity and adjust the trust score accordingly. For instance, if a first user and a second user happen to be from the same hometown, then the peer trust scores may be increase to reflect this common information. In some embodiments, the location of the entity may provide an automatic increase/decrease in the trust score. For instance, a particular location may be known as a dangerous neighborhood, city, or region, and the trust scores of all entities located or associated with the dangerous location may be automatically decreased to reflect this danger. As an illustrative example, a user who travels to a country close to a known warzone may not be as comfortable trusting strangers in the country. The trust levels of others located in the same location as the user may be automatically decreased to reflect the increased suspicion. In some embodiments, the user may be traveling with his friends, as indicated by the high level of peer trust scores the user has with the plurality of people located around the user. Processing circuitry may determine that the user is surrounded by friends in any suitable manner, including explicit indications of friendship, common hometown, place of work, or any other common information. If the user is traveling to a dangerous location, but is traveling with friends, then the trust scores of other entities associated with the dangerous location may still be decreased, but they may be decreased by a smaller amount than if the user was not traveling with friends.

In some embodiments, any of the system, peer, and/or contextual trust scores may take into account biological responses of an end user. For instance, mobile devices may include cell phones, smart watches, heart rate monitors, and other wearable mobile devices that can monitor one or more biological responses of an end user (e.g., heart rate, breathing rate, brain waves, sweat response, etc.). These detected biological responses of an end user, in conjunction with location information, may be used, in part, to determine a trust score. For example, an increase in heart rate may be an indication of anxiety, and may result in a decrease in trust score. The increase in heart rate may be caused by the user moving to a new location, in which case the trust score associated with that location may be decreased. The increase in heart rate may have been caused by a first user moving into close proximity with a second user, in which case the peer trust score with respect to the second user may be decreased, to reflect the increased anxiety that the first user feels around the second user.

In some embodiments, any of the system, peer, and/or contextual trust scores may take into account crowdsourced information. As discussed above, crowdsourced information may refer to information provided about an entity from other entities (i.e., the "crowd"). The crowd may provide any type of descriptive information about an entity, including characteristics (e.g., Bob is financially responsible), features (e.g., Bob's diner is a clean restaurant), relationships with others (e.g., Bob is my friend), user validation information (e.g., "That's me," or "That's not me"), transaction history, indications of duplicate entries for entities, or any other type of descriptive information. This crowdsourced information, including any of the above illustrative examples, are herein described as "attributes," and may be associated with an entity and indicated on a profile of the entity.

An entity may be assigned an attribute in any suitable manner. As described above, an entity may be assigned an attribute by the crowd or by another entity. In some embodiments, the attribute may be assigned to the entity by a system administrator. In some embodiments, the attribute may be automatically assigned to an entity based on any number of factors, including any of the component scores, any of the data used to calculate the component scores, or the system, peer, or contextual scores. As an illustrative example, an entity with a system trust score above a certain threshold value may automatically be assigned the "Trusted" attribute, which may provide multipliers to certain component scores and/or the overall trust score.

A user interface may provide an opportunity for the crowd (i.e., other entities) to provide feedback on one or more attributes. In some embodiments, the attribute may not receive feedback from the crowd. For example, entities may not be able to leave feedback on the "Trusted" attribute, which may be automatically assigned based on an entity's trust score. The user interface may provide user-selectable inputs that allow the crowd to provide its feedback. For example, as discussed above, the user interface may include a thumbs up/down icon, like/dislike icon, plus/minus icon, positive/negative icon, star-based system, or a numeral-based system that allows the crowd to indicate whether they agree or disagree with the attribute (and the magnitude of their agreement/disagreement). In a binary feedback system, such as a like/dislike system, a net attribute score, as used herein, may refer to the difference between a positive feedback and a negative feedback. In a rating-based systems, such as a star-based or a numeral-based system, the net attribute score, as used herein, may refer to an average rating provided by the crowd. As discussed above, the net attribute score may provide an indication as to the degree to which the crowd agrees with the attribute for the entity.

In some embodiments, the attributes associated with an entity may be integrated into a trust score as one or more component scores. For example, the net attribute score or scores may comprise an individual component score that is combined with other component scores as described above in order to calculate a system, peer, or contextual trust score.

In some embodiments, the attributes may relate to or correspond to one of the component scores. In such embodiments, the component scores may be adjusted based on the fact that an entity is associated with a related attributes. For example, the fact that an entity is a "Trusted" entity may increase one of the component scores and/or one of the system, peer, or contextual trust scores.

The component scores may be adjusted based on the attributes in any suitable manner. In some embodiments, the attribute may cause a component score and/or one of the system, peer, or contextual trust scores to increase by a predetermined amount. In some embodiments, the attribute may cause a multiplier to be applied to a component score and/or one of the system, peer, or contextual trust scores. In some embodiments, the adjustment may be limited by a maximum allowable adjustment or by a threshold component score. For example, the adjustment to any one component score may be limited to a certain percentage (such as 10%) of the maximum component score. The component score itself may also have a threshold score that it cannot exceed. For instance, the court history component score may be limited to 100 points, regardless of any adjustments that could be made based on attributes.

In some embodiments, the adjustment may be based on a net attribute score. For instance, a positive attribute may cause a related component to increase as it receives more "likes" from the crowd. In some embodiments, the adjustment may be normalized based on the number of likes received by other entities with the same attribute. For example, processing circuitry may identify a subset of entities of the crowd with the same attribute and calculate an average and/or a distribution of the net attribute score for the subset of entities. In some embodiments, the processing circuitry may estimate a Gaussian distribution for the net attribute scores of the subset of entities. By assuming the Gaussian distribution, the processing circuitry may determine the percentile of a net attribute score of an entity. The percentile may determine the magnitude of the adjustment caused by the attribute. For example, of all of the entities with the attribute "student," the average net attribute score may be 200 with a standard deviation of 100. If an entity has a net attribute score of 500, that may indicate that they are three standard deviations higher than the average, or within the 0.1% percentile. The adjustment caused by such a high net attribute score, compared to other entities with the attribute "student" may be relatively high.

In some embodiments, the adjustments based on attributes and/or the maximum or threshold adjustment levels may be determined by a system administrator. Such limits may prevent the attributes from affecting component scores and/or trust scores greater than a predetermined amount. In such embodiments, the component scores may be calculated based on relevant data received from data sources, as described above, and the attributes may provide relatively small adjustments to the component score. In some embodiments, data indicating such adjustments, such as tables or distributions, may be stored in a local or a remote database.

In some embodiments, any of the system, peer, and/or contextual trust scores may be adjusted based on a trusting adjustment score. As discussed above, the trusting adjustment score may serve as a representation of an entity's propensity for trusting others. The trusting adjustment score may be combined with a trust score for another entity such that the entity receives a personalized trust score for another entity based partially on the requesting entity's own trust model. In this way, an entity that is more trusting may receive indications of improved trust scores for another entity to their account or device, which will align with their trust model. An entity that is less trusting may receive trust scores for other entities that are on average worse than someone who is very trusting. This may allow for greater personalization for each user of received trust scores, as someone who is very trusting will be less likely to see worse trust scores. While a "greater" trust score is typically indicated as representing a more trustworthy entity, and a higher trusting adjustment score is typically indicated as representing a more trusting entity, one of ordinary skill in the art could imagine a trust score system wherein lower scores represent more trustworthy entities, and where a lower trusting adjustment score represents a more trusting entity.

The system may calculate a trusting adjustment score for the entity that requests a trust score for another entity, herein referred to as the "requesting entity." This calculation can take into account data from a remote source, a local source, or a plurality of remote or local sources or combination thereof. This data, as described above, may be any of network connectivity information, social network information, credit score, available court data, opt-in provided data, transaction history, ratings/feedback data, group/demographics data, search engine data, or any publicly available information and certain non-publicly available information. This data may include information about the requesting entity, about other entities in the same network as the requesting entity, or any subset of entities, or information about all entities. The trusting adjustment score may be normalized based on the activities of other similar entities, entities to which the requesting entity has a low degree of separation, or any other subset of entities, or the activity of all entities. For example, processing circuitry may identify a subset of entities that are one edge away from the requesting entity, and calculate, for example, an average and/or distribution of a certain activity performed by that subset of entities. The processing circuitry may estimate a Gaussian distribution, or may estimate any other appropriate distribution model. For example, the processing circuitry may determine that the subset of entities shares personal information on social media an average of five times a day, with a standard deviation of two times a day. The processing circuitry may receive an indication that the requesting entity shares personal information on social media eight times a day, and the trusting adjustment score for the requesting entity may rise. Different data may be given different weight in determining a trusting adjustment score, and in some embodiments, that weighting may be changed based on an indication of the activity to be performed between the requesting user and the second user.

Furthermore, in an embodiment where social network information is part of the retrieved data, a keyword search may be used to analyze the information shared by the requesting entity. This keyword search may analyze a post on social media by natural language processing. In some embodiments, the keyword search may search a database that includes "trusting keywords." If the post includes one of those trusting keywords, then the post may be indicated as a "trusting" post. The number of these "trusting" posts may be used in calculating the trusting adjustment score. While, as an illustrative example, the keyword search is performed on social media posts, this type of text analysis may be used on any information shared by the requesting entity. Furthermore, other forms of natural language processing may be used to determine whether social media posts indicate that the user is "trusting," and in such a way influence the trusting adjustment score for the requesting entity.

In some embodiments, the received data may include an entity or multiple entities' rating on how trusting they believe the requesting entity to be (or feedback from the crowd). For example, a user interface may provide an opportunity for the crowd (i.e., other entities) to provide feedback on how trusting they believe the requesting entity to be. The user interface may provide user-selectable inputs that allow the crowd to provide its feedback. For example, as discussed above, the user interface may include a thumbs up/down icon, like/dislike icon, plus/minus icon, positive/negative icon, star-based system wherein these binary systems may be used to indicate whether the entity is trusting or untrusting, and the difference between the positive and negative feedback may be used. The user interface may also include a numeral-based system that allows the crowd to indicate whether they agree or disagree with the attribute (and the magnitude of their agreement/disagreement). Note that the crowd indications of how trusting the requesting entity is may be given a weight when determining its contribution to the trusting adjustment score. This may be an example of an attribute assigned to the user, as discussed above and in more detail below.

As discussed above, various attributes may be assigned to the user, which may influence its trusting adjustment score. An entity may be assigned an attribute in any suitable manner. As described above, an entity may be assigned an attribute by the crowd or by another entity. In some embodiments, the attribute may be assigned to the entity by a system administrator. In some embodiments, the attribute may be automatically assigned to an entity based on any number of factors, including any of the trusting component scores, any of the data used to calculate the component scores or trusting adjustment score.

In some embodiments, the attributes associated with an entity may be integrated into the trusting adjustment score as one or more trusting component scores. For example, the net attribute score or scores may comprise an individual trusting component score that is combined with other trusting component scores as described above in order to calculate a trusting adjustment score.

In some embodiments, the attributes may relate to or correspond to one of the trusting component scores. In such embodiments, the trusting component scores may be adjusted based on the fact that an entity is associated with related attributes. For example, the fact that an entity is a "Trusting" entity may increase one of the trusting component scores and/or the trusting adjustment score.

In some embodiments, the crowd may be given the opportunity to provide feedback on the various attributes in a manner as described above. In this way, the crowd may have influence on a trusting component score and/or a trusting adjustment score for a requesting entity.

As discussed above, in some embodiments, the trusting adjustment score may be combined with the baseline trust score for a second entity to yield an updated trust score for the second entity. In some embodiments, this combination may be a weighted sum, where the weights may be predetermined by the processing circuitry, may vary based on transaction type, or may be input by a user associated with the requesting entity. This method can be used to shift all scores up by a set amount. In some embodiments, the trusting adjustment score may be multiplied by the baseline trust score for the second entity. One of ordinary skill in the art would understand that the trusting adjustment score and the baseline trust score may be combined by other methods, such as division, subtraction, binomial functions, or any other function of the trusting adjustment score and the baseline trust score.

In certain embodiments, the processing circuitry may store the trusting adjustment score for use with later calculations. It may be stored on the processing circuitry, in another local storage device, on the user account associated with the requesting entity, or on a remote server. In some embodiments, it may be stored on a profile associated with the user. Because the trusting adjustment score is unique to the specific entity, it may be advantageous to store the trusting adjustment score, as the calculation of said score may be computationally intensive. It may then be updated by data received at a later time, which may be from the same or similar sources to that described above. It may be updated some or all of the times the requesting entity seeks a trust score of another entity, at predetermined time intervals, at the request of the user, anytime new data is received, when the user is not using the user interface/application, when the user is not using its account, or at varied time intervals.

In some embodiments, the trusting adjustment score may be updated depending on the activity to be performed by the second entity. For example, the requesting entity may indicate, using, for example, a user interface, the type of transaction into which the second entity is entering. It may then weight certain of the data received from the remote source higher or lower depending on its relevance to the transaction. As an illustrative example, if the requesting entity indicates that it wishes to give a loan to the second entity, data about the requesting entity's previous loans would be given more weight than say, data about the requesting entity's social media usage. Data about other financial transactions, such as the requesting entity's credit card usage, may be weighted more than the data about the requesting entity's social media usage, but less than the data about the requesting entity's previous loans.

While, for an illustrative example, it has been presented that the trusting adjustment score is calculated independently of the baseline trust score for the second entity, and then acts to adjust the baseline trust score, one of ordinary skill in the art would appreciate that the trusting adjustment score may be included in the initial calculation of the trust score for the second entity. Furthermore, one of ordinary skill in the art would appreciate that the concepts used in calculating a trusting adjustment score may be used in the initial calculation of the trust score for the second entity, without determining an independent "score" for how trusting the requesting entity is.

In some embodiments, the transmission of the indication of adjusted trust score may include information about the trusting adjustment score, and an indication that it is an adjusted trust score as opposed to the baseline or unadjusted trust score. The user interface may indicate that the adjusted trust score is adjusted by the generation of a pop-up, special symbol, or other visual indication, or it may simply report the adjusted trust score in a similar manner to how it would report a baseline trust score.

According to one aspect, a risk score may be calculated for a first entity. As discussed above, the risk score may be a representation of the first entity's propensity to engage in risky behavior, or may represent the first entities risk aversion. As further discussed above, processing circuitry may receive data from a remote source, and use the received data to determine a risk score for the first entity, wherein the data is analyzed, and the analyzed data is combined mathematically to determine the risk score for the first entity.

In certain embodiments, a risk score may be used to determine how appropriate the first entity is for a particular role, and may be used to make hiring decisions. For example, if the first entity is a person who is applying for a job as an elementary school teacher, the hiring committee may want to know the risk score for the first entity, as they may want to hire someone who is less likely to engage in risky behavior. As another illustrative example, a militia or army may only want to recruit those who have a propensity to engage in risky behavior in certain areas that put their body at risk, e.g., through skydiving, holding a motorcycle driver's license, rockclimbing, etc., but not engage in risky behaviors such as binge drinking of alcohol, as this may be an indication that the person is more likely to put themselves in harm's way to protect their fellow recruits or servicepersons while also avoiding being drunk while serving. As such, the militia or army may want only those that have risk scores above a threshold risk score or certain components of risk scores above relevant component thresholds while other components are below relevant component thresholds. In other embodiments, a user may want to know the first entity's risk score to determine whether the first entity would make a good mate, perhaps by engaging in certain unrisky behavior in some areas and more risky behavior in other areas. As one of skill can recognize, based on different preferences in mates, some might prefer a mate, for example, with risky sexual behavior (as potentially indicated by various data sources including membership in certain social networking sites, certain health-related information, communications, etc.) and unrisky financial behavior while others might prefer a mate, for example, with risky financial behavior and unrisky sexual behavior.

In some embodiments, processing circuitry may be used to make decisions based on the risk score, and may be used in the examples above to make a hiring decision. In some embodiments, the processing circuitry may contemporaneously use both a risk score and any of the system, peer, and/or contextual trust scores for the first entity to make said decisions. A user may be given the option of using only the risk score, only the trust score, or both the risk score and the trust score in making said decisions. For example, further to the militia or army example given above, the militia or army may want to recruit only those persons that have above a threshold trust score and above a threshold risk score. The processing circuitry may determine which of the candidates have above the threshold scores, and may determine, using this data, which of the candidates would qualify for a position in the army or militia. In using both the trust score and the risk score in making a decision, a user can more narrowly tailor the decisions made. For example, a user may request entities with a risk score above a certain threshold, and the user may receive results that include both criminals that engage in risky behavior, and soldiers that engage in risk behavior. As another illustrative example, the user may request users with only high trust scores, and may receive results that include both elementary school teachers and soldiers. As discussed above, in indicating a threshold score for both the risk score and the trust score, the user may receive results that only include, for example, soldiers. While a threshold score for the trust score and a threshold score for the risk score are used above, this is merely an illustrative example. As another illustrative example, the two scores may be combined to make a single composite score. The scores may be combined in a weighted sum, the scores may be multiplied together, or they may be combined in any other suitable function. As an illustrative example, a user may request that the sum of the two scores for the first entity be above a certain threshold value when using the processing circuitry to make decisions based on the trust and risk scores for a first entity.

In some embodiments, the received data used in determining the first entity's risk score may comprise network connectivity information, social network data, financial transaction data, previous trust score search data, credit score, available court data, opt-in provided data, transaction history, ratings/feedback data, group/demographics data, search engine data, or any publicly available information and certain non-publically available information, or any suitable data which may be used as an indication of how risk averse the first entity is or any combination thereof. This data may be received from a variety of sources, including social media networks, political party memberships, religious organization memberships, ratings agencies, credit bureaus, consumer complaints, criminal histories, legal records, media search engine results, official document issuers, email services, data syndicators, address databases, transportation passenger lists, gambling databases, business listings, hospital affiliations, university affiliations, loan and/or borrower databases, data exchanges, blogs, obituaries, consumer databases, video metadata, audio metadata, pictorial metadata, voter registration lists, online or offline dating site information, online or offline shareholder registers, companies' regulatory filings, registered sex offender lists, Do Not Fly or similar Homeland Security watch lists, Court records, email databases, online or offline c.v. lists/databases, or employee lists, or any other suitable source or combinations thereof. While a remote source have been discussed, it would be understood by one of ordinary skill in the art that the processing circuitry may receive data from a remote source, a local source, a plurality of remote sources, or a plurality of local sources, or any combination thereof. The risk score may be normalized based on the activities of other similar entities to the first entity, entities to which the first entity has a low degree of separation, or any other subset of entities, or the activity of all entities. For example, processing circuitry may identify a subset of entities that are one edge away from the first entity, and calculate, for example, an average and/or distribution of a certain activity performed by that subset of entities. The processing circuitry may estimate a Gaussian distribution, or may estimate any other appropriate distribution model. For example, the processing circuitry may determine that the subset of entities have gone sky diving an average of five times in their lifetime, with a standard deviation of three times in their lifetime. The processing circuitry may determine that the first entity has gone sky diving once in their lifetime, and the risk score for the first entity may be lowered.

In some embodiments, the received data may include an entity or multiple entities' ratings on how likely they believe the first entity is to engage in risky behavior (or feedback from the crowd). For example, a user interface may provide an opportunity for the crowd (i.e., other entities) to provide feedback on how risk averse they believe the requesting entity to be. The user interface may provide user-selectable inputs that allow the crowd to provide its feedback, as discussed above.

As discussed above, various attributes may be assigned to the user, which may influence its risk. An entity may be assigned an attribute in any suitable manner. As described above, an entity may be assigned an attribute by the crowd or by another entity. In some embodiments, the attribute may be assigned to the entity by a system administrator. In some embodiments, the attribute may be automatically assigned to an entity based on any number of factors including any of the data used in calculating the risk score. In some embodiments, the attributes associated with an entity may be integrated into the risk score as one or more risk component scores. For example, the net attribute score or scores may comprise an individual risk component score that is combined with other risk component scores as described above in order to calculate a trusting adjustment score. The attributes may relate to or correspond to one of the risk component scores. In some embodiments, the crowd may be given the opportunity to provide feedback on the various attributes in a manner as described above. In this way, the crowd may have influence on a risk component score and/or a risk score for a requesting entity.

In some embodiments, the processing circuitry may receive an indication of an activity to be performed by the first entity, and then update the risk score based on the indication of the activity. This updated risk score may be used in the situations described above. For example, in the situation described above where a hiring committee at an elementary school is looking to hire the first entity, they may indicate that the activity to be performed by the first entity is teaching children. This may influence the first entity's risk score. For example, if the first entity has participated in bungee jumping a number of times, it may have a high risk score. However, the received data may indicate that the first entity has never left children unsupervised. If the hiring committee indicates that the activity to be performed by the first entity is teaching children, then the reported risk score for the first entity with respect to teaching children may be lower when compared to its risk score without taking into account the indicated activity. This allows for a more tailored risk score assessment with respect to the first entity and the context in which the risk score is sought.

Figure 5:
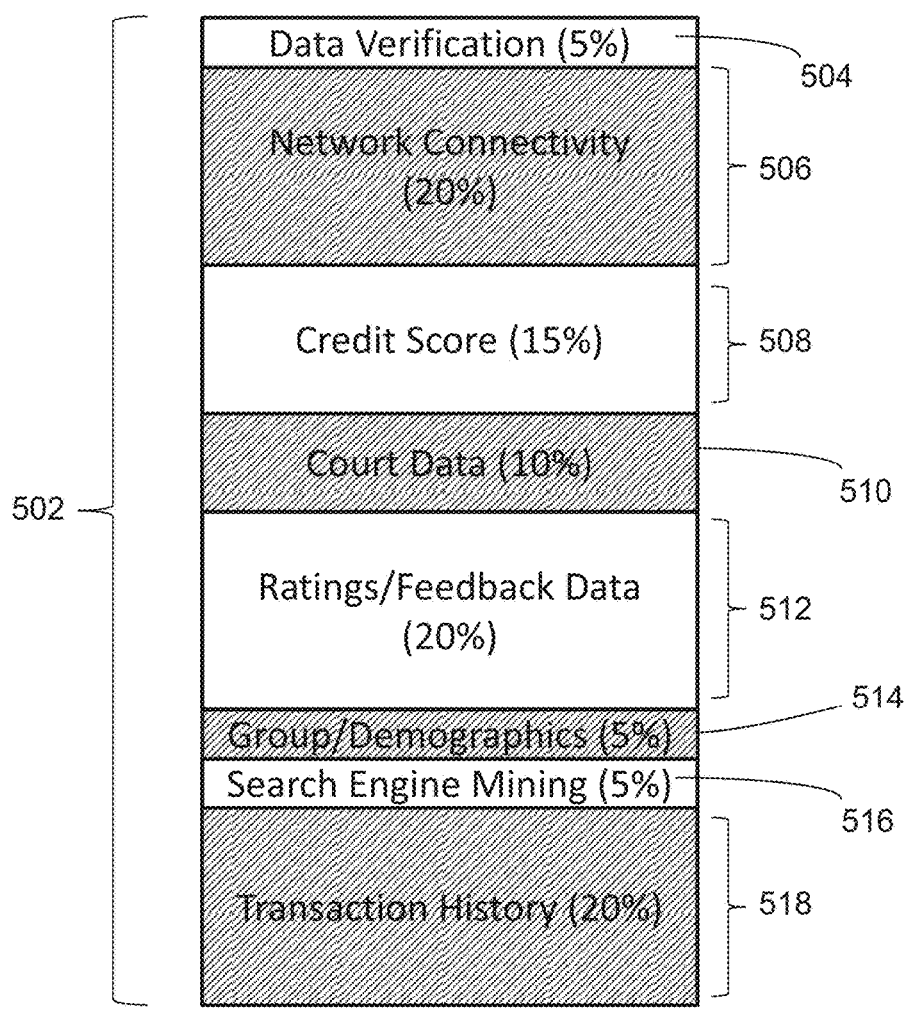
FIG. 5 is a diagram of an illustrative weighted combination of components that comprise a system trust score.

FIG. 5 is a diagram 500 of a weighted combination 502 of components 504-518 that comprise a trust score in accordance with certain embodiments of the present disclosure. It will be understood that a trust score may comprise more or fewer components than components 504-518 and that components 504-518 are provided for illustrative purposes only. Weighted combination 502 comprises a data verification component 504, a network connectivity component 506, a credit score component 508, a court data component 510, a ratings/feedback data component 512, a group/demographics component 514, a search engine mining component 516, and a transaction history component 518. The components 504-518 may correspond respectively to data verification component 404, network connectivity component 406, credit score component 408, court data component 410, ratings/feedback data component 412, group/demographics component 414, search engine mining component 416, and transaction history component 418 depicted in FIG. 4. As shown in the illustrative example depicted in FIG. 5, the components 504-518 may be combined using a default weighting according to the following weights:

Data Verification—5%
Network Connectivity—20%
Credit Score—15%
Court Data—10%
Ratings/Feedback Data—20%
Group/Demographics—5%
Search Engine Mining—5%
Transaction History—20%

The components 504-518 may be combined using the above weights using a weighted sum. For example, each of the component 504-518 may be associated with a numerical component score. The weighted sum 502 may be calculated as:

$$S = \sum_{i=1}^{n} w_i c_i$$

wherein $w_i$ is the weighting as given by the default weighting above, and $c_i$ is the component score.

In some embodiments, the default weightings may be adjusted according to user-specified values. For example, as discussed above, users who care more about network connectivity may increase the weighting for the network connectivity component 506, and users who care less about financial responsibility may choose to decrease credit score component 508. These default weightings may be saved for each specific entity and retrieved each time the user requests a trust score. In some embodiments, the default weightings above may be automatically adjusted, for example by application 102, to reflect a peer trust score or contextual trust score. For example, application 102 may detect that a first and second entity are entering into a financial transaction and may automatically adjust the weight for the credit score component 508 to reflect the importance of this component to the type of activity. These weightings may be saved for the individual entities and/or the specific transaction types. Thus, the users may be provided with a contextual trust score that weights factors in a more relevant manner than the default weightings.

In some embodiments, at least one of the system trust score, peer trust score, and contextual trust score may be represented by a mean value and confidence band. The confidence band may represent a statistical variance in the calculated trust score. For example, each of the component scores may be associated with a mean score μ and a standard deviation a based on how trustworthy the data source is. The mean and standard deviation for each of the component scores may be combined accordingly. As will be understood by those of ordinary skill in the art, the mean value of the total component scores may be represented by a sum of the mean value of each component score. The variance of two component scores together may be combined using the following equation:

$$V(A+B)=V(A)+V(B)+2*\text{Covar}(A,B)$$

where V(A) is the variance (i.e., the square of the standard deviation) of component A, V(B) is the variance of component B, and Covar(A,B) is the covariance of components A and B.

Figure 6:
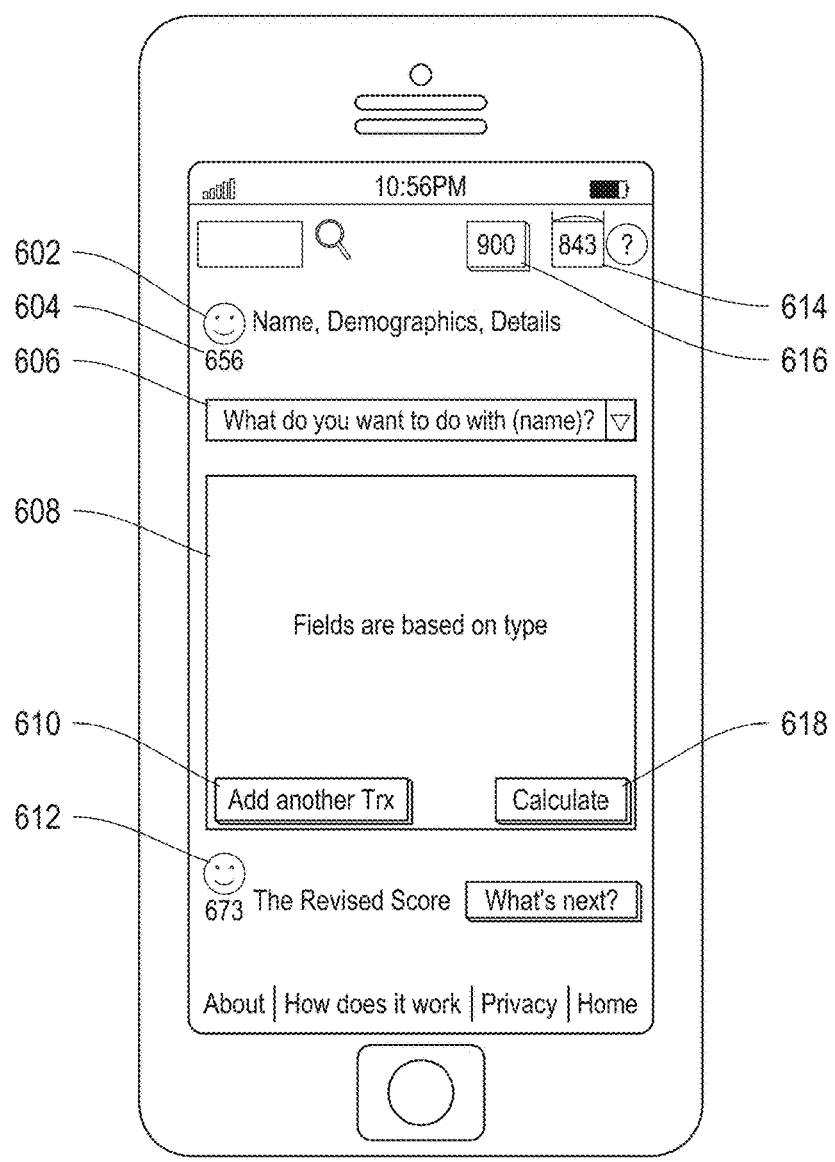
FIG. 6 is an illustrative graphical user interface displaying a trust score interface.

FIG. 6 is a graphical user interface displaying a trust score interface 600 to a requesting user in accordance with certain embodiments of the present disclosure. Trust score interface 600 includes icon 602, initial score 604, transaction selector 606, transaction details field 608, additional transaction button 610, revised score icon 612, first profile score 614, second profile score 616, and calculate button 618. Although the trust score interface 600 is depicted in FIG. 6 in the context of a mobile device display screen, it will be understood that trust score interface 600 may be generated for display on any suitable display device.

Icon 602 and initial score 604 may graphically represent a first trust score of a target entity. Although icon 602 is depicted as a smiley face, it will be understood that any suitable graphical representation may be utilized to represent a relative trust level of the target entity. In some embodiments, the initial score 604 may be a system trust score for the target entity calculated using a default set of weights. In other embodiments, the initial score 604 may be a peer trust score calculated in relation to the user of the mobile app. For instance, the initial score 604 may represent a trust level that takes into account mutual friends of the requesting user and the target user.

The requesting user may use transaction selector 606 to indicate an activity/transaction to be performed with the target user. In some embodiments, transaction selector 606 may be optional, and no transaction is needed to calculate a revised score. Although transaction selector 606 is depicted as a dropdown box, any suitable input method (e.g., text input box, radio buttons, etc.) may be utilized to receive an indication of an activity/transaction from the requesting user. After an activity/transaction is selected, transaction details field 608 may provide further details or options. For example, if the requesting user indicates that the target entity wishes to request a loan, then the transaction details field 608 may include a field for indicating the amount of the loan. In this manner, a different weighting of components may be used for a $10 loan as opposed to a $100,000 loan. The requesting user may add an additional transaction using additional transaction button 610. In cases where multiple transactions are indicated, weightings for the multiple transactions may be averaged.

Revised score icon 612 may indicate a revised trust score calculated based on the information entered into transaction selector 606 and transaction details field 608. In some embodiments, the revised score icon 612 may reflect a peer trust score, for example, when a transaction is not selected in transaction selector 606. In other embodiments, the revised score icon 612 may reflect a contextual trust score calculated based on the activity/transaction and transaction details indicated in transaction selector 606 and transaction details field 608. The revised score icon 612 may include a graphical representation of the revised trust score, similar to icon 602. In the illustrative example depicted in FIG. 6, revised icon 612 includes a smiley face to represent a relatively high revised score of 673. The requesting user may request a calculation using calculation button 618.

The first profile score 614 and the second profile score 616 may indicate one or more of a system trust score, peer trust score, and/or contextual trust score for the requesting user. As with icon 602 and icon 612, the first profile score 614 and second profile score 616 may include a graphical representation, such as a smiley face, of the respective trust score.

Figure 7:
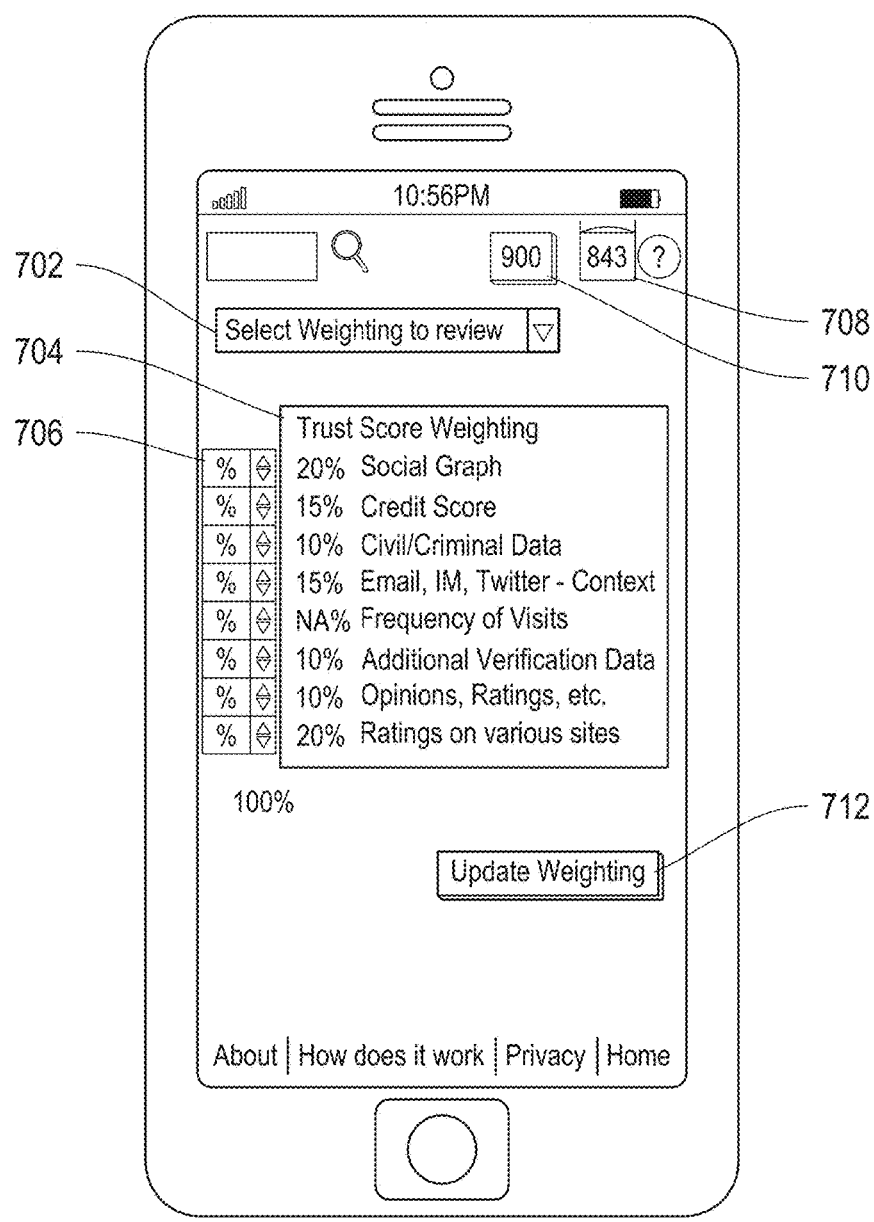
FIG. 7 is a graphical user interface displaying another illustrative trust score interface.

FIG. 7 is a graphical user interface displaying another trust score interface 700 in accordance with certain embodiments of the present disclosure. Trust score interface 700 includes weighting profile selector 702, weighting details field 704, weighting selector 706, first profile score 708, second profile score 710, and update weighting button 712.

As discussed above in relation to FIG. 5, a user may adjust weightings to user-specified value. These user-specified weightings may be saved as profiles which may be selected in weighting profile selector 702. Weighting details field 704 may reflect the details, such as weighting values of the various components, that correspond to the selected weighting profile. A user may further adjust the weightings using weighting selector 706. Although weighting profile selector 704 and weighting selector 706 are depicted in FIG. 7 as dropdown menus, any suitable selector may be utilized, including, but not limited to, text input boxes and/or radio buttons. The requesting user may update the weighting profile with the specified weights by selecting update weighting button 712.

In some embodiments, the weighting profiles may be stored, for example in data store 110 depicted in FIG. 1. These weighting profiles may form the basis for developing default weighting profiles specific to a particular transaction type. These default weighting profiles for specific transaction types may be suggested to other users, and the system, using processing circuitry, may use AI/machine learning techniques in order to monitor how users are adjusting the weighting profiles and automatically readjust the default weighting profiles for other users. By doing so, the system may improve response time and convenience for the end users, since they will not have to manually adjust their weighting profiles.

In some embodiments, the user may indicate an initial or base trust score factor that may be applied to every other user. At least one of the system trust score, peer trust score, and contextual trust score may then be calculated as updates to the initial or base trust score that the user has indicated. For example, each of the components discussed in relation with FIG. 4 may result in an increase or decrease in the indicated initial or base trust score. In some embodiments, the initial or base trust score may be determined by presenting a questionnaire or series of questions to the user to determine their general trust level towards other entities. In some embodiments the user may specify different initial or base trust scores for different entities.

First profile score 708 and second profile score 710 may be substantially similar to first profile score 614 and second profile score 616 depicted in FIG. 6 and may indicate one or more of a system trust score, peer trust score, and/or contextual trust score for the requesting user.

FIG. 8 is a table 800 showing a graded scale for assigning component scores based on a metric in accordance with certain embodiments of the present disclosure. Table 800 depicts but one illustrative example for determining a component score or subcomponent score based on a measured metric 802. The illustrative example depicted in FIG. 8 uses number of friends in a social network as a measurable metric. Based on metric 802, component scores 804 and 806 may be assigned according to a graded scale. In the example depicted in FIG. 8, the component score 804 is depicted as a numerical score out of 1000, and the component score 806 is depicted as a percentage out of 100%. It will be understood that any suitable method for depicting the component score may be used. For example, the component score may be a represented by discrete categories (e.g., "very bad," "bad," "ok," "good," and "very good"). Furthermore, although the graded scale depicted in FIG. 8 shows only five steps, the graded scale may be divided into any suitable number of steps or categories.

According to the graded scale depicted in FIG. 8, the network component score (e.g., network connectivity score 406 in FIG. 4) may be assigned based on the number of friends the target entity has. For example, if the target entity has 306 friends, the network component score may be 600. In some embodiments, the network component score may comprise a combination of two or more subcomponent scores, wherein each subcomponent score is determined based on a grade scale similar to table 800. In some embodiments, the subcomponent scores may also be determined based on the method discussed below in relation to FIG. 9. In some embodiments, the subcomponent scores may be combined using an average or a weighted average. For example, the network component score may combine the number of friends and the number of "likes" a target user has received on their posts. The network component score may be weighted so that the number of friends accounts for 700/1000 of the potential network component score, and the number of "likes" accounts for 300/1000 of the potential network component score.

The metric 802 and the steps of the graded scale may be determined by a server, such as application server 106 depicted in FIG. 1. For example, the provider of the trust app may set the metric according to their proprietary algorithm. In some embodiments, the metric 802 may be adjusted by an entity such that the component score may be calculated according to the user's preferences. Although the metric 802 is discussed with respect to a network connectivity score, it will be understood that any of the components 404-418, or any other components, may be determined using a similar graded scale scheme.

Figure 9:
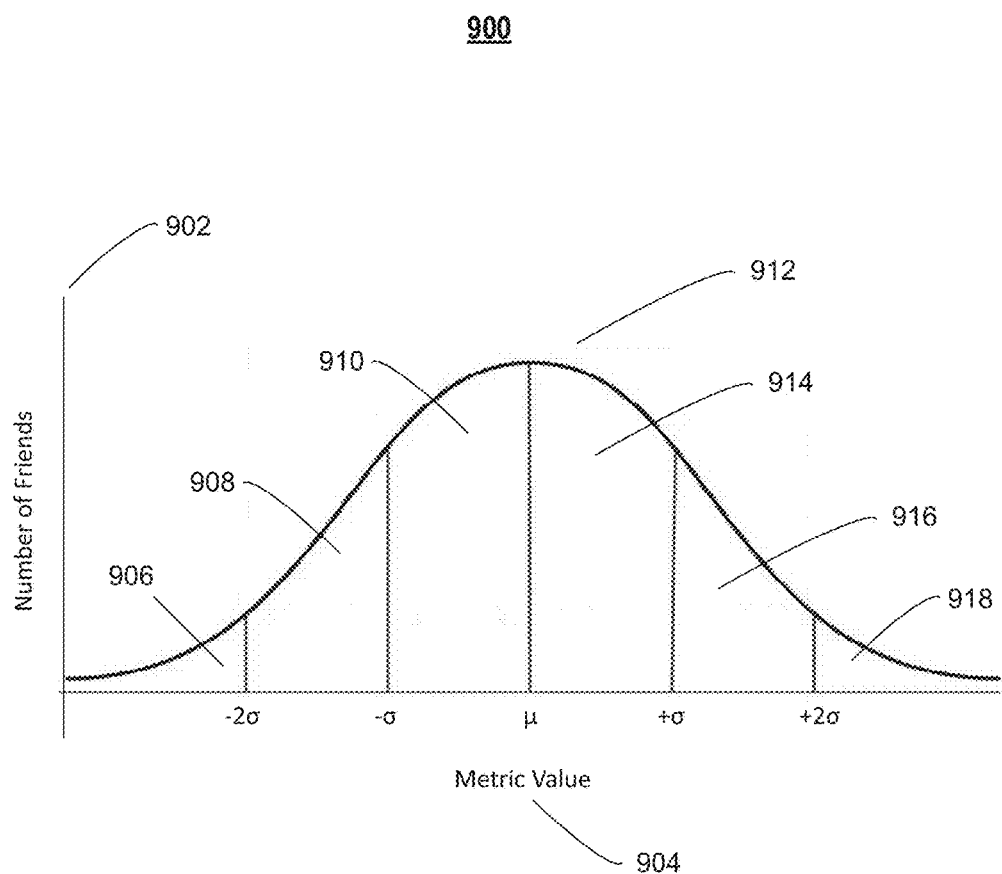
FIG. 9 is an illustrative distribution for assigning component scores based on a metric.

FIG. 9 is a distribution 900 for assigning component scores based on a metric in accordance with certain embodiments of the present disclosure. Distribution 900 depicts one illustrative example for determining a component score or subcomponent score based on a measured metric 902. The illustrative example depicted in FIG. 9 uses number of friends in a social network as a measurable metric 904. An application (such as access application 102 in FIG. 1) or an application server (such as application server 106 in FIG. 1) may identify entities connected to a requesting user through a network. In some embodiments, the network may be a social network (such as Facebook) or a computer network (such as the Internet or a subset of the Internet). The application or application server may then determine or retrieve, for each identified user, information on the desired metric 904. In the illustrative example depicted in FIG. 9, the application or application server may identify all of the requesting user's friends and determine how many friends each of the user's friends has. Distribution 900 may be graphed based on the determined or retrieved information. In FIG. 9, distribution 900 is depicted as a Gaussian distribution, but it will be understood that any distribution may result from the determined or retrieved data. The distribution 900 may have a peak 912 at an average value μ. For instance, most of a requesting user's friends may have an average value of μ=500 friends. The distribution 900 may be divided into regions 906, 908, 910, 914, 916, and 918 based on a standard deviation σ. For example, region 906 may represent a number of friends that is two standard deviations σ below the average value μ. Region 908 may represent a number of friends that is between two standard deviations σ and one standard deviation σ below the average value μ. Region 910 may represent a number of friends that is less than one standard deviation σ below the average value μ. Region 914 may represent a number of friends that is between the average value μ and one standard deviation σ above the average value μ. Region 916 may represent a number of friends that is between one standard deviation σ and two standard deviations σ above the average value μ. Finally, region 918 may represent a number of friends that is above two standard deviations σ above the average value μ.

The metric for the target user may fall into one of regions 906, 908, 910, 914, 916, and 918. As will be understood by those of ordinary skill in the art, regions 906 and 918 represent about 2.5% each of distribution 900, regions 908 and 916 represent about 13.5% each of distribution 900, and regions 910 and 914 represent about 34% each of distribution 900. The application or application server may assign a component score depending on which of regions 906, 908, 910, 914, 916, and 918 the metric of the target user falls into. For instance, the component score for the target user may be relatively low if the metric falls within regions 906 or 918 and may be relatively high if the metric falls within regions 910 or 914. A graded scale, similar to table 800 depicted in FIG. 8, may be assigned to the regions 906, 908, 910, 914, 916, and 918.

Figure 10:
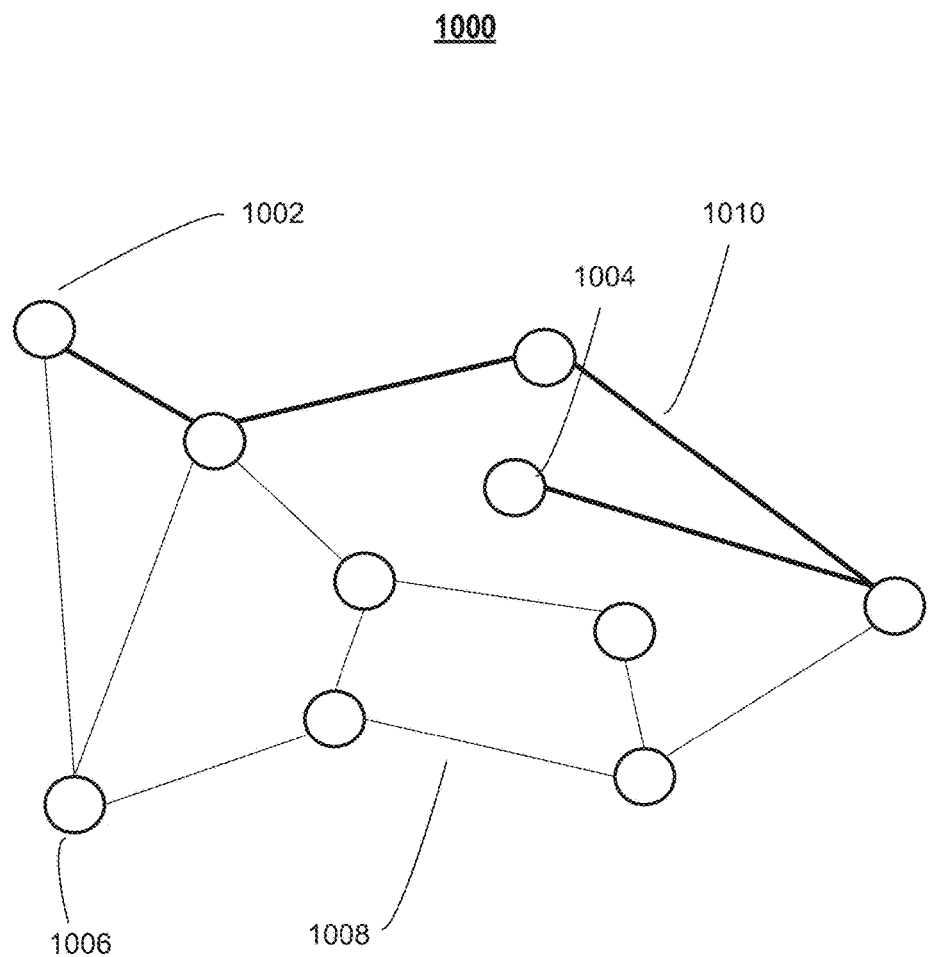
FIG. 10 is a display of an illustrative network graph.

FIG. 10 is a display of a network graph 1000 in accordance with certain embodiments of the present disclosure. Network graph 1000 includes source node 1002, target node 1004, intermediate node 1006, and paths 1008 and 1010. The network graph 1000 may be generated for display on any suitable display device and in any suitable interface, such as the interfaces 600 and 700 depicted in FIGS. 6 and 7. As defined herein, a "node" may include any user terminal, network device, computer, mobile device, access point, or any other electronic device. In some embodiments, a node may also represent an individual human being, entity (e.g., a legal entity, such as a public or private company, corporation, limited liability company (LLC), partnership, sole proprietorship, or charitable organization), concept (e.g., a social networking group), animal, or inanimate object (e.g., a car, aircraft, or tool).

The network graph 1000 may represent a visualization of a network that connects a requesting entity, depicted by source node 1002, and a target entity, depicted by target node 1004. One or more intermediate nodes, such as intermediate node 1006, may also be displayed, as well as paths 1008 that connect nodes 1002, 1004, and 1006. In some embodiments, a dominant path 1010 may be displayed and visually distinguished from other paths 1008. The dominant path 1010 may be determined using any suitable algorithm. For example, the dominant path 1010 may represent the shortest-length path from source node 1002 to source node 1004. In other embodiments, the dominant path 1010 may represent a path through specific intermediate nodes, such as nodes with relatively high trust values. For example, a longer path from node 1002 through node 1006 to node 1004 may have higher trust at each link of the path than the shorter path 1010.

In some embodiments, each of the nodes 1002, 1004, and 1006 may include images, text, or both, such as a profile picture associated with the entity depicted by the nodes. In some embodiments, the network graph 1000 may be generated for display in a scrollable display, wherein a user may scroll and zoom the network graph 1000 to see more and less nodes as desired.

Figure 11:
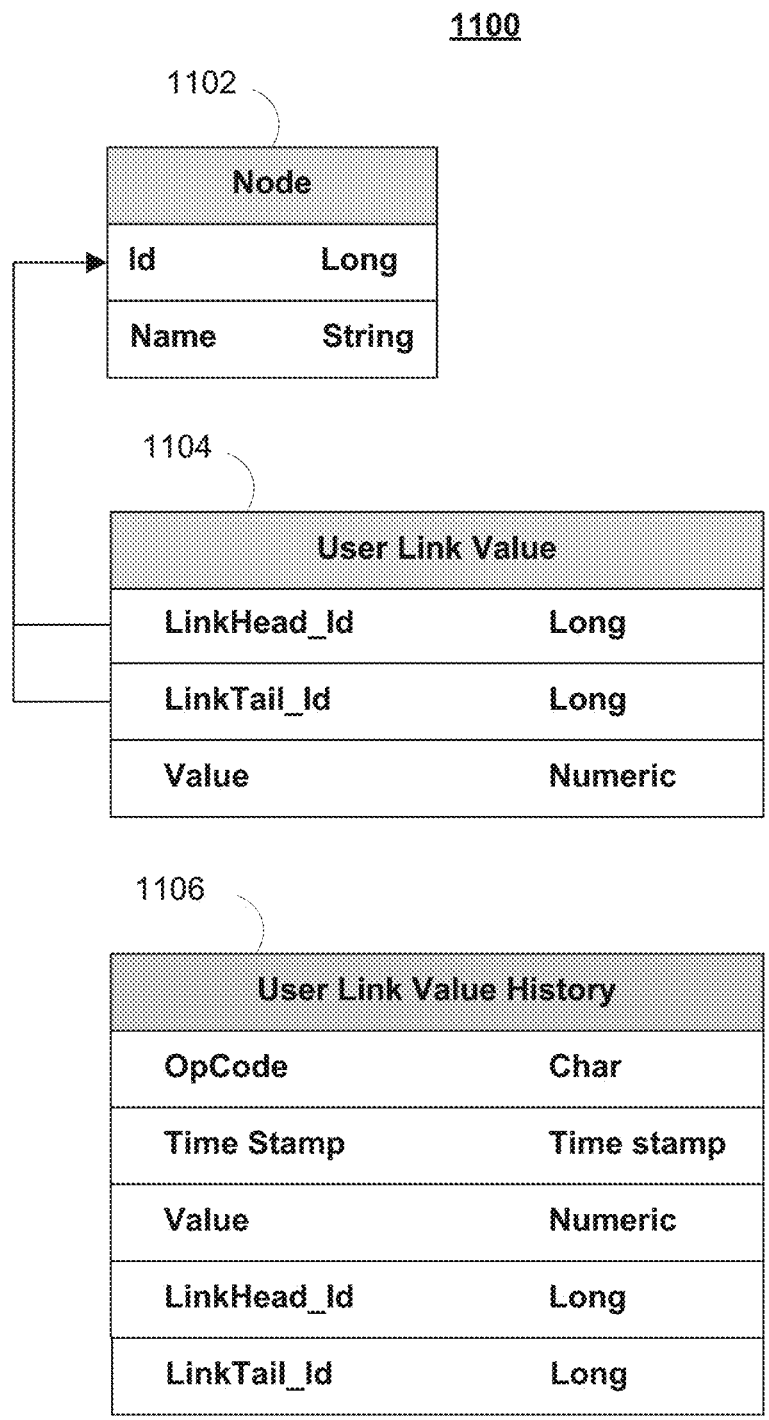
FIG. 11 is an illustrative data table for supporting connectivity determinations within a network community.
Figure 12:
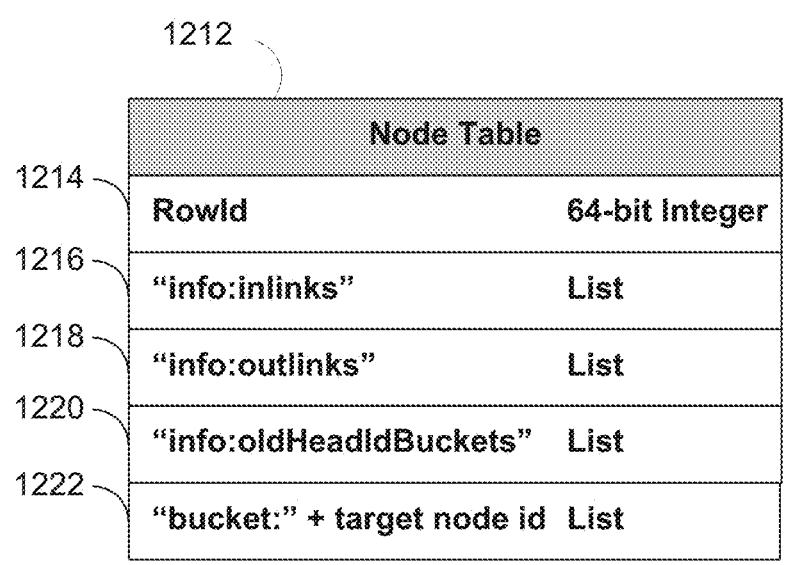
FIG. 12 is another illustrative data table for supporting connectivity determinations within a network community.

FIGS. 11-13 describe illustrative methods for calculating a network component score, such as network connectivity component 406 depicted in FIG. 4. Connectivity may be determined, at least in part, using various graph traversal and normalization techniques described in more detail below.

In an embodiment, a path counting approach may be used where processing circuitry is configured to count the number of paths between a first node $n_1$ and a second node $n_2$ within a network community. A connectivity rating $R_{n_1 n_2}$ may then be assigned to the nodes. The assigned connectivity rating may be proportional to the number of subpaths, or relationships, connecting the two nodes, among other possible measures. Using the number of subpaths as a measure, a path with one or more intermediate nodes between the first node $n_1$ and the second node $n_2$ may be scaled by an appropriate number (e.g., the number of intermediate nodes) and this scaled number may be used to calculate the connectivity rating.

In some embodiments, weighted links are used in addition to or as an alternative to the subpath counting approach. Processing circuitry may be configured to assign a relative user weight to each path connecting a first node $n_1$ and a second node $n_2$ within a network community. A user connectivity value may be assigned to each link. For example, a user or entity associated with node $n_1$ may assign user connectivity values for all outgoing paths from node $n_1$. In some embodiments, the connectivity values assigned by the user or entity may be indicative of that user or entity's trust in the user or entity associated with node $n_2$. The link values assigned by a particular user or entity may then be compared to each other to determine a relative user weight for each link.

The relative user weight for each link may be determined by first computing the average of all the user connectivity values assigned by that user (i.e., the out-link values). If $t_i$ is the user connectivity value assigned to link i, then the relative user weight, $w_i$, assigned to that link may be given in accordance with:

$$w_i = 1 + (t_i - \bar{t_i})^2 \quad (1)$$

To determine the overall weight of a path, in some embodiments, the weights of all the links along the path may be multiplied together. The overall path weight may then be given in accordance with:

$$w_{path} = \Pi(w_i) \quad (2)$$

The connectivity value for the path may then be defined as the minimum user connectivity value of all the links in the path multiplied by the overall path weight in accordance with:

$$t_{path} = w_{path} \times t_{min} \quad (3)$$

To determine path connectivity values, in some embodiments, a parallel computational framework or distributed computational framework (or both) may be used. For example, in one embodiment, a number of core processors implement an Apache Hadoop or Google MapReduce cluster. This cluster may perform some or all of the distributed computations in connection with determining new path link values and path weights.

The processing circuitry may identify a changed node within a network community. For example, a new outgoing link may be added, a link may be removed, or a user connectivity value may have been changed. In response to identifying a changed node, in some embodiments, the processing circuitry may re-compute link, path, and weight values associated with some or all nodes in the implicated network community or communities.

In some embodiments, only values associated with affected nodes in the network community are recomputed after a changed node is identified. If there exists at least one changed node in the network community, the changed node or nodes may first undergo a prepare process. The prepare process may include a "map" phase and "reduce" phase. In the map phase of the prepare process, the prepare process may be divided into smaller sub-processes which are then distributed to a core in the parallel computational framework cluster. For example, each node or link change (e.g., tail to out-link change and head to in-link change) may be mapped to a different core for parallel computation. In the reduce phase of the prepare process, each out-link's weight may be determined in accordance with equation (1). Each of the out-link weights may then be normalized by the sum of the out-link weights (or any other suitable value). The node table may then be updated for each changed node, its in-links, and its out-links.

After the changed nodes have been prepared, the paths originating from each changed node may be calculated. Once again, a "map" and "reduce" phase of this process may be defined. During this process, in some embodiments, a depth-first search may be performed of the node digraph or node tree. All affected ancestor nodes may then be identified and their paths recalculated.

In some embodiments, to improve performance, paths may be grouped by the last node in the path. For example, all paths ending with node $n_1$ may be grouped together, all paths ending with node $n_2$ may be grouped together, and so on. These path groups may then be stored separately (e.g., in different columns of a single database table). In some embodiments, the path groups may be stored in columns of a key-value store implementing an HBase cluster (or any other compressed, high performance database system, such as BigTable).

In some embodiments, one or more threshold functions may be defined. The threshold function or functions may be used to determine the maximum number of links in a path that will be analyzed in a connectivity determination or connectivity computation. Threshold factors may also be defined for minimum link weights, path weights, or both. Weights falling below a user-defined or system-defined threshold may be ignored in a connectivity determination or connectivity computation, while only weights of sufficient magnitude may be considered.

In some embodiments, a user connectivity value may represent the degree of trust between a first node and a second node. In one embodiment, node $n_1$ may assign a user connectivity value of $l_1$ to a link between it and node $n_2$. Node $n_2$ may also assign a user connectivity value of $l_2$ to a reverse link between it and node $n_1$. The values of $l_1$ and $l_2$ may be at least partially subjective indications of the trustworthiness of the individual or entity associated with the node connected by the link. A user (or other individual authorized by the node) may then assign this value to an outgoing link connecting the node to the individual or entity. Objective measures (e.g., data from third-party ratings agencies or credit bureaus) may also be used, in some embodiments, to form composite user connectivity values indicative of trust. The subjective, objective, or both types of measures may be automatically harvested or manually inputted for analysis.

FIG. 11 shows data tables 1100 used to support the connectivity determinations for calculating a network component score in accordance with certain embodiments of the present disclosure. One or more of tables 1100 may be stored in, for example, a relational database in data store 110 (FIG. 1). Table 1102 may store an identification of all the nodes registered in a network community. A unique identifier may be assigned to each node and stored in table 1102. In addition, a string name may be associated with each node and stored in table 1102. As described above, in some embodiments, nodes may represent individuals or entities, in which case the string name may include the individual or person's first and/or last name, nickname, handle, or entity name.

Table 1104 may store user connectivity values. In some embodiments, user connectivity values may be assigned automatically by the system (e.g., by application server 106 (FIG. 1)). For example, application server 106 (FIG. 1) may monitor all electronic interaction (e.g., electronic communication, electronic transactions, or both) between members of a network community. In some embodiments, a default user connectivity value (e.g., the link value 1) may be assigned initially to all links in the network community. After electronic interaction is identified between two or more nodes in the network community, user connectivity values may be adjusted upwards or downwards depending on the type of interaction between the nodes and the result of the interaction. For example, each simple email exchange between two nodes may automatically increase or decrease the user connectivity values connecting those two nodes by a fixed amount. More complicated interactions (e.g., product or service sales or inquiries) between two nodes may increase or decrease the user connectivity values connecting those two nodes by some larger fixed amount. In some embodiments, user connectivity values between two nodes may be increased unless a user or node indicates that the interaction was unfavorable, not successfully completed, or otherwise adverse. For example, a transaction may not have been timely executed or an email exchange may have been particularly displeasing. Adverse interactions may automatically decrease user connectivity values while all other interactions may increase user connectivity values (or have no effect). In addition, user connectivity values may be automatically harvested using outside sources. For example, third-party data sources (such as ratings agencies and credit bureaus) may be automatically queried for connectivity information. This connectivity information may include completely objective information, completely subjective information, composite information that is partially objective and partially subjective, any other suitable connectivity information, or any combination of the foregoing.

In some embodiments, user connectivity values may be manually assigned by members of the network community. These values may represent, for example, the degree or level of trust between two users or nodes or one node's assessment of another node's competence in some endeavor. User connectivity values may include a subjective component and an objective component in some embodiments. The subjective component may include a trustworthiness "score" indicative of how trustworthy a first user or node finds a second user, node, community, or subcommunity. This score or value may be entirely subjective and based on interactions between the two users, nodes, or communities. This manual user connectivity score may "override" one or more of the system trust score, peer trust score, or contextual trust score. When a user "overrides" one of the above trust scores with a manual trust score, the user-specified trust score may be provided concurrently with, or instead of, the overridden trust score.

In some embodiments, a system administrator may override one or more of the system trust score, peer trust score, or contextual trust score. For example, a system administrator may override a system trust score of an entity to take into account recent trends or events. When a trust score is overridden by the system administrator, the administrator's trust score may be provided concurrently with, or instead of, the overridden trust score. When the overridden trust score reaches a specified range or threshold of the administrator's trust score, the system may automatically revert back to the overridden trust score. As an illustrative example, the system administrator may decrease a system trust score of an entity that has taken negative public attention in the news. The overridden trust score will continue to be calculated by the system and will gradually reflect the negative public attention of the entity. When the overridden trust score reaches within a certain range of the administrator's trust level (e.g., within 10%), then the system will automatically revert back to the calculated score. In some embodiments, the administrator's trust score will be provided to a user with a notification that the score was overridden and/or a reason why the trust score was overridden.

Table 1104 may store an identification of a link head, link tail, and user connectivity value for the link. Links may or may not be bidirectional. For example, a user connectivity value from node $n_1$ to node $n_2$ may be different (and completely separate) than a link from node $n_2$ to node $n_1$. Especially in the trust context described above, each user can assign his or her own user connectivity value to a link (i.e., two users need not trust each other an equal amount in some embodiments).

Table 1106 may store an audit log of table 1104. Table 1106 may be analyzed to determine which nodes or links have changed in the network community. In some embodiments, a database trigger is used to automatically insert an audit record into table 1106 whenever a change of the data in table 1104 is detected. For example, a new link may be created, a link may be removed, or a user connectivity value may be changed. This audit log may allow for decisions related to connectivity values to be made prospectively (i.e., before an anticipated event). Such decisions may be made at the request of a user, or as part of an automated process. This prospective analysis may allow for the initiation of a transaction (or taking of some particular action) in a fluid and/or dynamic manner. After such a change is detected, the trigger may automatically create a new row in table 1106. Table 1106 may store an identification of the changed node, and identification of the changed link head, changed link tail, and the user connectivity value to be assigned to the changed link. Table 1106 may also store a timestamp indicative of the time of the change and an operation code. In some embodiments, operation codes may include "insert," "update," or "delete" operations, corresponding to whether a link was inserted, a user connectivity value was changed, or a link was deleted, respectively. Other operation codes may be used in other embodiments.

FIG. 12 shows data structure 1210 used to support the connectivity determinations of the present disclosure. In some embodiments, data structure 1210 may be stored using key-value store 112 (FIG. 1), while tables 1200 are stored in data store 110 (FIG. 1). As described above, key-value store 112 (FIG. 1) may implement an HBase storage system and include BigTable support. Like a traditional relational database management system, the data shown in FIG. 12 may be stored in tables. However, the BigTable support may allow for an arbitrary number of columns in each table, whereas traditional relational database management systems may require a fixed number of columns.

Data structure 1210 may include node table 1212. In the example shown in FIG. 12, node table 1212 includes several columns. Node table 1212 may include row identifier column 1214, which may store 64-bit, 128-bit, 256-bit, 512-bit, or 1024-bit integers and may be used to uniquely identify each row (e.g., each node) in node table 1212. Column 1216 may include a list of all the incoming links for the current node. Column 1218 may include a list of all the outgoing links for the current node. Column 1220 may include a list of node identifiers to which the current node is connected. A first node may be connected to a second node if outgoing links may be followed to reach the second node. For example, for A→B, A is connected to B, but B may not be connected to A. Node table 1212 may also include one or more "bucket" columns 1222. These columns may store a list of paths that connect the current node to a target node. As described above, grouping paths by the last node in the path (e.g., the target node) may facilitate connectivity computations. As shown in FIG. 12, in some embodiments, to facilitate scanning, bucket column names may include the target node identifier appended to the end of the "bucket:" column.

Figure 13A:
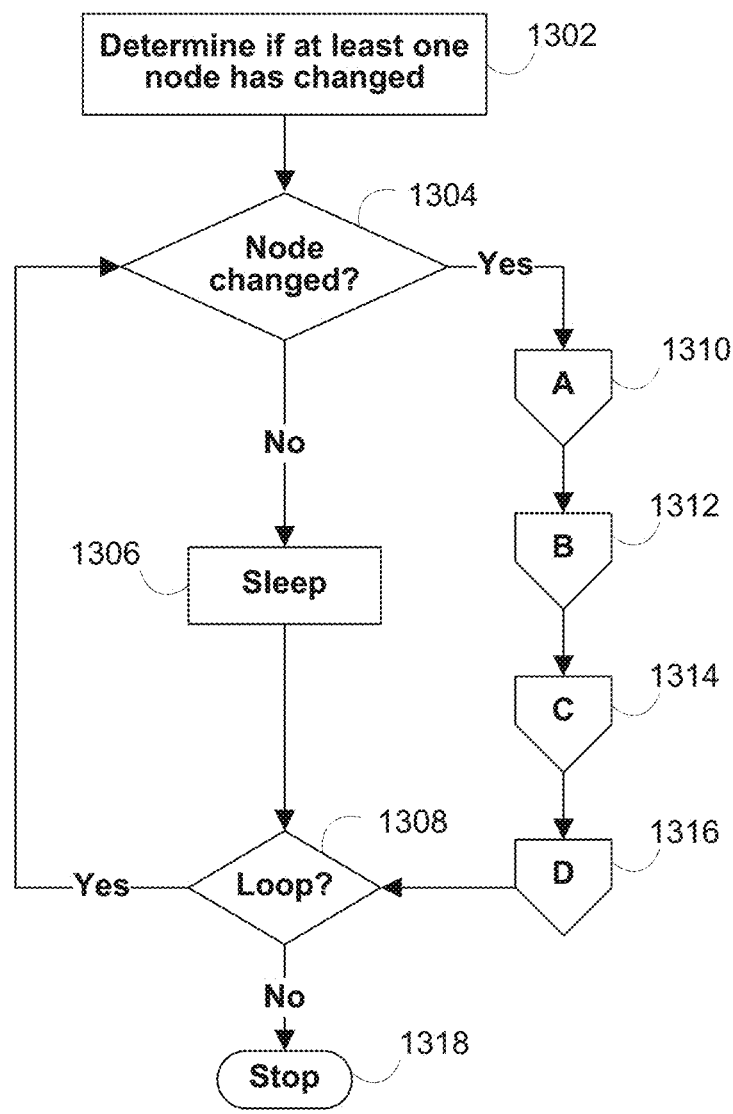
FIGS. 13A-E are illustrative processes for supporting connectivity determinations within a network community.

FIGS. 13A-13E show illustrative processes for determining the connectivity of nodes within a network community. The processes depicted in FIGS. 13A-13E may be used to determine a network component score, such as network connectivity component 406 depicted in FIG. 4. FIG. 13A shows process 1300 for updating a connectivity graph (or any other suitable data structure) associated with a network community. As described above, in some embodiments, each network community is associated with its own connectivity graph, digraph, tree, or other suitable data structure. In other embodiments, a plurality of network communities may share one or more connectivity graphs (or other data structure).

In some embodiments, the processes described with respect to FIGS. 13A-13E may be executed to make decisions prospectively (i.e., before an anticipated event). Such decisions may be made at the request of a user, or as part of an automated process. This prospective analysis may allow for the initiation of a transaction (or taking of some particular action) in a fluid and/or dynamic manner. In some embodiments, processing circuitry may anticipate an increase or decrease in a trust score as a result of making a certain decision. The processing circuitry may provide an alert to an end user, for example through one of user interface 600 or 700, that indicates to the end user that the trust score of the end user will increase/decrease as a result of the decision. In some embodiments, the prospective decision may also be made, either manually or automatically, based on the potential increase/decrease in trust score as a result of the decision. For example, processing circuitry may automatically make a prospective decision if the decision would result in an increase/decrease in a trust score within a certain threshold. In this manner, prospective decisions, whether made automatically or manually, may take into account a risk tolerance or risk preference of an end user.

At step 1302, a determination is made whether at least one node has changed in the network community. As described above, an audit record may be inserted into table 1106 (FIG. 11) after a node has changed. By analyzing table 1106 (FIG. 11), a determination may be made (e.g., by application server 106 of FIG. 1) that a new link has been added, an existing link has been removed, or a user connectivity value has changed. If, at step 1304, it is determined that a node has changed, then process 1300 continues to step 1310 (shown in FIG. 13B) to prepare the changed nodes, step 1312 (shown in FIG. 13C) to calculate paths originating from the changed nodes, step 1314 (shown in FIG. 13D) to remove paths that go through a changed node, and step 1316 (shown in FIG. 13E) to calculate paths that go through a changed node. It should be noted that more than one step or task shown in FIGS. 13B, 13C, 13D, and 13E may be performed in parallel using, for example, a cluster of cores. For example, multiple steps or tasks shown in FIG. 13B may be executed in parallel or in a distributed fashion, then multiple steps or tasks shown in FIG. 13C may be executed in parallel or in a distributed fashion, then multiple steps or tasks shown in FIG. 13D may be executed in parallel or in a distributed fashion, and then multiple steps or tasks shown in FIG. 13E may be executed in parallel or in a distributed fashion. In this way, overall latency associated with process 1300 may be reduced.

If a node change is not detected at step 1304, then process 1300 enters a sleep mode at step 1306. For example, in some embodiments, an application thread or process may continuously check to determine if at least one node or link has changed in the network community. In other embodiments, the application thread or process may periodically check for changed links and nodes every n seconds, where n is any positive number. After the paths are calculated that go through a changed node at step 1316 or after a period of sleep at step 1306, process 1300 may determine whether or not to loop at step 1308. For example, if all changed nodes have been updated, then process 1300 may stop at step 1318. If, however, there are more changed nodes or links to process, then process 1300 may loop at step 1308 and return to step 1304.

In practice, one or more steps shown in process 1300 may be combined with other steps, performed in any suitable order, performed in parallel (e.g., simultaneously or substantially simultaneously), or removed.

Figure 13B:
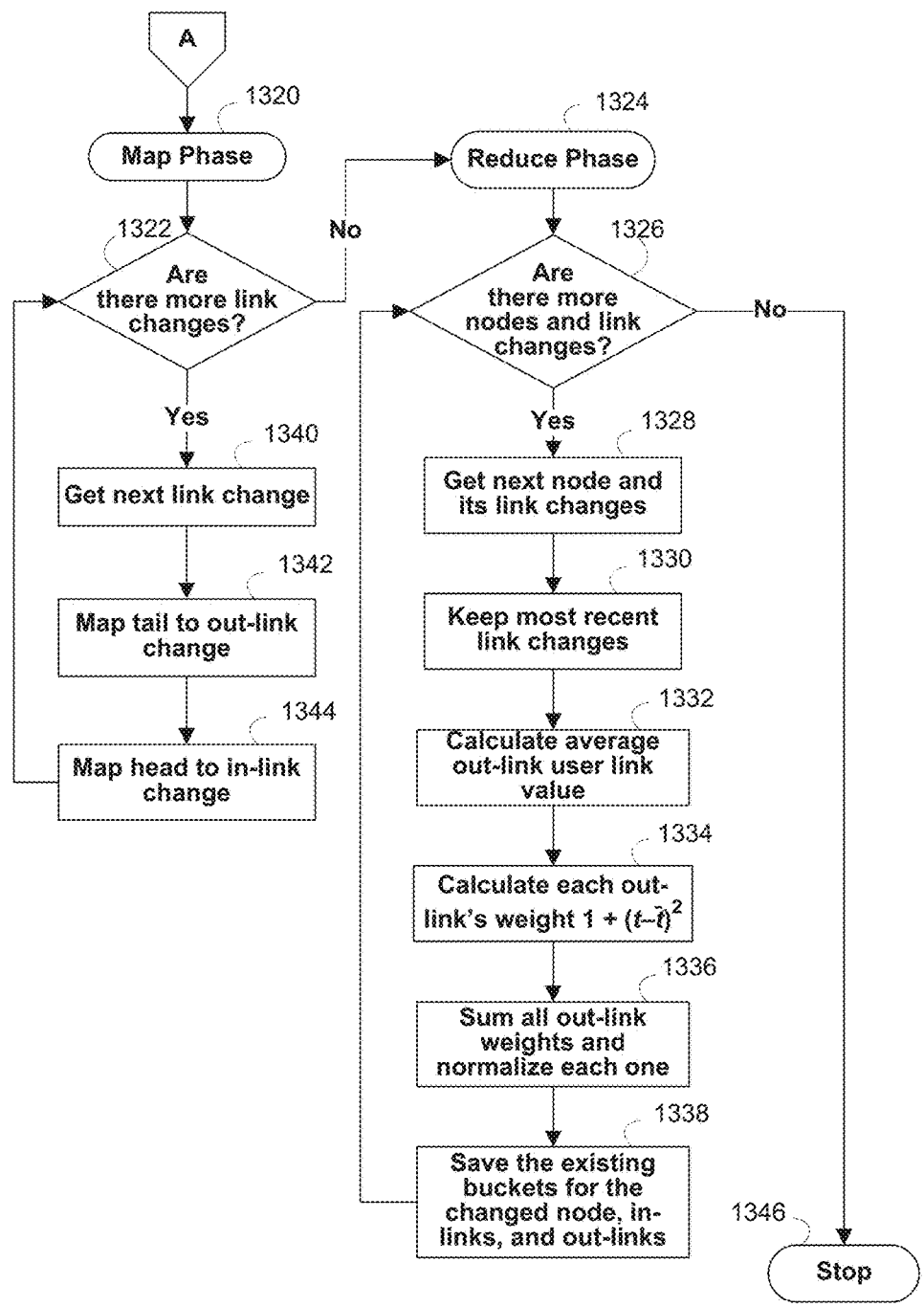

FIGS. 13B-13E each include processes with a "map" phase and "reduce" phase. As described above, these phases may form part of a map/reduce computational paradigm carried out by parallel computational framework 114 (FIG. 1), key-value store 112 (FIG. 1), or both. As shown in FIG. 13B, in order to prepare any changed nodes, map phase 1320 may include determining if there are any more link changes at step 1322, retrieving the next link change at step 1340, mapping the tail to out-link change at step 1342, and mapping the head to in-link change at step 1344.

If there are no more link changes at step 1322, then, in reduce phase 1324, a determination may be made at step 1326 that there are more nodes and link changes to process. If so, then the next node and its link changes may be retrieved at step 1328. The most recent link changes may be preserved at step 1330 while any intermediate link changes are replaced by more recent changes. For example, the timestamp stored in table 1106 (FIG. 11) may be used to determine the time of every link or node change. At step 1332, the average out-link user connectivity value may be calculated. For example, if node $n_1$ has eight out-links with assigned user connectivity values, these eight user connectivity values may be averaged at step 1332. At step 1334, each out-link's weight may be calculated in accordance with equation (1) above. All the out-link weights may then be summed and used to normalize each out-link weight at step 1336. For example, each out-link weight may be divided by the sum of all out-link weights. This may yield a weight between 0 and 1 for each out-link. At step 1338, the existing buckets for the changed node, in-links, and out-links may be saved. For example, the buckets may be saved in key-value store 112 (FIG. 1) or data store 110 (FIG. 1). If there are no more nodes and link changes to process at step 1326, the process may stop at step 1346.

Figure 13C:
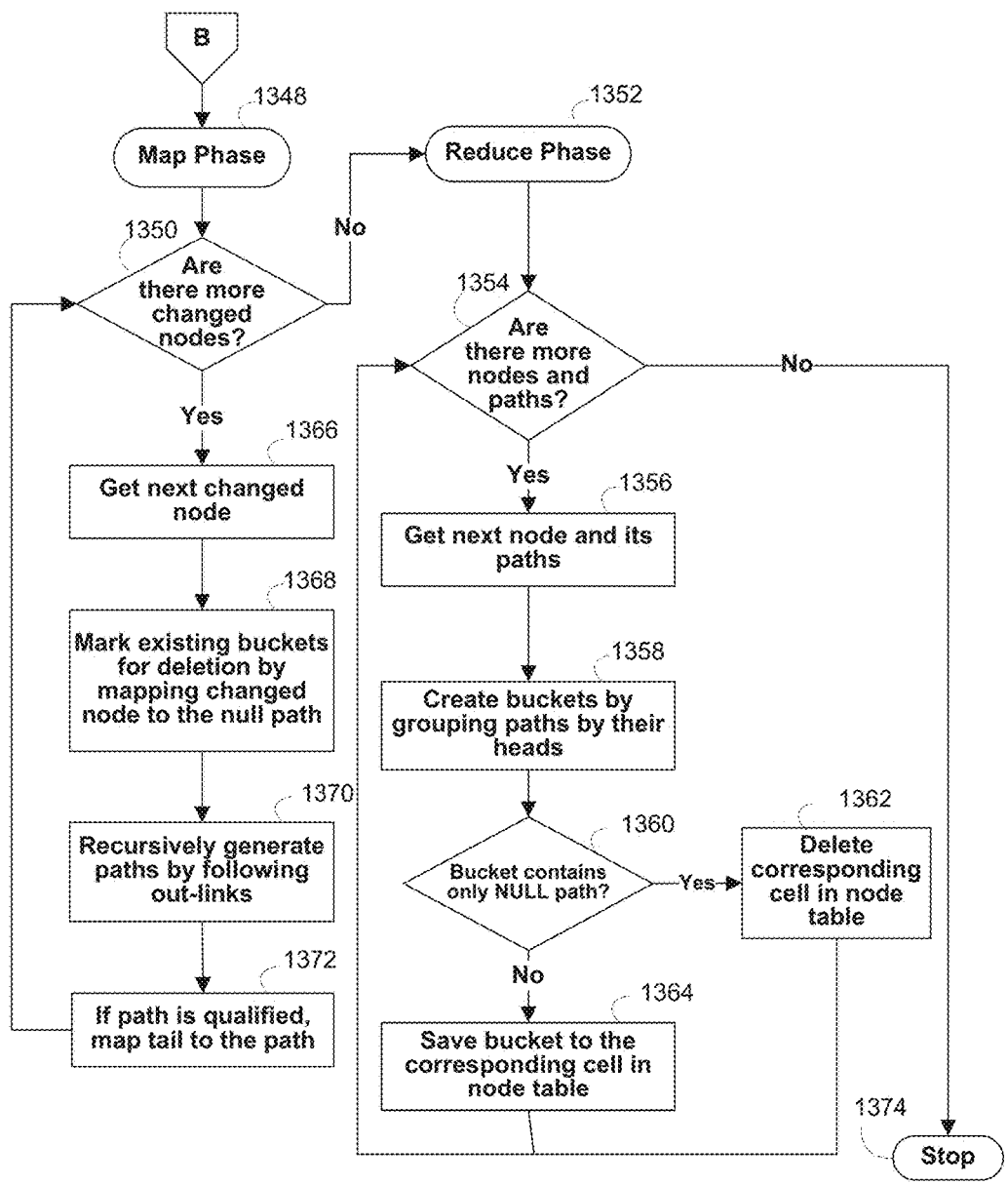

As shown in FIG. 13C, in order to calculate paths originating from changed nodes, map phase 1348 may include determining if there are any more changed nodes at step 1350, retrieving the next changed node at step 1366, marking existing buckets for deletion by mapping changed nodes to the NULL path at step 1368, recursively generating paths by following out-links at step 1370, and if the path is a qualified path, mapping the tail to the path. Qualified paths may include paths that satisfy one or more predefined threshold functions. For example, a threshold function may specify a minimum path weight. Paths with path weights greater than the minimum path weight may be designated as qualified paths.

If there are no more changed nodes at step 1350, then, in reduce phase 1352, a determination may be made at step 1354 that there are more nodes and paths to process. If so, then the next node and its paths may be retrieved at step 1356. At step 1358, buckets may be created by grouping paths by their head. If a bucket contains only the NULL path at step 1360, then the corresponding cell in the node table may be deleted at step 1362. If the bucket contains more than the NULL path, then at step 1364 the bucket is saved to the corresponding cell in the node table. If there are no more nodes and paths to process at step 1356, the process may stop at step 1374.

Figure 13D:
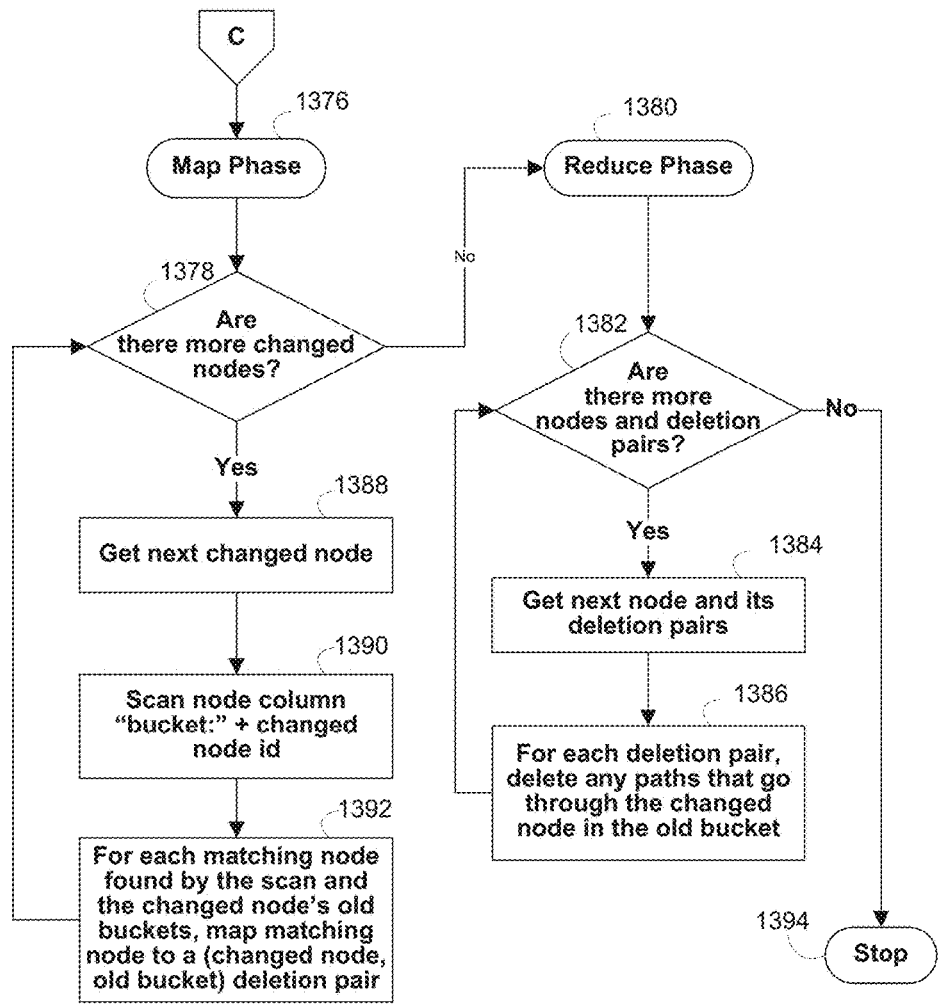

As shown in FIG. 13D, in order to remove paths that go through a changed node, map phase 1376 may include determining if there are any more changed nodes at step 1378 and retrieving the next changed node at step 1388. At step 1390, the "bucket:" column in the node table (e.g., column 1222 of node table 1212 (both of FIG. 12)) corresponding to the changed node may be scanned. For example, as described above, the target node identifier may be appended to the end of the "bucket:" column name. Each bucket may include a list of paths that connect the current node to the target node (e.g., the changed node). At step 1392, for each matching node found by the scan and the changed node's old buckets, the matching node may be matched to a (changed node, old bucket) deletion pair.

If there are no more changed nodes at step 1378, then, in reduce phase 1380, a determination may be made at step 1384 that there are more node and deletion pairs to process. If so, then the next node and its deletion pairs may be retrieved at step 1384. At step 1386, for each deletion pair, any paths that go through the changed node in the old bucket may be deleted. If there are no more nodes and deletion pairs to process at step 1382, the process may stop at step 1394.

Figure 13E:
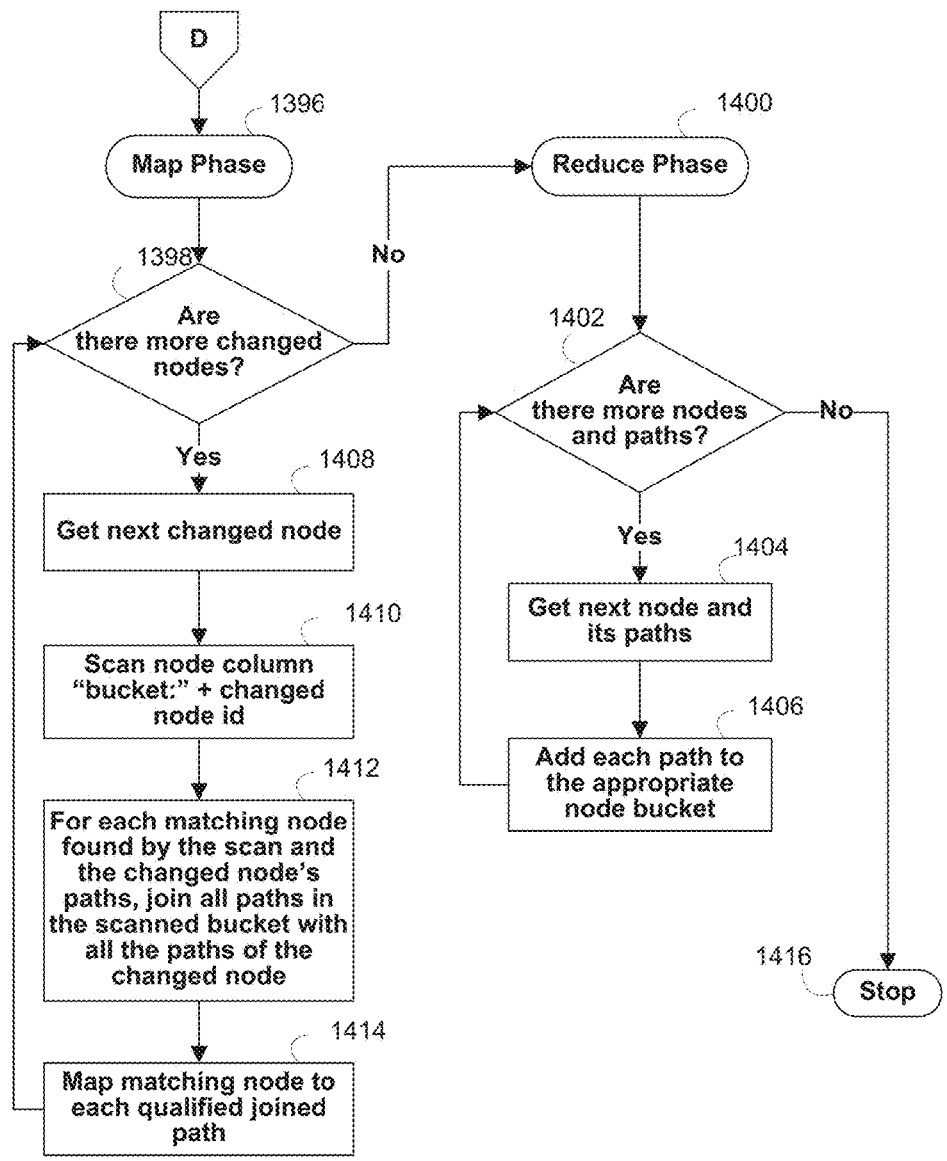

As shown in FIG. 13E, in order to calculate paths that go through a changed node, map phase 1396 may include determining if there are any more changed nodes at step 1398 and retrieving the next changed node at step 1408. At step 1410, the "bucket:" column in the node table (e.g., column 1222 of node table 1212 (both of FIG. 12)) corresponding to the changed node may be scanned. At step 1412, for each matching node found in the scan and the changed node's paths, all paths in the scanned bucket may be joined with all paths of the changed bucket. At step 1414, each matching node may be mapped to each qualified joined If there are no more changed nodes at step 1398, then, in reduce phase 1400, a determination may be made at step 1402 that there are more nodes and paths to process. If so, then the next node and its paths may be retrieved at step 1404. Each path may then be added to the appropriate node bucket at step 1406. If there are no more nodes and paths to process at step 1402, the process may stop at step 1416.

Figure 14:
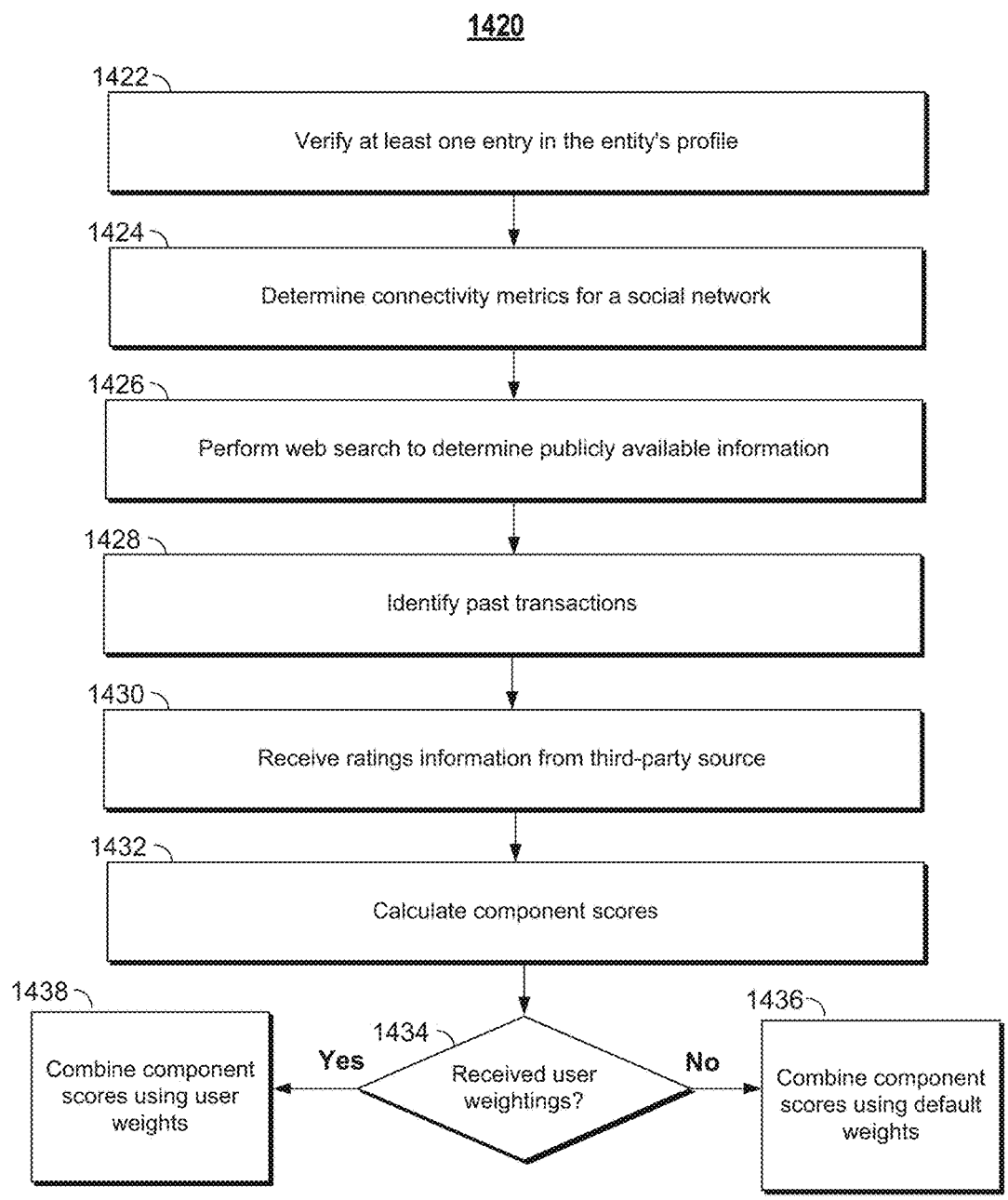
FIG. 14 is an illustrative process for calculating a system trust score.

FIG. 14 shows a process 1420 for calculating a system trust score in accordance with certain embodiments of the present disclosure. Process 1420 includes verifying at least one entry in the entity's profile at step 1422, determining connectivity metrics for a social network at step 1424, performing a web search to determine publicly available information at step 1426, identifying past transactions at step 1428, receiving ratings information from a third-party source at step 1430, calculating component scores at step 1432, determining whether user weightings have been received at step 143, combining component scores using default weights at step 1436, and combining component scores using user weights at step 1438. It will be understood that process 1420 depicts illustrative steps for calculating a system trust score, and that one or more of steps 1422-1438 may be omitted and additional steps added to process 1420 as will be apparent to those of skill in the art without departing from the scope hereof.

At step 1422, processing circuitry, such as processing circuitry of access application 102 or application server 106, may verify at least one entry in an entity's profile. The entry may be one or more pieces of verification data, such as verification data described in connection with data verification component 404 depicted in FIG. 4. For example, the processing circuitry may verify one or more of a human user's email address, phone number, mailing address, education information, employment information. At step 1424, the processing circuitry may determine connectivity metrics for a social network. The connectivity metrics may comprise metrics as discussed in connection with network connectivity component 406 depicted in FIG. 4. The connectivity metrics may include, but are not limited to, number of friends, number of posts, or number of messages. At step 1426, the processing circuitry may perform a web search to determine publicly available information associated with the entity. For example, the processing circuitry may perform search engine mining as discussed above in relation to search engine mining component 416 depicted in FIG. 4. The processing circuitry may also determine information such as the entity's credit score or available court data, as discussed above in relation to credit score component 408 and court data component 410 depicted in FIG. 4. At step 1428, the processing circuitry may identify past transactions associated with the entity. For example, the processing circuitry may identify past financial transactions that the entity has taken part in and whether the financial transactions were completed favorably (e.g., paid back a loan) or unfavorably (e.g., defaulted on a loan). At step 1430, the processing circuitry may receive ratings information from a third-party source, as discussed above in relation to ratings/feedback data component 412 depicted in FIG. 4. As an illustrative example, the processing circuitry may receive ratings from the Better Business Bureau or from an online ratings site such as Yelp about an entity. At 1432, the processing circuitry may calculate component scores based on the information received from steps 1424-1430. The processing circuitry may calculate the components scores in any suitable manner, such as the methods discussed above in FIGS. 8 and 9.

At step 1434, the processing circuitry may determine whether user-specified weightings have been received. For example, a user may have specified custom weightings through a user interface such as interface 700 depicted in FIG. 7. If user-specified weightings have been received, then the processing circuitry may combine the component scores using the user-specified weights at step 1438. If user-specified weights have not been received, then the processing circuitry may combine the component scores using default weights at step 1436, such as the default weights depicted in FIG. 5. In some embodiments, the processing circuitry may calculate the system trust score in response to a user request for the system trust score. For example, the user may press calculate button 618 depicted in FIG. 6, and in response, the processing circuitry may calculate the system trust score in substantially real-time. In other embodiments, the processing circuitry may calculate the system trust score in advance of a user request for the system trust score. In such embodiments, the processing circuitry may retrieve a pre-calculated system trust score, for example from data store 110 depicted in FIG. 1, in response to the user request for the system trust score.

Figure 15:
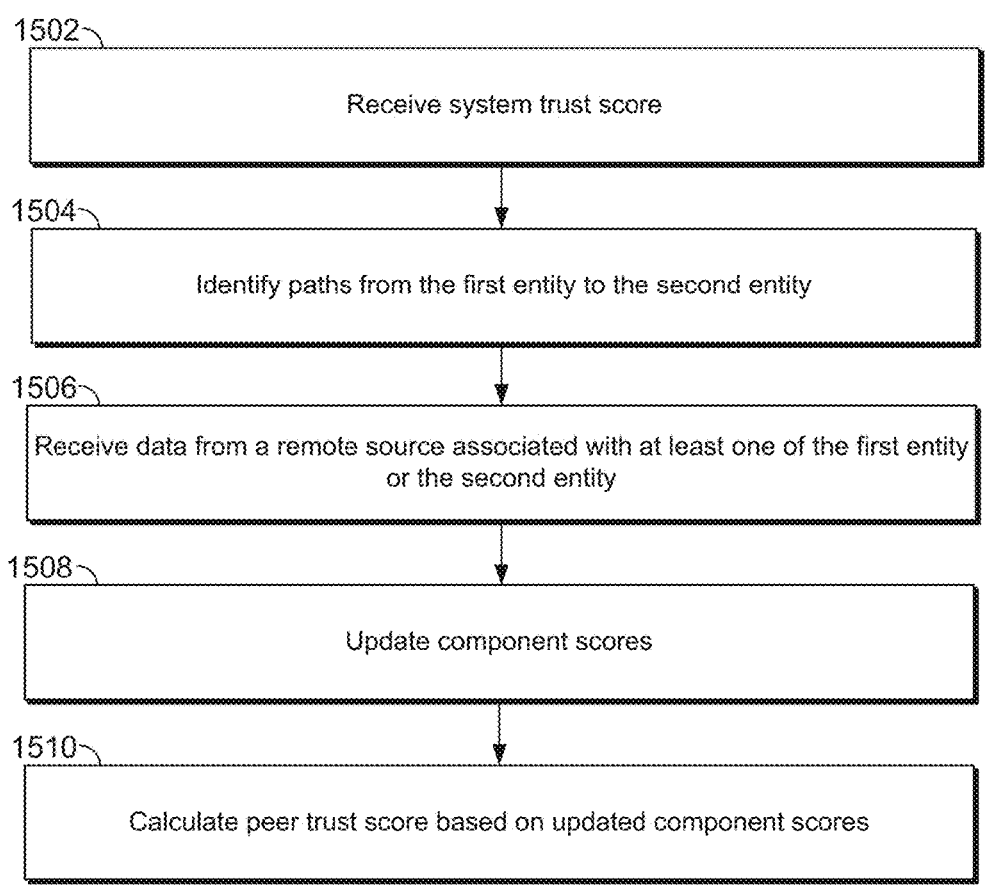
FIG. 15 is an illustrative process for calculating a peer trust score.

FIG. 15 shows a process 1500 for calculating a peer trust score in accordance with certain embodiments of the present disclosure. Process 1500 includes receiving a system trust score at step 1502, identifying paths from a first entity to a second entity at step 1504, receiving data from a remote source associated with at least one of the first entity or the second entity at step 1506, updating component scores at step 1508, and calculating a peer trust score based on the updated component scores at step 1510. It will be understood that process 1500 depicts illustrative steps for calculating a peer trust score, and that one or more of steps 1502-1510 may be omitted and additional steps added to process 1500 as will be apparent to those of skill in the art without departing from the scope hereof. For example, the process 1500 for calculating a peer trust score is depicted in FIG. 15 as an update to a system trust score. However, it will be understood that the peer trust score may be calculated from component scores independently from a system trust score, as discussed above.

At step 1502, processing circuitry, such as processing circuitry of access application 102 or application server 106, may receive a system trust score. The system trust score may have been calculated previously, such as by a method similar to process 1420 depicted in FIG. 14. At step 1504, the processing circuitry may identify paths from a first entity to a second entity. For example, the processing circuitry may utilize a path counting approach, as discussed above in relation to FIGS. 11-13. At step 1506, the processing circuitry my receive data from a remote source associated with at least one of the first entity or the second entity. For example, the processing circuitry may receive data regarding the second entity's social connections, credit score, court data, or previous transaction history with the first entity.

At step 1508, the processing circuitry may update component scores based on the information from steps 1502-1506. In some embodiments, updating component scores comprises updating less than all of the component scores that comprise the system trust score. For example, the processing circuitry may only update the network connectivity component to take into account the mutual contacts of the first entity and the second entity. Other component scores that were calculated with respect to the second entity's system trust score, such as credit score or court data, may not be affected by the additional social graph information. At step 1510, the processing circuitry may calculate the peer trust score based on the updated components by, for instance, combining the component scores using a weighted average. In some embodiments, the processing circuitry may calculate the peer trust score in response to a user request for the peer trust score. For example, the user may press calculate button 618 depicted in FIG. 6, and in response, the processing circuitry may calculate the peer trust score in substantially real-time. In other embodiments, the processing circuitry may calculate the peer trust score in advance of a user request for the peer trust score. In such embodiments, the processing circuitry may retrieve a pre-calculated peer trust score, for example from data store 110 depicted in FIG. 1, in response to the user request for the peer trust score.

Figure 16:
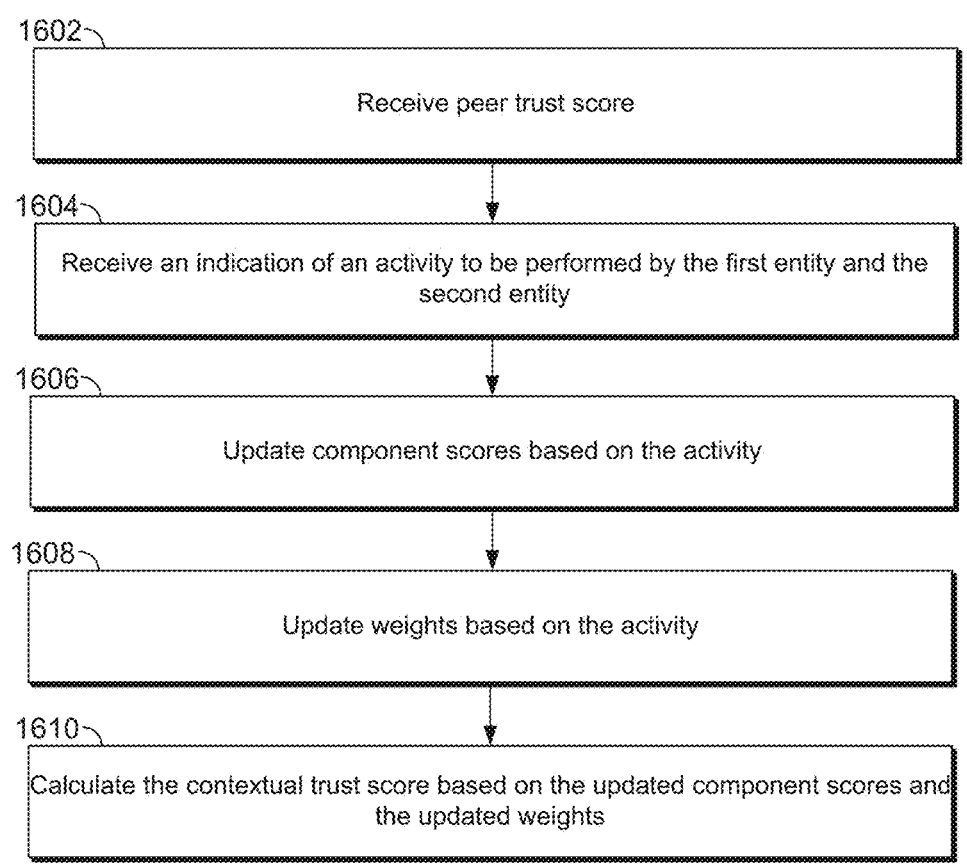
FIG. 16 is an illustrative process for calculating a contextual trust score.

FIG. 16 shows a process 1600 for calculating a contextual trust score in accordance with certain embodiments of the present disclosure. Process 1600 includes receiving a peer trust score at step 1602, receiving an indication of an activity to be performed by a first entity and a second entity at step 1604, updating component scores based on the activity at step 1606, updating weights based on the activity at step 1608, and calculating a contextual score based on the updated component scores and the updated weights at step 1610. It will be understood that process 1600 depicts illustrative steps for calculating a contextual trust score, and that one or more of steps 1602-1610 may be omitted and additional steps added to process 1600 as will be apparent to those of skill in the art without departing from the scope hereof. For example, the process 1600 for calculating a peer trust score is depicted in FIG. 16 as an update to a peer trust score. However, it will be understood that the contextual trust score may be calculated from component scores independently from a system trust score or a peer trust score, as discussed above.

At step 1602, processing circuitry, such as processing circuitry of access application 102 or application server 106, may receive a peer trust score. The system trust score may have been calculated previously, such as by a method similar to process 1500 depicted in FIG. 15. At step 1604, the processing circuitry may receive an indication of an activity to be performed by a first entity and a second entity. For example, the processing circuitry may receive the indication of the activity through transaction selector 606 depicted in FIG. 6. The processing circuitry may also receive details of the activity/transaction through transaction details field 608, as discussed above in relation to FIG. 6. At step 1606, the processing circuitry may update component scores based on the activity. For example, certain component scores may be affected by a type of transaction. As an illustrative example, the transaction history component, such as transaction history component 418 depicted in FIG. 4, may be updated to reflect only the transaction history of the particular type of transaction that is being performed by the first and second entity. At step 1608, the processing circuitry may update weights based on the activity. As discussed above in relation to FIG. 7, different transaction types may be associated with different weightings, and the components may be combined according to these different weightings. At step 1610, the processing circuitry may calculate the contextual trust score based on the updated component scores and the updated weights, for example, by taking a weighted average of the updated component scores according to the updated weights. In some embodiments, the processing circuitry may calculate the contextual trust score in response to a user request for the contextual trust score. For example, the user may press calculate button 618 depicted in FIG. 6, and in response, the processing circuitry may calculate the contextual trust score in substantially real-time. In other embodiments, the processing circuitry may calculate the contextual trust score in advance of a user request for the contextual trust score. In such embodiments, the processing circuitry may retrieve a pre-calculated contextual trust score, for example from data store 110 depicted in FIG. 1, in response to the user request for the contextual trust score.

Figure 17:
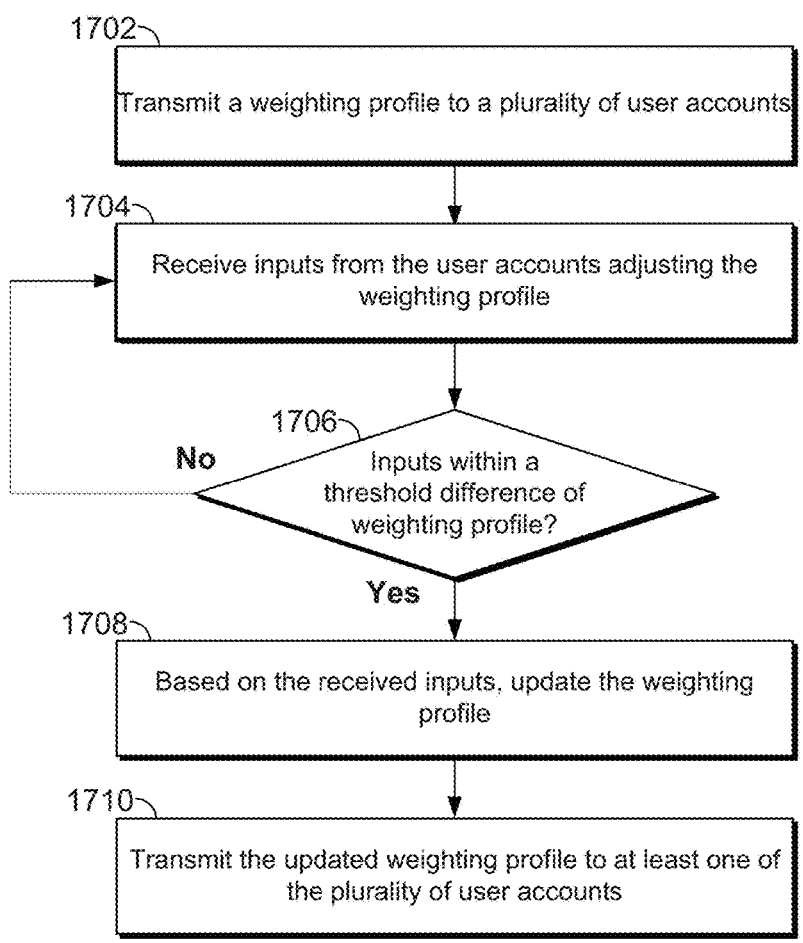
FIG. 17 is an illustrative process for adjusting weighting profiles based on user inputs.

FIG. 17 is an illustrative process 1700 for adjusting weighting profiles based on user inputs. Process 1700 includes transmitting a weighting profile to a plurality of user accounts at 1702, receiving inputs from the user accounts adjusting the weighting profile at 1704, determining whether the inputs are within a threshold difference of the weighting profile at 1706, updating the weighting profile based on the received inputs at 1708, and transmitting the updated weighting profile to at least one of the plurality of user accounts at 1710. It will be understood that process 1700 depicts illustrative steps for adjusting weighting profiles based on user inputs, and that one or more of steps 1702-1710 may be omitted and additional steps added to process 1700 as will be apparent to those of skill in the art without departing from the scope hereof.

At 1702, processing circuitry may transmit a weighting profile to a plurality of user accounts, which may be associated with a user device. The weighting profile may be a default weighting profile comprising a set of weights for calculating a trust score. Each weight of the set of weights may correspond to data from a data source, and the set of weights may be used to calculate a weighted average for combining the data from the various data sources. At 1704, the processing circuitry may receive inputs from the user accounts adjusting the weighting profile. For instance, entities may adjust the weights in the weighting profile using a user interface similar to the interface depicted in FIG. 7. In some embodiments, adjustment of one weight in the set of weights may require a corresponding adjustment, either automatically or manually by the entity, of one or more other weights in the set of weights. As an illustrative example, an increase of 10% of one component may require the user to reduce other weights by a collective 10% (for instance by reducing one other component by 10% or five other components by 2% each).

At 1706, the processing circuitry may optionally determine whether the inputs are within a threshold difference of the weighting profile. If the inputs are not within a threshold difference, then the processing circuitry may return to 1704. For example, large changes to weights may be ignored by the processing circuitry as outliers when updating a default weighting profile. At 1708, if the inputs are within a threshold difference of the weighting profile, the processing circuitry may update the weighting profile based on the received inputs. In some embodiments, updating the weighting profile comprises calculating an average set of weights based on the received inputs. At 1710, the processing circuitry may transmit the updated weighting profile to at least one of the plurality of user accounts. In some embodiments, the user accounts may be associated with user devices. Accounts may be accounts requiring the user to log in, internet accounts, accounts on a mobile device, user profiles; or accounts may refer to information stored about a user on local or remote storage devices.

Figure 18:
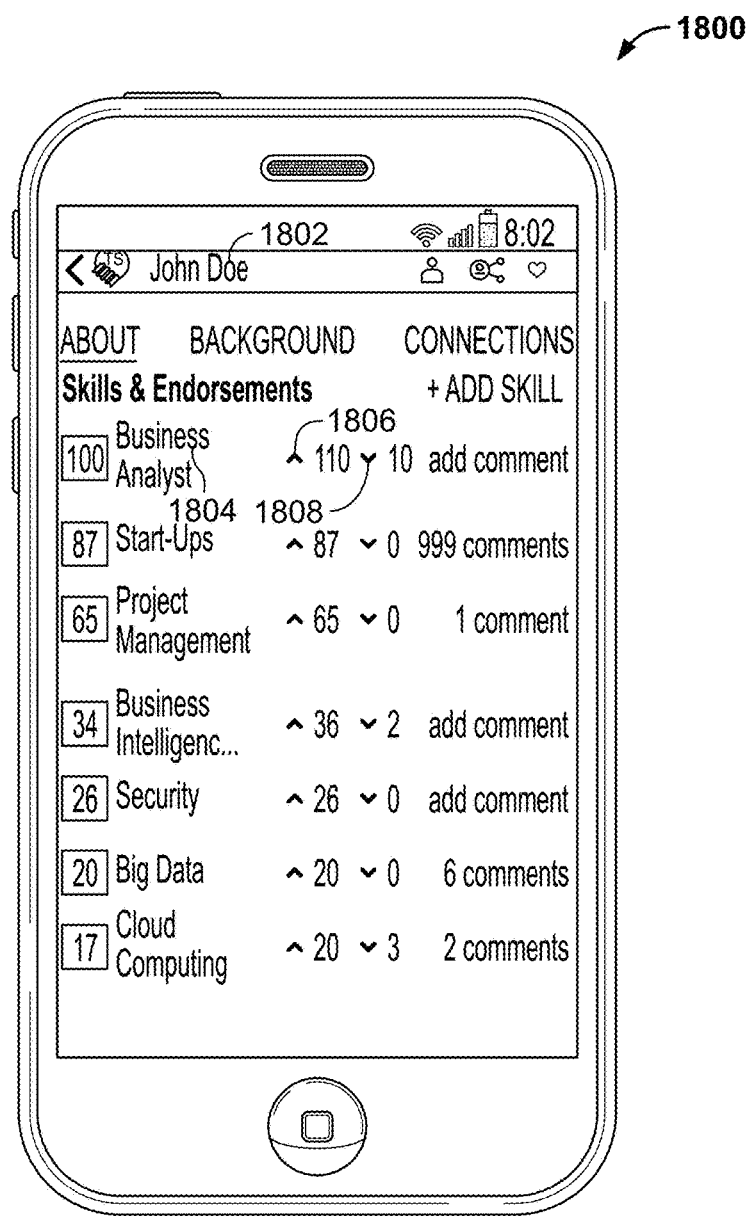
FIG. 18 is an illustrative display for providing attributes associated with an entity.

FIG. 18 is an illustrative display 1800 for providing attributes associated with an entity. Display 1800 may include an identification of the entity 1802, an indication of the attribute 1804, and feedback inputs 1806 and 1808. Although the display 1800 is depicted on a mobile phone interface, it will be understood that display 1800 may be displayed on any suitable device, including, but not limited to mobile phones, computers, or tablets. Furthermore, it will be understood by those of skill in the art that the attributes are not limited to the "skills & endorsements" depicted in display 1800, and that such attributes are provided for illustrative purposes only.

Indicator 1804 may indicate an attribute associated with the entity indicated by 1802. For instance, the entity "John Doe" may be associated with the attribute "business analyst." This attribute may have been added by the entity itself, or by the crowd. For instance, the display 1800 may provide a user-selectable icon "add skill," allowing other entities to add attributes associated with the entity whose profile is depicted in display 1800. The display 1800 may also include user-selectable icons 1806 and 1808, depicted in FIG. 18 as up and down arrows, which allow the crowd to provide feedback on the attribute. In some embodiments, an entity may only be allowed to provide feedback once. That is, once the entity of the crowd has selected one of the up or down arrows (either "agreeing" or "disagreeing" with the attribute), the user-selectable icons 1806 and 1808 may deactivate and disallow the entity of the crowd from providing further feedback. In some embodiments, such as the illustrative embodiment depicted in FIG. 18, the display 1800 may provide an "add comment" selectable icon. When selected, this icon may allow an entity of the crowd to provide a comment on the attribute. In some embodiments, the icon may also display how many comments have already been left by other users of the crowd.

In some embodiments, the display 1800 may also display a net attribute score for each of the attributes 1804 listed. For example, the "business analyst" attribute has a net attribute score of 100 (110 "likes" minus 10 "dislikes"), and this net attribute score is shown next to the indicator 1804.

Figure 19:
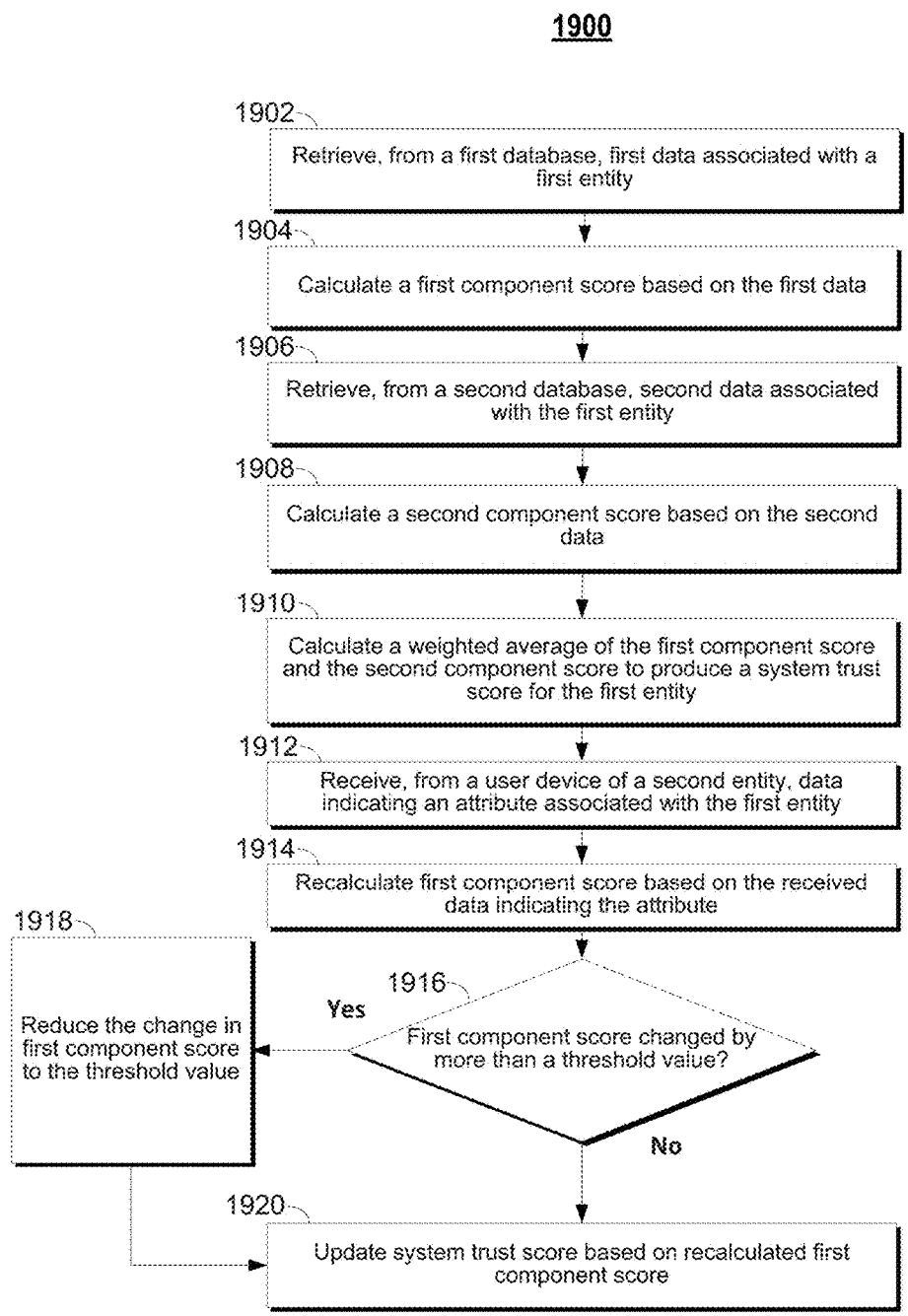
FIG. 19 is an illustrative process for calculating a system trust score based on attributes associated with an entity.

FIG. 19 is an illustrative process 1900 for calculating a system trust score based on attributes associated with an entity. Process 1900 includes retrieving, from a first database, first data associated with a first entity at 1902, calculating a first component score based on the first data at 1904, retrieving, from a second database, second data associated with the first entity at 1906, calculating a second component score based on the second data at 1908, calculating a weighted average of the first component score and the second component score to produce a system trust score for the first entity at 1910, receiving, from a user device of a second entity, data indicating an attribute associated with the first entity at 1912, recalculating the first component score based on the received data indicating the attribute at 1914, determining whether the first component score changed by more than a threshold value at 1916, reducing the change in first component score to the threshold value at 1918, and updating a system trust score based on the recalculated first component score at 1920. It will be understood that process 1900 depicts illustrative steps calculating a system trust score based on attributes associated with an entity, and that one or more of steps 1902-1920 may be omitted and additional steps added to process 1900 as will be apparent to those of skill in the art without departing from the scope hereof.

At 1902, processing circuitry may retrieve, from a first database, first data associated with a first entity at 1902. The first data may be received from any suitable local or remote database, such as any of the databases discussed in conjunction with FIG. 4 above. At 1904, the processing circuitry may calculate a first component score based on the first data. 1904 may be substantially similar to 1432 discussed in conjunction with FIG. 14 above. Similar to 1902 and 1904, the processing circuitry may retrieve, from a second database, second data associated with the first entity at 1906 and calculate a second component score based on the second data at 1908. The second database may be a different database than the first database. Although only two component scores are discussed in process 1900, it will be understood that any number of component scores may be calculated, and that more than one component score may be calculated based on data retrieved from one database. At 1910, the processing circuitry may calculate a weighted average of the first component score and the second component score to produce a system trust score. 1910 may be substantially similar to steps 1436 and 1438 from FIG. 14 discussed above in relation to calculating a system trust score.

At 1910, the processing circuitry may receive, from a user device of a second entity, data indicating an attribute associated with the first entity at 1912. In some embodiments, the data indicating the attribute may comprise an indication of the attribute. For example, the second entity may provide the attribute using any suitable user interface of a user device. In some embodiments, the data indicating the attribute may comprise feedback associated with the attribute. For example, as discussed above, an entity may provide feedback for an attribute through user-selectable icons of a user interface, such as like/dislike, thumbs up/thumbs down, a star-based system, or a numeric rating system. The data indicating the attribute may comprise data indicating that the entity has selected one or more of these user-selectable icons and provided feedback for the attribute.

At 1914, the processing circuitry may recalculate the first component score based on the received data indicating the attribute at 1914. As discussed above, attributes may be used to adjust component scores and/or trust scores. In some embodiments, the attribute itself may cause an adjustment to the component scores and/or trust scores. For instance, the fact that an entity is associated with the attribute may cause the component and/or trust score to increase or decrease by a predetermined amount (such as a number of points or a preset percentage of the component or trust score). In some embodiments, feedback for the attribute left by the second entity may be used to calculate a net attribute score, and the adjustment of the component and/or trust score may be based on the net attribute score. For example, the processing circuitry may calculate a difference between a number of positive feedback and a number of negative feedback left by other entities in the computer network for the attribute and adjust the component score related to the attribute and/or the trust score by a proportional amount.

At 1916, the processing circuitry may optionally determine whether the first component score changed by more than a threshold value. In some embodiments, the processing circuitry may skip 1916 and continue directly to 1920. In other embodiments, the processing circuitry may retrieve a threshold value from memory, such as local memory or remote storage of a remote database, that indicates a threshold or maximum value for the component score. The threshold or maximum value may also indicate the maximum amount that the first component score may be adjusted based on the attribute or net attribute score. If the first component score changed by more than the threshold value, then the processing circuitry may reduce the change in first component score to the threshold value at 1918 and update the system trust score based on the recalculated first component score at 1920. If the first component score did not change by more than the threshold value, then the processing circuitry may continue directly to 1920 and update the system trust score based on the recalculated first component score. Updating the system trust score may be substantially similar to 1434 to 1438 depicted in FIG. 14. For example, updating the system trust score may comprise receiving a set of weightings (for example, supplied either by the user or by a system administrator) and combining the first component score and the second component score using a weighted average according to the set of weightings.

Figure 20:
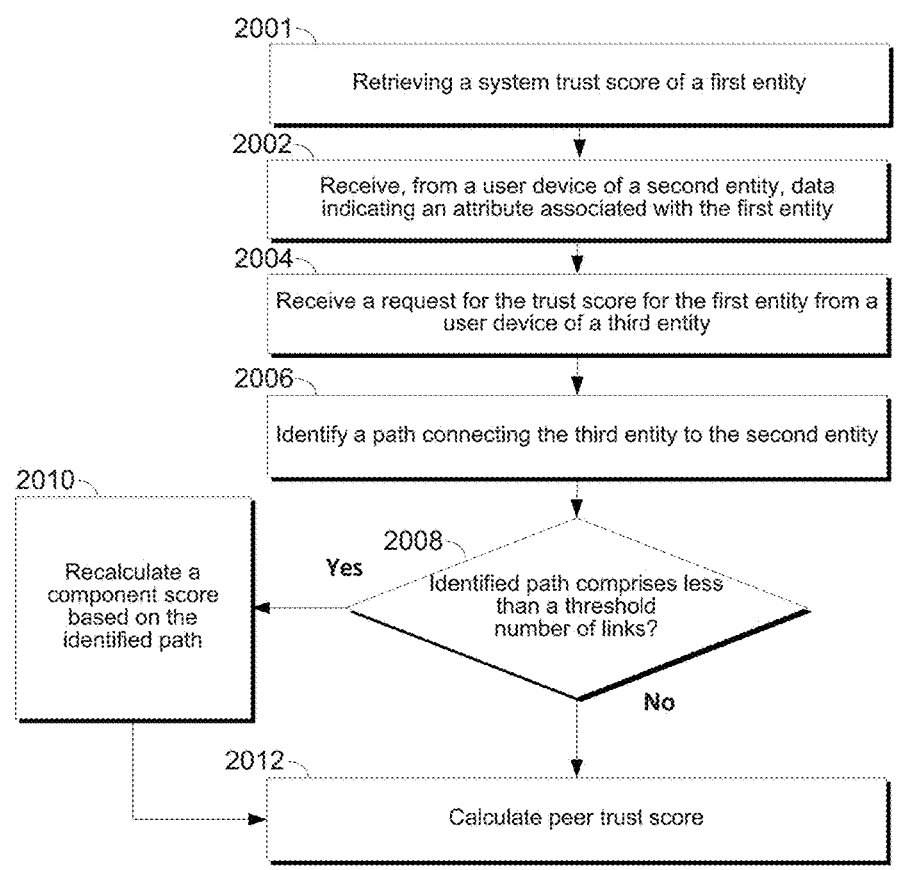
FIG. 20 is an illustrative process for calculating a peer trust score based on attributes associated with an entity.

FIG. 20 is an illustrative process 2000 for calculating a peer trust score based on attributes associated with an entity. Process 2000 includes retrieving a system trust score of a first entity at 2001, receiving, from a user device of a second entity, data indicating an attribute associated with the first entity at 2002, receiving a request for the trust score for the first entity from a user device of a third entity at 2004, identifying a path connecting the third entity to the second entity at 2006, determining whether the identified path comprises less than a threshold number of links at 2008, recalculating a component score based on the identified path at 2010, and calculating the peer trust score at 2012. It will be understood that process 2000 depicts illustrative steps for calculating a peer trust score based on attributes associated with an entity, and that one or more of steps 2001-2014 may be omitted and additional steps added to process 2000 as will be apparent to those of skill in the art without departing from the scope hereof.

At 2001, the processing circuitry may retrieve a system trust score of a first entity at 2001. For example, the processing circuitry may retrieve the system trust score, which may have been calculated according to process 1400 or 1900, from local memory or remote memory of a remote database. At 2002, the processing circuitry may receive, from a user device of a second entity, data indicating an attribute associated with the first entity. 2002 may be substantially similar to 1912 described above in relation to FIG. 19.

At 2004, the processing circuitry may receive a request for the trust score for the first entity from a user device of a third entity. For instance, the third entity (i.e., the requesting entity) may request a peer trust score for the first entity (i.e., the target entity). At 2006, the processing circuitry may determine whether any of the entities of the "crowd," such as the second entity, are connected to the third entity in a computer network. In some embodiments, this determination comprises identifying a path connecting the third entity to the second entity as shown in 2006. In some embodiments, identifying the path comprises identifying a path from the third entity to the second entity that has less than a threshold number of links, as shown in 2008. In this manner, the processing circuitry may determine whether the second entity is sufficiently related to the third entity, and whether the feedback of the second entity on the attribute should be treated with greater weight. If, at 2008, the processing circuitry identifies a path comprising less than the threshold number of links, the processing circuitry may recalculate a component score based on the identified path at 2010. For example, the processing circuitry may further adjust the component score, either by increasing or decreasing the component score, in a similar fashion as discussed in conjunction with 1914 depicted in FIG. 19. After recalculating the component score, the processing circuitry may proceed to 2012. If the processing circuitry cannot identify a path from the third entity to the second entity comprising less than a threshold number of links, then the processing circuitry may also proceed to 2012 without recalculating the component score. The processing circuitry may calculate the peer trust score at 2012 in a similar manner as describe in relation to FIG. 15.

Figure 21:
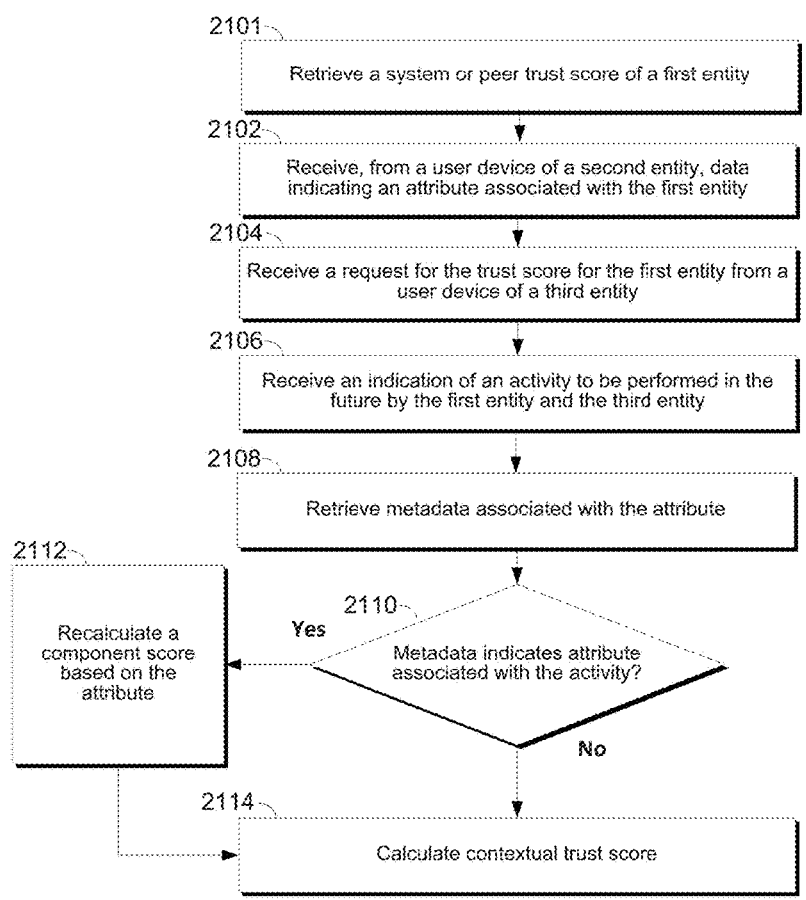
FIG. 21 is an illustrative process for calculating a contextual trust score based on attributes associated with an entity.

FIG. 21 is an illustrative process 2100 for calculating a contextual trust score based on attributes associated with an entity. Process 2100 includes retrieving a system or peer trust score of a first entity at 2101, receiving, from a user device of a second entity, data indicating an attribute associated with the first entity at 2102, receiving a request for the trust score for the first entity from a user device of a third entity at 2104, receiving an indication of an activity to be performed in the future by the first entity and the third entity at 2106, retrieving metadata associated with the attribute at 2108, determining that the metadata indicates that the attribute is associated with the activity at 2110, recalculating a component score based on the attribute at 2112, and calculating a contextual trust score at 2114. It will be understood that process 2100 depicts illustrative steps for calculating a contextual trust score based on attributes associated with an entity, and that one or more of steps 2101-2114 may be omitted and additional steps added to process 2100 as will be apparent to those of skill in the art without departing from the scope hereof.

At 2101, processing circuitry may retrieve a system or peer trust score of a first entity. For example, the processing circuitry may retrieve the system or peer trust score, which may have been calculated according to any one of the processes 1400, 1500, 1900, or 2000, from local memory or remote memory of a remote database. At 2102, the processing circuitry may receive, from a user device of a second entity, data indicating an attribute associated with the first entity. 2102 may be substantially similar to 2002 and 1912 described above in relation to FIGS. 19 and 20.

At 2104, the processing circuitry may receive a request for the trust score for the first entity from a user device of a third entity, and at 2106, the processing circuitry may receive an indication of an activity to be performed in the future by the first entity and the third entity. For example, the third entity may request a contextual trust score and identify a certain activity or transaction that it is planning or wishes to perform with the first entity. At 2108, the processing circuitry may retrieve metadata associated with the attribute. The processing circuitry may retrieve the metadata from any suitable storage location, including local memory or remote memory of a remote database. In some embodiments, the metadata associated with the attribute may be stored with the attribute. For example, data indicating the attribute may comprise a header or appended metadata that indicate information about the attribute, including what data the attribute might relate to, what data or types of data might automatically assign the attribute to an entity, what component scores the attribute is related to, and what transaction/activity types the attribute is related to. In some embodiments, the metadata about the attribute may comprise data and/or instructions for adjusting component or trust scores based on net attribute scores. In some embodiments, the metadata about the attribute may be stored separately or in separate locations as data indicating the attribute.

At 2110, the processing circuitry may determine that the metadata indicates that the attribute is associated with the activity. For example, the processing circuitry may search the metadata for a data entry that indicates a relationship between the attribute and the activity. If the activity and the attribute are related or associated, the processing circuitry may continue to 2112 and recalculate a component score based on the attribute. 2112 may be substantially similar to 2010 discussed above in relation to FIG. 20. If the metadata does not indicate that the attribute is associated with the activity, then the processing circuitry may proceed to 2114 and calculate the contextual trust score. 2114 may be substantially similar to the steps of FIG. 16, discussed above.

Figure 22:
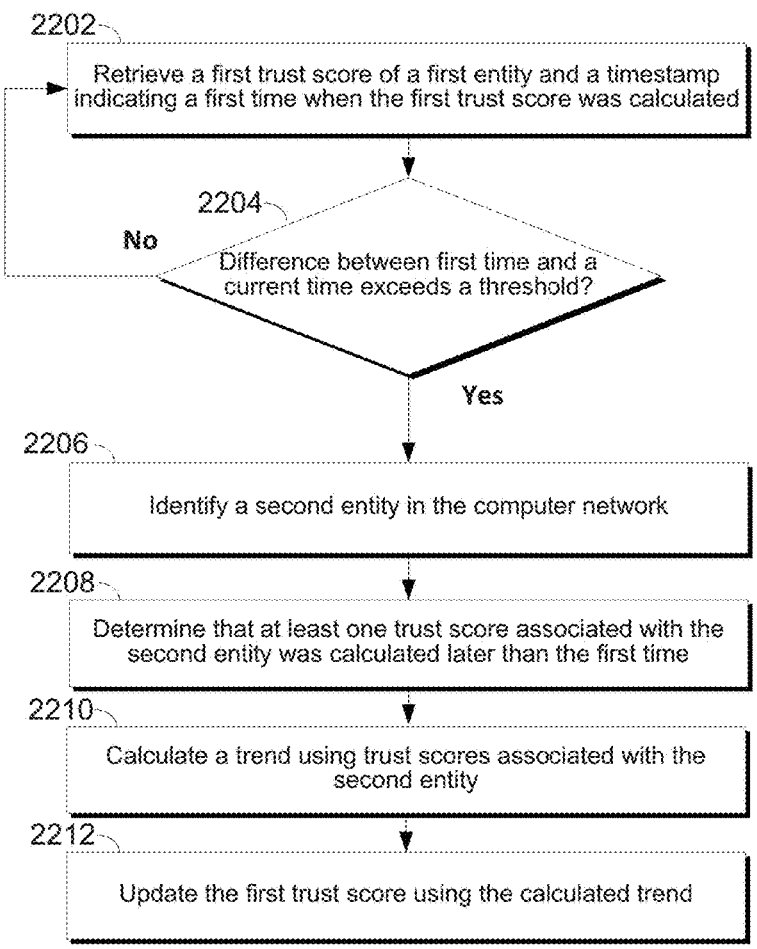
FIG. 22 is an illustrative process for updating a trust score based on extrapolated trends.

FIG. 22 is an illustrative process 2200 for updating a trust score based on extrapolated trends. Process 2200 includes retrieving a first trust score of a first entity and a timestamp indicating a first time when the first trust score was calculated at 2202, determining whether a difference between the first time and a current time exceeds a threshold at 2204, identifying a second entity in the computer network at 2206, determining that at least one trust score associated with the second entity was calculated later than the first time at 2208, calculating a trend using trust scores associated with the second entity at 2210, and updating the first trust score using the calculated trend at 2212. It will be understood that process 2200 depicts illustrative steps for updating a trust score based on extrapolated trends, and that one or more of steps 2202-2212 may be omitted and additional steps added to process 2200 as will be apparent to those of skill in the art without departing from the scope hereof.

At 2202, processing circuitry may retrieve a first trust score of a first entity and a timestamp indicating a first time when the first trust score was calculated. The processing circuitry may retrieve the first trust score and timestamp from any suitable storage, including local memory or remote memory of a remote database. In some embodiments, the first trust score and the timestamp may be stored together. For example, the first trust score and timestamp may be stored as the first and second elements of an array structure. In other embodiments, the first trust score and the timestamp may be stored separately and/or in separate data structures.

At 2204, the processing circuitry may determine whether a difference between the first time and a current time exceeds a threshold period of time. If the difference does not exceed the threshold period of time, this may indicate that the first trust score was calculated relatively recently, and the processing circuitry may return to 2202 to repeat the process 2200 at a later time. If the difference does exceed the threshold period of time, this may indicate that the first trust score is relatively outdated, and the processing circuitry may continue to 2206. Although the method of updating a trust score for an entity based on trends in trust scores of other entities is described in relation to a determination that the first trust score is relatively "outdated," it will be understood that this method of updating trust scores may be applied even when the first trust score is not outdated. For instance, in some embodiments, step 2204 may be optional, and the processing circuitry may proceed to adjust the first trust score based on trends in trust scores of other entities.

At 2206, the processing circuitry may identify a second entity in the computer network. In some embodiments, the processing circuitry may identify the second entity by identifying a path from the first entity to the second entity. The processing circuitry may identify a path from the first entity to the second entity that comprises fewer than a threshold number of links. In some embodiments, the processing circuitry may choose the second entity randomly from a plurality of entities. In still other embodiments, the processing circuitry may identify a plurality of entities. At 2208, the processing circuitry may determine that at least one trust score associated with the second entity was calculated later than the first time. For example the processing circuitry may retrieve at least one trust score associated with the second entity (e.g., from local memory or remote memory) and a time stamp that indicates a time that the at least one trust score was calculated. The processing circuitry may then compare the time stamp to the time stamp for the first trust score to determine which trust score was calculated later. In some embodiments, 2208 may be optional, and the processing circuitry may continue to 2210 without performing 2208. In such embodiments, the processing circuitry may update the first trust score based on trends of trust scores associated with the second entity, irrespective of when the respective trust scores were calculated.

At 2210, the processing circuitry may calculate a trend using trust scores associated with the second entity. The trend may comprise a linear regression between two data points, such as a (trust score, time) coordinate, polynomial regression, or any other type of pattern matching suitable for two or more data points, as will be understood by those of skill in the art. As an illustrative example, the processing circuitry may retrieve at least two trust scores associated with the second entity and corresponding timestamps for when the at least two trust scores were calculated. The processing circuitry may calculate a difference between two trust scores and a difference in their calculation times. By dividing the difference of the two trust scores by the difference in their calculation times, the processing circuitry may produce a slope of increase or decrease of the trust score. In some embodiments, the processing circuitry may only receive trust scores associated with the second entity that are associated with calculation times that are later than the calculation time of the first trust score for the first entity. Therefore, the processing circuitry may calculate a trend in trust scores for the second entity that is relevant to the time period between the first time and the current time.

In some embodiments, 2210 may comprise determining a trend in one or more component scores. For example, as discussed in detail throughout, a trust score may comprise a weighted sum of a plurality of component scores. At 2210, the processing circuitry may retrieve at least two trust scores associated with the second entity as well as their respective component scores. The processing circuitry may then analyze corresponding component scores from the at least two trust scores to identify trends in the individual component scores. The trends may be determine in much the same manner as described above, including, for example, linear regression and/or polynomial regression techniques.

At 2212, the processing circuitry may update the first trust score using the calculated trend. For example, the processing circuitry may apply the determined increasing or decreasing slope of trust scores to the first trust score. In some embodiments, updating the first trust score comprises finding a time difference between the first time and the current time, multiplying this time difference by the slope, and adding the resulting product to the first trust score. In some embodiments, updating the first trust score comprises extrapolating a polynomial from the first time to the current time using the first trust score as an initial coordinate. In some embodiments, updating the first trust score comprises decomposing the first trust score into individual component scores, applying trends in the individual component scores (derived from an analysis of the second entity's component scores) to the corresponding component scores, and recalculating the trust score.

Although FIG. 22 is described in relation to analyzing the trends of the trust scores/component scores of only a single entity (i.e., the second entity), it will be understood by those of ordinary skill in the art that trends for multiple entities may be tracked in parallel and averaged together to produce an average trend. This average trend may be applied according to the process 2200 depicted in FIG. 22, mutatis mutandis.

The foregoing is merely illustrative of the principles of the disclosure, and the systems, devices, and methods described herein are presented for purposes of illustration, and not of limitation. Variations and modifications will occur to those of skill in the art after reviewing this disclosure. The disclosed features may be implemented, in any combination and subcombination (including multiple dependent combinations and subcombinations), with one or more other features described herein. The various features described or illustrated above, including any components thereof, may be combined or integrated in other systems. Moreover, certain features may be omitted or not implemented. Examples, changes, substitutions, and alterations ascertainable by one skilled in the art can be made without departing from the scope of the information disclosed herein.

What is claimed is:

1. A method, comprising:
receiving, by a server device comprising a processor, a request from a client device for a trust score representative of a degree of trust between a requesting entity and a target entity, the request comprising requesting entity identification information identifying the requesting entity and target entity identification information identifying the target entity;
determining, by the server device, the trust score based on the request, comprising:
determining, by server the device, a baseline trust score for the target entity based on the target entity identification information;
querying, by the server device, one or more network accessible data sources for defined trustworthiness information associated with the requesting entity based on the requesting entity identification information, wherein the defined trustworthiness information reflects a propensity for the requesting entity to trust other entities;
determining, by the server device, an adjustment trust score for the requesting entity based on the defined trustworthiness information; and
determining, by the server device, the trust score based on the baseline trust score for the target entity and the adjustment trust score; and
providing, by the server device, the trust score to the client device based on the determining the trust score.

2. The method of claim 1, wherein the defined trustworthiness information comprises one or more keywords classified as trusting keywords and wherein the querying comprises performing, by the server device, a keyword search to identify the one or more keywords at the one or more network accessible data sources.

3. The method of claim 2, wherein the determining the adjustment trust score comprises determining the adjustment trust score based on the one or more keywords.

4. The method of claim 2, wherein the determining the adjustment trust score comprises determining the adjustment trust score based on a number of the one or more keywords identified.

5. The method of claim 1, wherein the determining the trust score comprises determining the trust score based on multiplication of the baseline trust score by the adjustment trust score.

6. The method of claim 1, wherein the defined trustworthiness information comprises personal information shared by the requesting entity, and wherein the determining the adjustment trust score further comprises determining the adjustment trust score based on an amount of the personal information shared by the requesting entity at the one or more network accessible data sources, and wherein the one or more network accessible data sources include social networking platforms.

7. The method of claim 1, wherein the defined trustworthiness information comprises personal information shared by the requesting entity, and wherein the determining the adjustment trust score further comprises determining the adjustment trust score based on a frequency at which the requesting entity shares the personal information at the one or more network accessible data sources, and wherein the one or more network accessible data sources include social networking platforms.

8. The method of claim 1, further comprising:
receiving, by the server device, activity information that indicates an activity to be performed between the requesting entity and the target entity; and
determining, by the server device, the adjustment trust score based on historical activity information that reflects a level of trust exhibited by the trusting entity in association with past performance of the activity or a similar activity.

9. The method of claim 8, further comprising:
determining, by the server device, a recommendation regarding whether the requesting entity should perform the activity with the target entity based on the trust score; and
providing, by the server device, the recommendation to the client device in association with the trust score.

10. The method of claim 1, wherein the determining the adjustment trust score comprises determining the adjustment trust score based on rating information associated with the requesting entity that reflects how trusting the requesting entity is for the other entities as determined by one or more entities other than the requesting entity.

11. The method of claim 1, wherein the baseline trust score associated with the target entity is based on social graph data that indicates a level of social connectivity between the requesting entity and the target entity.

12. A server device, comprising:
a processor; and
a memory that stores executable instructions that, when executed by the processor, facilitate performance of operations, comprising:
receiving, via a network, a request from a client device for a trust score representative of a degree of trust between a requesting entity and a target entity, the request comprising requesting entity identification information identifying the requesting entity and target entity identification information identifying the target entity;
determining the trust score based on the request, comprising:
determining a baseline trust score for the target entity based on the target entity identification information;
querying one or more network accessible data sources for defined trustworthiness information associated with the requesting entity based on the requesting entity identification information, wherein the defined trustworthiness information reflects a propensity for the requesting entity to trust other entities;
determining an adjustment trust score for the requesting entity based on the defined trustworthiness information; and
determining the trust score based on the baseline trust score for the target entity and the adjustment trust score; and
providing the trust score to the client device via the network based on the determining the trust score.

13. The device of claim 12, wherein the defined trustworthiness information comprises one or more keywords classified as trusting keywords and wherein the querying comprises performing a keyword search to identify the one or more keywords at one or more network accessible data sources.

14. The device of claim 13, wherein the determining the adjustment score comprises determining the adjustment score based on the one or more keywords.

15. The device of claim 12, wherein the defined trustworthiness information comprises personal information shared by the requesting entity and wherein the determining the adjustment score comprises determining the adjustment score based on an amount of the personal information shared by the requesting entity at the one or more network accessible data sources.

16. The device of claim 12, wherein the operations further comprise:
receiving activity information that indicates an activity to be performed between the requesting entity and the target entity; and
determining the adjustment trust score based on historical activity information that reflects a level of trust exhibited by the trusting entity in association with past performance of the activity or a similar activity.

17. The device of claim 12, wherein the determining the adjustment trust score comprises determining the adjustment trust score based on rating information associated with the requesting entity that reflects how trusting the requesting entity is for the other entities as determined by one or more entities other than the requesting entity.

18. A non-transitory machine-readable storage medium, comprising executable instructions that, when executed by a processor, facilitate performance of operations, comprising:
receiving a request for a trust score representative of a degree of trust between a requesting entity and a target entity, the request comprising requesting entity identification information identifying the requesting entity and target entity identification information identifying the target entity;
determining the trust score based on the request, comprising:
determining a baseline trust score for the target entity based on the target entity identification information;
querying one or more network accessible data sources for defined trustworthiness information associated with the requesting entity based on the requesting entity identification information, wherein the defined trustworthiness information reflects a propensity for the requesting entity to trust other entities;
determining an adjustment trust score for the requesting entity based on the defined trustworthiness information; and
determining the trust score based on a baseline trust score for the target entity and the adjustment trust score; and
providing a representation of the trust score to the requesting entity in response to the determining the trust score.

19. The non-transitory machine-readable storage medium of claim 18, the operations further comprising:
receiving activity information that indicates an activity to be performed between the requesting entity and the target entity; and
determining the adjustment trust score based on historical activity information that reflects a level of trust exhibited by the trusting entity in association with past performance of the activity or a similar activity.

20. The non-transitory machine-readable storage medium of claim 19, the operations further comprising:
determining a recommendation regarding whether the requesting entity should perform the activity with the target entity based on the trust score; and
providing the recommendation to the requesting entity in association with the trust score.

* * * * *